US006281422B1

United States Patent

Kawamura

(10) Patent No.: US 6,281,422 B1
(45) Date of Patent: Aug. 28, 2001

(54) MUSIC PERFORMANCE ASSISTING SYSTEM FOR TEACHING SEQUENTIAL USE OF FINGERS, METHOD USED THEREIN AND INFORMATION STORAGE MEDIUM FOR COMPUTER PROGRAM REPRESENTATIVE OF THE METHOD

(75) Inventor: Kiyoshi Kawamura, Shizouka (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/520,577

(22) Filed: Mar. 8, 2000

(30) Foreign Application Priority Data

Mar. 8, 1999 (JP) ..................... 11-059710
Oct. 4, 1999 (JP) ..................... 11-283360

(51) Int. Cl.[7] ..................... G09B 15/04; G10H 7/00

(52) U.S. Cl. ..................... 84/615; 84/477 R; 84/478

(58) Field of Search ..................... 84/609–620, 634–638, 84/470 R, 477 R, 478

(56) References Cited

U.S. PATENT DOCUMENTS

| | | | | |
|---|---|---|---|---|
| 5,392,682 | * | 2/1995 | McCartney-Hoy | 84/470 R |
| 5,907,115 | * | 5/1999 | Matsunaga et al. | 84/477 R |
| 6,087,577 | * | 7/2000 | Yahata et al. | 84/478 |

FOREIGN PATENT DOCUMENTS

| | | |
|---|---|---|
| 7-261750 | 10/1995 | (JP) . |
| 10-49152 | 2/1998 | (JP) . |

* cited by examiner

*Primary Examiner*—Stanley J. Witkowski
(74) *Attorney, Agent, or Firm*—Morrison & Foerster

(57) ABSTRACT

A music performance assisting system analyzes a set of music data codes representative of a series of notes and rests forming a tune, and selectively assigns the notes to the five fingers of each hand of a player, wherein the music performance assisting system temporarily assigns notes of each of plural note groups to the fingers in accordance with rules of a fingering for obtaining candidates of a finger pattern, and, thereafter, evaluates the candidates on the basis of rules of a desirable fingering so as to determine the optimum use of fingers so as to decrease the data base and speed up the data processing.

22 Claims, 39 Drawing Sheets

| | | |
|---|---|---|
| A1:SUUU | B1:SURU | C1:SUDU |
| A2:SUUR | B2:SURR | C2:SUDR |
| A3:SUUD | B3:SURD | C3:SUDD |
| D1:SRUU | E1:SRRU | F1:SRDU |
| D2:SRUR | E2:SRRR | F2:SRDR |
| D3:SRUD | E3:SRRD | F3:SRDD |
| G1:SDUU | H1:SDRU | J1:SDDU |
| G2:SDUR | H2:SDRR | J2:SDDR |
| G3:SDUD | H3:SDRD | J3:SDDD |

S : Start
U : Up
D : Down
R : Repeat

Fig. 11

C3 : SUDD

ASSIGN THE FIRST NOTE TO THE THUMB/FIRST FINGER OR THE MIDDLE/RING FINGER. ENTER "FINGER ASSIGNMENT EASY TO PLAY ".

Beyer Nos. 9, 17, 36, 38 & 40
"Mitsubachi Bunbun " etc.

19 tunes

Fig. 20

D1 : SRUU

IF THE FIRST NOTE HAS THE LOWEST PITCH :
TEMPO AT THE FIRST NOTE IS SLOWER THAN 120⇨"1" -"1"
TEMPO AT THE FIRST NOTE IS FASTER THAN 120
THE FIRST NOTE IS LONGER THAN THE SECOND NOTE ⇨"1" -"1"
THE FIRST NOTE IS NOT LONGER THAN THE SECOND NOTE⇨"2" -"1"
IF THE FIRST NOTE DOES NOT HAVE THE LOWEST PITCH :
⇨"3" -"3" OR "4" - "4"
ENTER " FINGER ASSIGNMENT EASY TO PLAY ".

"Tsuki no Hikari "
" Ame "
Beyer No.91 etc.

12 tunes

Fig. 21

D2 : SRUR

SIMILAR TO THE DATA PROCESSING FOR THE NOTE PATTERN D1.

"Arisan no Ohanashi"
"Fujisan"
"Shiawasenara Teotatakou"
"Ningyo"

4 tunes

Fig. 22

D3 : SRUD

ASSIGN THE FIRST NOTE TO MIDDLE FINGER.
ENTER "FINGER ASSIGNMENT EASY TO PLAY"

"Sakura"
"Brahms's Nursery Song"

ets 5 tunes

Fig. 23

E1 : SRRU

IF THE FIRST NOTE IS THE LOWEST ASSIGN THE FIRST NOTE TO THUMB/FIRST FINGER.
OTHERWISE,ASSIGN IT TO THE MIDDLE/RING FINGER.
ENTER "FINGER ASSIGNMENT EASY TO PLAY".

Beyer No. 64
"Nami to Kaigara"
"Gavotte "

etc.

11 tunes

Fig. 24

E2 : SRRR

IF LOWER-PITCHED NOTES ARE MAJORITY IN EIGHT NOTES, ASSIGN "5" -"5" -"5" -"5", "4" -"4" -"4" -"4" TO THE FOUR NOTES. IF HIGHER-PITCHED NOTES ARE MAJORITY, ASSIGN "4" -"3" -"2" -"1", "1" -"1" -"1" -"1", "1" -"2" -"1" -"2".

Beyer Nos. 72 & 99
"Tanabata Matsuri"
"Darumasan"
"Temari Uta"
etc.

14 tunes

Fig. 25

E3 : SRRD

IF LOWER PITCHED NOTES ARE MAJORITY, ASSIGN THE LOWEST PITCHED NOTE TO THE THUMB, AND ENTER "FINGER ASSIGNMENT EASY TO PLAY". IF HIGHER PITCHED NOTES ARE MAJORITY, ASSIGN THE FINGER PATTERN "4" -"3" -"2" -"1" - TO THE FOUR NOTES.

"Katatsumuri"
"Hotarugari"
etc.

5 tunes

Fig. 26

F1 : SRDU

IF THE FIRST NOTE HAS THE LOWEST PITCH, ASSIGN THE FIRST NOTE TO THE THUMB OR THE FIRST FINGER.
IF NOT, ASSIGN THE FIRST NOTE TO THE MIDDLE/RING FINGER. ENTER SR40.

"Haruyokoi"
"Oborozukiyo"
"Oyama no Osaru"
etc.

7 tunes

Fig. 27

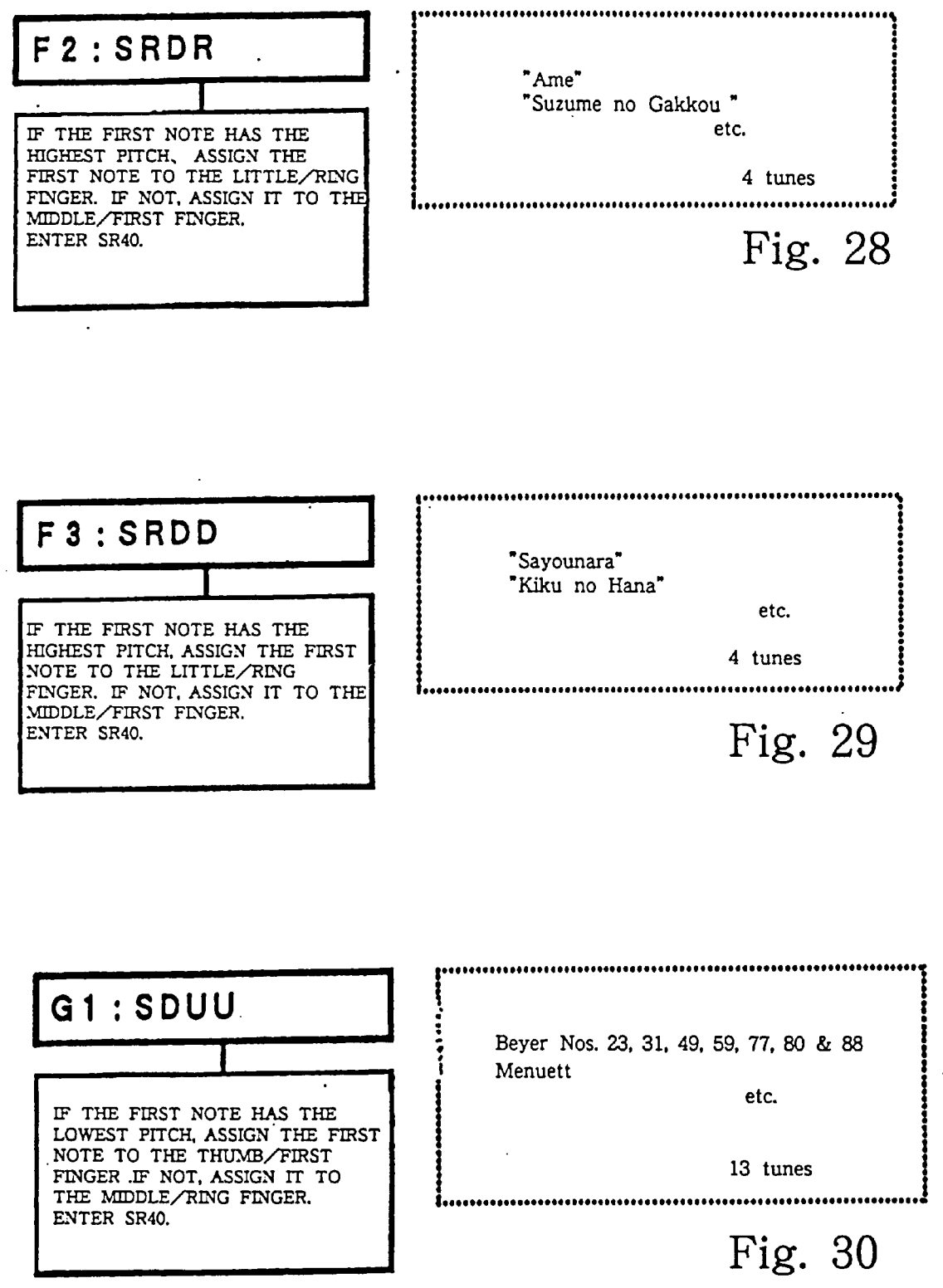

F2 : SRDR

IF THE FIRST NOTE HAS THE HIGHEST PITCH, ASSIGN THE FIRST NOTE TO THE LITTLE/RING FINGER. IF NOT, ASSIGN IT TO THE MIDDLE/FIRST FINGER.
ENTER SR40.

"Ame"
"Suzume no Gakkou"
etc.

4 tunes

Fig. 28

F3 : SRDD

IF THE FIRST NOTE HAS THE HIGHEST PITCH, ASSIGN THE FIRST NOTE TO THE LITTLE/RING FINGER. IF NOT, ASSIGN IT TO THE MIDDLE/FIRST FINGER.
ENTER SR40.

"Sayounara"
"Kiku no Hana"
etc.

4 tunes

Fig. 29

G1 : SDUU

IF THE FIRST NOTE HAS THE LOWEST PITCH, ASSIGN THE FIRST NOTE TO THE THUMB/FIRST FINGER. IF NOT, ASSIGN IT TO THE MIDDLE/RING FINGER.
ENTER SR40.

Beyer Nos. 23, 31, 49, 59, 77, 80 & 88
Menuett
etc.

13 tunes

Fig. 30

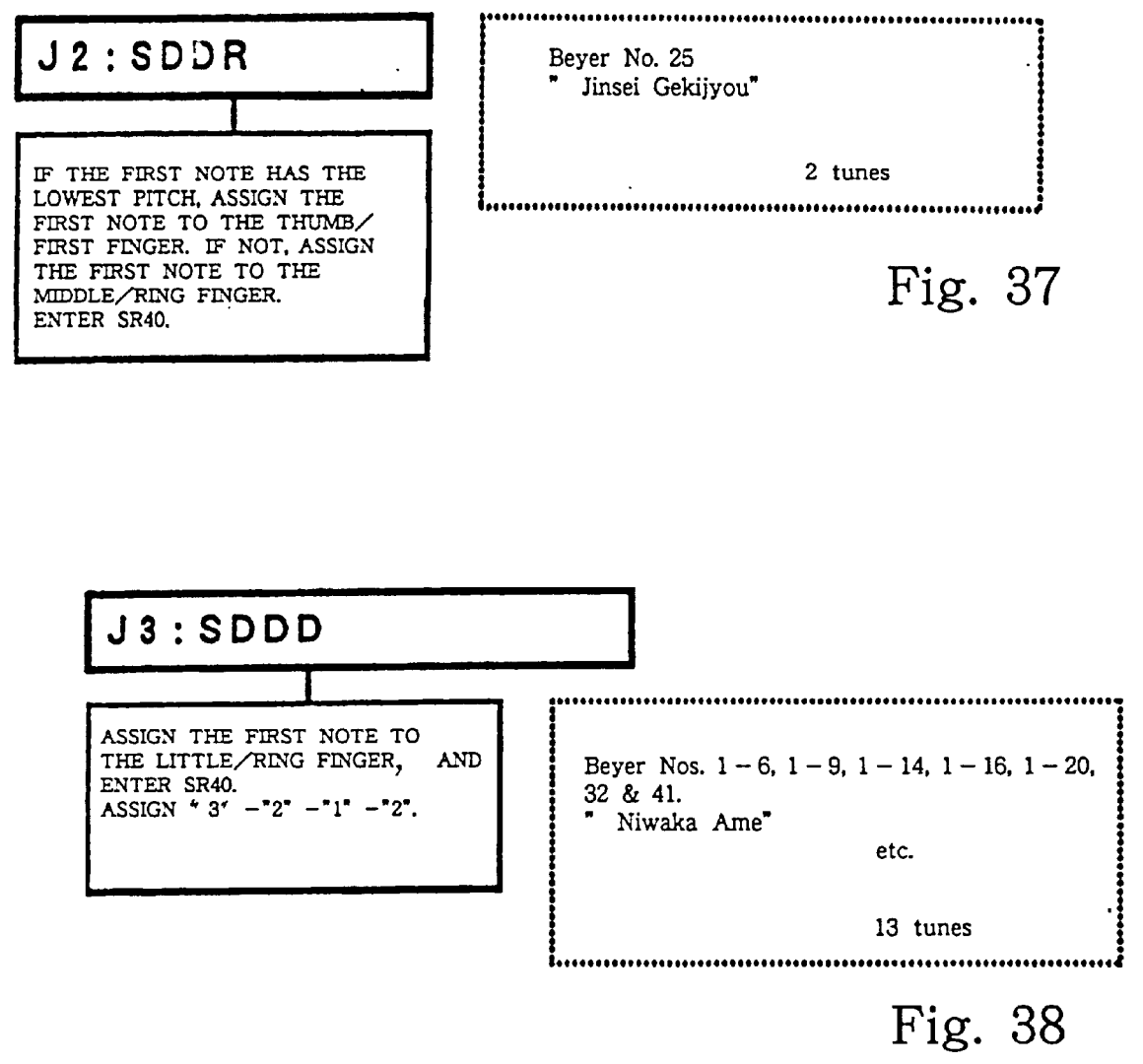

J2 : SDDR

IF THE FIRST NOTE HAS THE LOWEST PITCH, ASSIGN THE FIRST NOTE TO THE THUMB/FIRST FINGER. IF NOT, ASSIGN THE FIRST NOTE TO THE MIDDLE/RING FINGER. ENTER SR40.

Beyer No. 25
" Jinsei Gekijyou"

2 tunes

Fig. 37

J3 : SDDD

ASSIGN THE FIRST NOTE TO THE LITTLE/RING FINGER, AND ENTER SR40.
ASSIGN "3" -"2" -"1" -"2".

Beyer Nos. 1 - 6, 1 - 9, 1 - 14, 1 - 16, 1 - 20, 32 & 41.
" Niwaka Ame"
etc.

13 tunes

Fig. 38

D2 : SRUR

SIMILAR TO THE DATA PROCESSING FOR THE NOTE PATTERN D1 EXCEPT THAT THE FIRST NOTE IS NOT LOWEST.
IF THE FIRST NOTE IS NOT LOWEST, "3" –"3" AND "4" –"4" ARE ASSIGNED.

"Arisan no Ohanashi"
"Fujisan"
"Shiawasenara Teotatakou"
"Ningyo"

4 tunes

Fig. 49

D3 : SRUD

ASSIGN THE FIRST NOTE TO MIDDLE FINGER OR RING FINGER.
ENTER "FINGER ASSIGNMENT EASY TO PLAY" FINGER PATTERN "3" –"3", "4" –"4".

"Sakura"
"Brahms's Nursery Song"

ets 5 tunes

Fig. 50

E1 : SRRU

IF THE FIRST NOTE IS THE LOWEST, ASSIGN THE FIRST NOTE TO THUMB/FIRST FINGER.
OTHERWISE, ASSIGN IT TO THE MIDDLE/RING FINGER.
ENTER "FINGER ASSIGNMENT EASY TO PLAY".

Beyer No. 64
"Nami to Kaigara"
"Gavotte "

etc.

11 tunes

Fig. 51

E2 : SRRR

IF LOWER-PITCHED NOTES ARE MAJORITY IN FOUR NOTES, ASSIGN "5" -"5" -"5" -"5", "4" -"4" -"4" -"4" TO THE FOUR NOTES. IF HIGHER-PITCHED NOTES ARE MAJORITY, ASSIGN "4" -"3" -"2" -"1", "1" -"1" -"1" -"1", "1" -"2" -"1" -"2".

Beyer Nos. 72 & 99
"Tanabata Matsuri"
"Darumasan"
"Temari Uta"
etc.

14 tunes

Fig. 52

E3 : SRRD

IF LOWER PITCHED NOTES ARE MAJORITY, ASSIGN THE LOWEST PITCHED NOTE TO THE THUMB, AND ENTER "FINGER ASSIGNMENT EASY TO PLAY". THE FINGER PATTERN FOR THE FIRST THREE NOTES IS "5" -"5" -"5", "4" -"4" -"4" or "3" -"3" -"3". IF HIGHER PITCHED NOTES ARE MAJORITY, ASSIGN THE FINGER PATTERN"4" -"3" -"2" -"1".

"Katatsumuri"
"Hotarugari"
etc.

5 tunes

Fig. 53

F1 : SRDU

IF THE FOURTH NOTE HAS THE HIGHEST PITCH, ASSIGN THE FIRST TWO NOTES TO THE FIRST/MIDDLE/RING FINGER. IF NOT, ASSIGN THEM TO THE LITTLE/RING/MIDDLE FINGER.

"Haruyokoi"
"Oborozukiyo"
"Oyama no Osaru"
etc.

7 tunes

Fig. 54

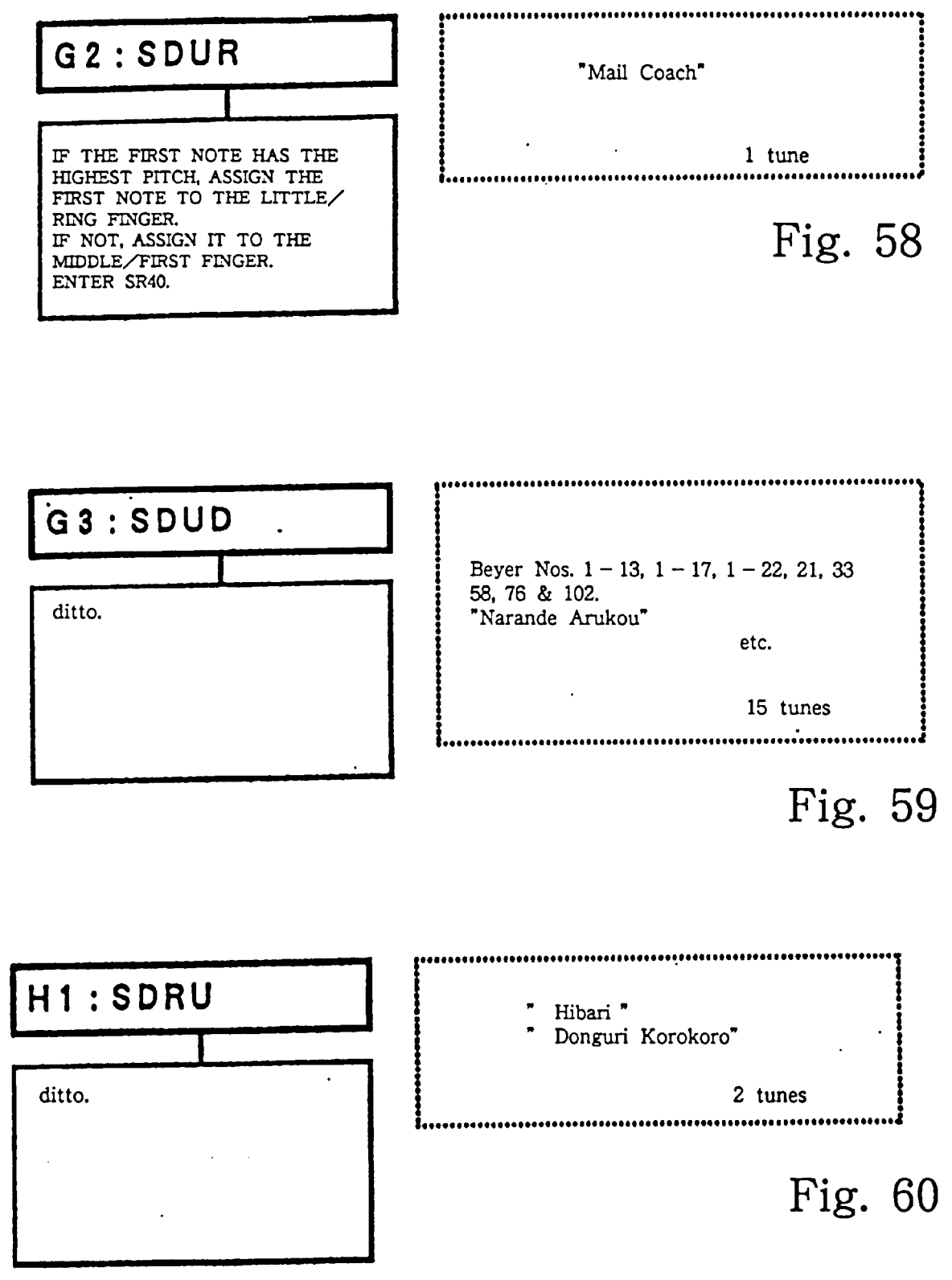

G2 : SDUR

IF THE FIRST NOTE HAS THE HIGHEST PITCH, ASSIGN THE FIRST NOTE TO THE LITTLE/RING FINGER.
IF NOT, ASSIGN IT TO THE MIDDLE/FIRST FINGER.
ENTER SR40.

"Mail Coach"

1 tune

Fig. 58

G3 : SDUD ditto.

Beyer Nos. 1 – 13, 1 – 17, 1 – 22, 21, 33
58, 76 & 102.
"Narande Arukou"
etc.

15 tunes

Fig. 59

H1 : SDRU ditto.

" Hibari "
" Donguri Korokoro"

2 tunes

Fig. 60

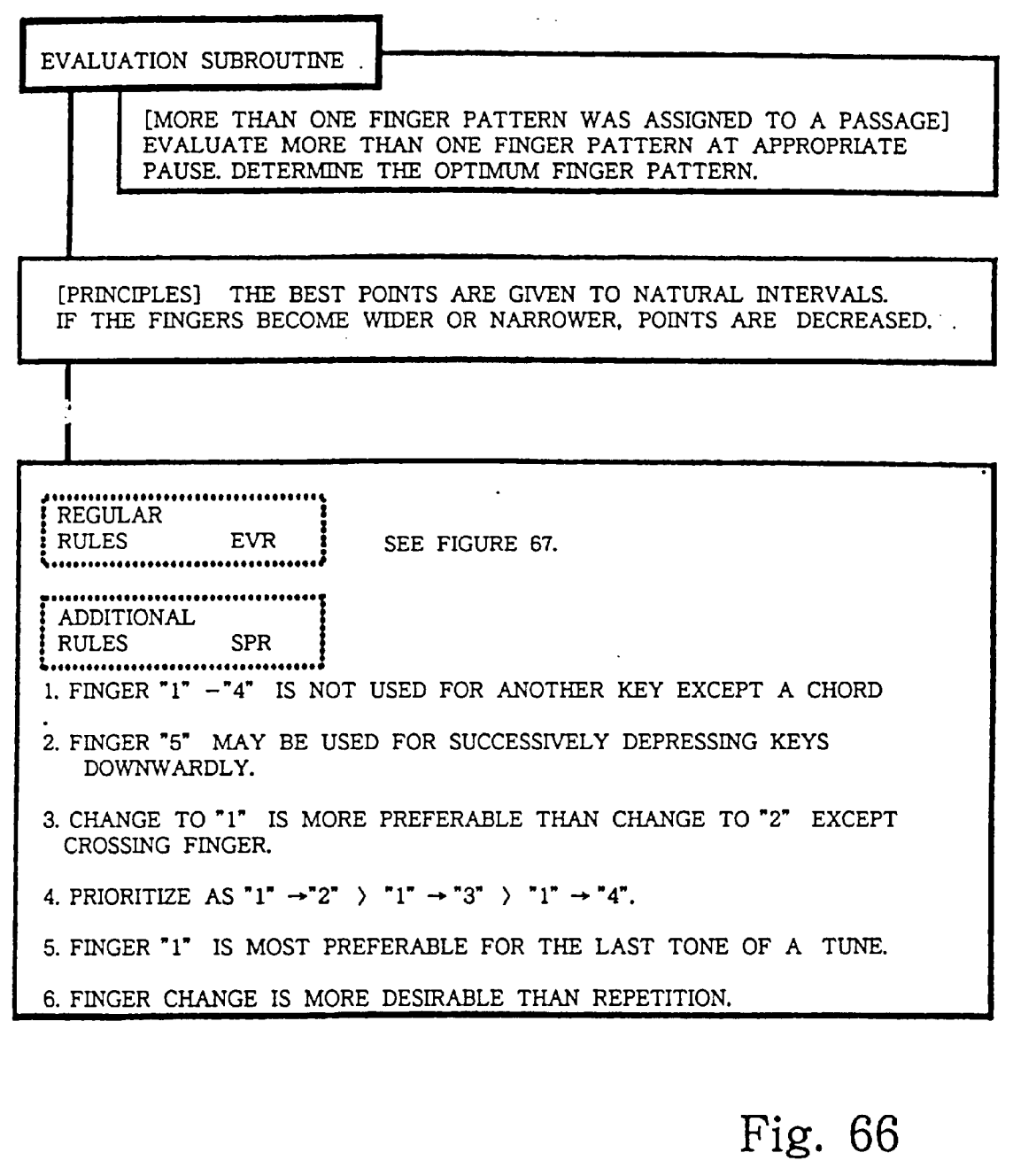

EVALUATION SUBROUTINE

[MORE THAN ONE FINGER PATTERN WAS ASSIGNED TO A PASSAGE] EVALUATE MORE THAN ONE FINGER PATTERN AT APPROPRIATE PAUSE. DETERMINE THE OPTIMUM FINGER PATTERN.

[PRINCIPLES] THE BEST POINTS ARE GIVEN TO NATURAL INTERVALS. IF THE FINGERS BECOME WIDER OR NARROWER, POINTS ARE DECREASED.

REGULAR RULES EVR

SEE FIGURE 67.

ADDITIONAL RULES SPR

1. FINGER "1" – "4" IS NOT USED FOR ANOTHER KEY EXCEPT A CHORD

2. FINGER "5" MAY BE USED FOR SUCCESSIVELY DEPRESSING KEYS DOWNWARDLY.

3. CHANGE TO "1" IS MORE PREFERABLE THAN CHANGE TO "2" EXCEPT CROSSING FINGER.

4. PRIORITIZE AS "1" → "2" > "1" → "3" > "1" → "4".

5. FINGER "1" IS MOST PREFERABLE FOR THE LAST TONE OF A TUNE.

6. FINGER CHANGE IS MORE DESIRABLE THAN REPETITION.

Fig. 66

REGULAR RULES

W : WHITE
B : BLACK
SP : SPAN

1. "1" ↔ "2" : SP ≤4 → 10 POINTS, SP IS INCREASED BY ONE, EACH TIME DECREMENT SCORE BY 2 POINTS.
CROSSING FINGER ; "1" = W, "2" = W, SP ≤2 → 10 POINTS
"1" = W, "2" = B, SP = 1 → 10 POINTS.
"1" = W, "2" = B, SP = 2 → 7 POINTS
"1" = B, "2" = W → NOT ALLOWED

2. "1" ↔ "3" : SP = 3 OR 4 → 10 POINTS. SP IS INCREASED OR DECREASED BY ONE, EACH TIME DECREMENT SCORE BY 2 POINTS.
CROSSING FINGER ; "1" = W, "3" = W, SP ≤2 = 10 POINTS.
"1" = W, "3" = B, SP = 1 → 10 POINTS
"1" = W, "3" = B, SP = 2 → 7 POINTS
"1" = B, "3" = W → NOT ALLOWED

3. "1" ↔ "4" : SP = 5 → 10 POINTS, SP IS INCREASED BY ONE, EACH TIME DECREASE SCORE BY 1 POINT. SP IS DECREASED BY ONE, EACH TIME DECREASE SCORE BY 2 POINTS.
CROSSING FINGER : "1" = W, "4" = W, SP ≤2 → 10 POINTS
"1" = W, "4" = B, SP = 1 → 10 POINTS
"1"" = W, "4" = B, SP = 2 → 7 POINTS
"1" = B, "4" = W → NOT ALLOWED

4. "1" ↔ "5" : SP = 7 → 10 POINTS, SP IS INCREMENTED BY ONE, EACH TIME DECREASE SCORE BY 1 POINT. SP IS DECREASED BY ONE, EACH TIME DECREASE SCORE BY 2 POINTS.

5. "2" ↔ "3" : SP = 2 → 10 POINTS ; SP IS INCREMENT OR DECREMENT BY ONE. EACH TIME DECREASE SCORE BY 2 POINTS.

6. "2" ↔ "4" : "2, 4" = WW, SP = 3 OR 4 → 10 POINTS, "2, 4" = B.B SP = 4 → 10 POINTS
"2, 4" = W OR BW, SP = 3 OR 4 → 7 POINTS, SP IS INCREMENTED OR DECREMENTED BY ONE, EACH TIME DECREASE SCORE BY 3 POINTS.

7. "2" ↔ "5" : "2, 5". = WW, SP = 5 - 7 → 10 POINTS ; "2, 5" IS BB, SP = 5 → 10 POINTS
SP IS INCREMENTED OR DECREMENTED BY ONE, EACH TIME DECREASE SCORE BY 3 POINTS.

8. "3" ↔ "4" : "3, 4" = WW, SP = 1 OR 2 → 10 POINTS ; "3, 4" = BB SP = 2 → 10 POINTS
"3" = W, "4" = B, SP = 1 OR 2 → 7 POINTS ; "3" = B, "4" = W, SP = 1 OR2 → 9 POINTS
SP IS INCREMENTED OR DECREMENTED BY ONE, EACH TIME DECREASE SCORE BY 3 POINTS.

9. "3" ↔ "5" : "3, 5" = WW, SP = 3 OR 4 → 10 POINTS, "3, 5" = BB, SP = 4 → 10 POINTS
"3, 5" = WB OR BW, SP = 3 OR 4 → 7 POINTS ; SP IS INCREMENTED OR DECREMENTED BY ONE, EACH TIME DECREASE SCORE BY 3 POINTS.

10. "4" ↔ "5" : "3, 5" = WW, SP = 3 OR 4 → 10 POINTS ; "3, 5" = BB, SP = 4 → 10 POINTS
"3, 5" = WB OR BW, SP = 3 OR 4 → 7 POINTS ; SP IS INCREMENTED OR DECREMENTED BY ONE, EACH TIME DECREASE SCORE BY 3 POINTS.

Fig. 67

STAND-ARD PATTERN

| | NOTE | FIRST FINGER PATTERN | | | | SECOND FINGER PATTERN | | | | THIRD FINGER PATTERN | | | | | | | |
|---|---|---|---|---|---|---|---|---|---|---|---|---|---|---|---|---|---|
| 1 | 1st | 1 | | | | 1 | | | | 2 | | | | | | | |
| 2 | 2nd | 2 | | | | 2 | | | | 3 | | | | | | | |
| 1 | 3rd | 1 | | | | 1 | | | | 2 | | | | | | | |
| 4 | 4th | 3 | | | | 4 | | | | 5 | | | | | | | |
| 3 | 5th | 2 | | | | 3 | | | | 4 | | | | | | | |
| 1 | 6th | 1 | | | | 1 | | | | 1 | | | | 2 | | | |
| 2 | 7th | 2 | | | | 2 | | | | 2 | | | | 3 | | | |
| 1 | 8th | 1 | | | | 1 | | | | 1 | | | | 2 | | | |
| 5 | 9th | 5 | | | | 5 | | | | 5 | | | | | | | |
| 4 | 10th | 4 | | | | 4 | | | | 4 | | | | | | | |
| 1 | 11th | 1 | | | | 1 | | | | 1 | | | | | | | |
| 5 | 12th | 5 | | | | 5 | | | | 5 | | | | | | | |
| 3 | 13th | 3 | | | | 3 | | | | 3 | | | | | | | |
| 1 | 14th | 1 | | | | 1 | | | | 1 | | | | | | | |
| 2 | 15th | 2 | | 3 | | 2 | | 3 | | 2 | | 3 | | 2 | | 3 | |
| 1 | 16th | 1 | | 2 | | 1 | | 2 | | 1 | | 2 | | 1 | | 2 | |
| 4 | 17th | 5 | | | | 5 | | | | 5 | | | | | | | |
| 3 | 18th | 4 | | | | 4 | | | | 4 | | | | | | | |
| 1 | 19th | 1 | 2 | 1 | 2 | 1 | 2 | 1 | 2 | 1 | 2 | 1 | 2 | 1 | 2 | 1 | 2 |
| 2 | 20th | 2 | 3 | 2 | 3 | 2 | 3 | 2 | 3 | 2 | 3 | 2 | 3 | 2 | 3 | 2 | 3 |
| 1 | 21st | 1 | 2 | 1 | 2 | 1 | 2 | 1 | 2 | 1 | 2 | 1 | 2 | 1 | 2 | 1 | 2 |
| FINGER PATTERN | | 1-1 | 1-2 | 1-3 | 1-4 | 2-1 | 2-2 | 2-3 | 2-4 | 3a-1 | 3a-2 | 3a-3 | 3a-4 | 3b-1 | 3b-2 | 3b-3 | 3b-4 |

Fig. 72

| NOTE | FIRST FINGER PATTERN | | SECOND FINGER PATTERN | | THIRD FINGER PATTERN | |
|---|---|---|---|---|---|---|
| | FINGER | SCORE | FINGER | SCORE | FINGER | SCORE |
| 1 st | 1 | | 1 | | 2 | |
| | | } 10 | | } 10 | | } 10 |
| 2 nd | 2 | | 2 | | 3 | |
| | | } 10 | | } 10 | | } 10 |
| 3 rd | 1 | | 1 | | 2 | |
| | | } 8 | | } 10 | | } 10 |
| 4 th | 3 | | 4 | | 5 | |

Fig. 73

MUSIC PERFORMANCE ASSISTING SYSTEM FOR TEACHING SEQUENTIAL USE OF FINGERS, METHOD USED THEREIN AND INFORMATION STORAGE MEDIUM FOR COMPUTER PROGRAM REPRESENTATIVE OF THE METHOD

FIELD OF THE INVENTION

This invention relates to a music performance assisting system and, more particularly, to a music performance assisting system for teaching a sequential use of the fingers for a tune, a method used therein and an information storage medium for storing a computer program representative of the method.

DESCRIPTION OF THE RELATED ART

A music teacher teaches music students through a lecture, and gets the music students to practice musical instruments. If a piano is used for the music education, the music teacher teaches the music students the arrangement of the keyboard and the fingering on the keyboard. Thus, a large amount of time and labor is consumed in the music education.

In order to assist the music teacher in the music education, an electric tutor has been proposed. A prior art electric tutor has an array of optical indicators provided along the keyboard, and selectively illuminates the optical indicators on the basis of pieces of music data information representative of a tune. The prior art electric tutor gives notice of a key to be depressed through the illumination, and guides the trainee in the fingering on the keyboard.

A prior art music data analyzer for fingering is disclosed in Japanese Patent Publication of Unexamined Application (laid-open) No. 7-261750. The prior art music data analyzer fetches pieces of data information representative of the pitch names of tones to be generated, and analyzes the pieces of data information for fingering. The prior art music data analyzer takes the distance between the keys to be successively depressed, the kind of keys, i.e., either white or black key and unordinary fingering such as a transient fingering and a transition of position into account, and determines the fingers to be used for depressing the keys. The prior art music data analyzer memorizes pieces of position data information representative of the fingers to be used for depressing the keys together with the pieces of music data information, and instructs a trainee to depress the keys with the particular fingers.

A prior art guide system is disclosed in Japanese Patent Publication of Unexamined Application (laid-open) No. 10-49152. The prior art guide system stores a table, which defines relation between pieces of melody and appropriate patterns of the fingers or relation between patterns of the fingers and pieces of memory available for the patterns of fingers. The table is formed for all the combinations of five tones in an octave. The unordinary fingering is taken into account. The prior art guide system analyzes a tune to be performed, and divides the tune into plural sections. The prior art guide system searches the table for appropriate fingering, and determines the fingers to be used for depressing the keys.

The following problems are encountered in the above-described prior art systems. The prior art electric tutor illuminates the optical indicators at short notice, and the trainee feels the guidance through the illumination hard to follow.

The prior art electric tutor guides the trainee in the fingering through the illumination. However, the optical indicators sequentially radiate the light at short intervals, and the trainee hardly follows the prior art electric tutor. Although the prior art electric tutor teaches the sequence of the keys to be depressed, the prior art electric tutor does not indicate the fingers to be used for depressing the keys.

The prior art music data analyzer disclosed in Japanese Patent Publication of Unexamined Application No. 7-261750 determines a sequential use of the fingers in playing a tune. The prior art music data analyzer teaches the fingering. However, the sequential use is imperfectly matched with the standard sequential use of the fingers in playing the tune. Thus, the problem inherent in the prior art music data analyzer is a low hit ratio.

The prior art guide system disclosed in Japanese Patent Publication of Unexamined Application No. 10-49152 also teaches the fingering. However, the prior art guide system requires a large amount of database for all the combinations between the use of the fingers and pieces of melody, because a sequential use of the fingers is determined on the basis of the database. The problem inherent in the prior art guide system is a great production cost due to a large amount of time and labor consumed in the preparation of the large database.

SUMMARY OF THE INVENTION

It is therefore an important object of the present invention to provide a music performance assisting system, which is fabricated at a low cost for exactly teaching a sequential use of the fingers for a tune.

It is another important object of the present invention to provide a method used in the music performance assisting system.

It is yet another important object of the present invention to provide an information storage medium for storing a computer program representative the method.

In accordance with one aspect of the present invention, there is provided a music performance assisting system associated with a music instrument having plural manipulators manipulated by a player for producing tones, and the music performance assisting system comprises a memory for storing pieces of data information representative of a series of notes and rests forming a tune, a divider for dividing the series of notes and rests into plural groups each having at least one note, a finger assignor selectively assigning the aforesaid at least one note of each group to fingers of each hand of the player in accordance with rules of fingering for determining a use of fingers and a guide for teaching the use of fingers along the tune to the player.

In accordance with another aspect of the present invention, there is provided a method for teaching a use of fingers along a tune to a player, and the method comprises the steps of a) storing pieces of data information representative of a series of notes and rests forming a tune and rules of a fingering, b) dividing a series of notes and rests representative of a tune into groups each having at least one note, c) selectively assigning the aforesaid at least one note of each group to fingers of each hand of the player in accordance with the rules so as to obtain a use of fingers, d) repeating the steps b) and c) until the end of the tune, if necessary, and e) teaching the use of fingers to the player.

In accordance with yet another aspect of the present invention, there is provided an information storage medium for storing a computer program representative of a method for teaching a use of fingers along a tune to a player, and the method comprises the steps of a) storing pieces of data information representative of a series of notes and rests forming a tune and rules of a fingering, b) dividing a series of notes and rests representative of a tune into groups each having at least one note, c) selectively assigning the aforesaid at least one note of each group to fingers of each hand of the player in accordance with the rules so as to obtain a use of fingers, d) repeating the steps b) and c) until the end of the tune, if necessary and e) teaching the use of fingers to the player.

BRIEF DESCRIPTION OF THE DRAWINGS

The features and advantages of the music performance assisting system, the method and the information storage medium will be more clearly understood from the following description taken in conjunction with the accompanying drawings in which:

FIG. 11 is a view showing note patterns selectively assigned to the four notes;

FIGS. 12 to 38 are views showing a finger assignment for the note patterns incorporated in a finger assignment subroutine;

FIGS. 39 to 65 are views showing another finger assignment;

FIG. 66 is a view showing an evaluation subroutine;

FIG. 67 is a view showing evaluation rules;

FIG. 72 is a view showing candidates of a finger pattern applied to the tune; and FIG. 73 is a view showing scores given to the candidates.

DESCRIPTION OF THE PREFERRED EMBODIMENTS

Hardware

Figure 1:
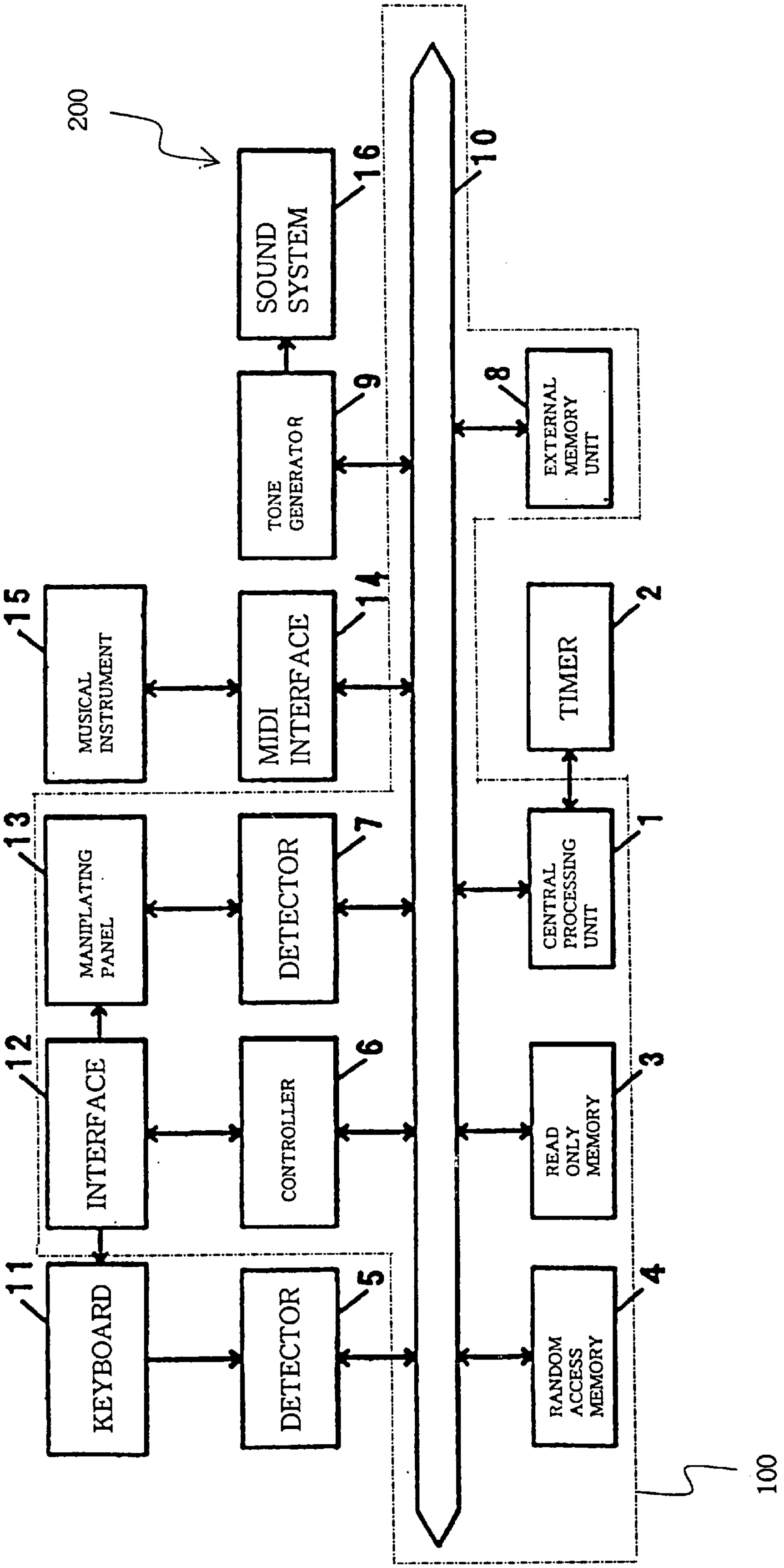
FIG. 1 is a block diagram showing the arrangement of system components incorporated in a music performance assisting system according to the present invention.

Referring to FIG. 1 of the drawings, a music performance assisting system 100 embodying the present invention is built in a keyboard musical instrument, and various system components are shared with an electric keyboard 200. These system components are a central processing unit 1, a read only memory 3, a random access memory 4, a detector 7, a shared bus 10 and a manipulating panel 13. The electric keyboard 200 further includes a timer 2, a keyboard 11, a detector 5, an external memory unit 8, a MIDI (Musical Instrument Digital Interface) interface 14, a tone generator 9 and a sound system 16. The keyboard musical instrument 200 is communicable with another musical instrument 15 through the MIDI interface 14. On the other hand, the music performance assisting system 100 further includes a controller 7 and an instructor 12.

Computer programs are stored in the read only memory 3. The central processing unit 1 sequentially fetches the instruction codes of the computer programs, and achieves given tasks. The electric keyboard 200 produces electric sounds through the execution of several computer programs, and the music performance assisting system 100 guides a trainee in the fingering through the execution of other computer programs. The electric keyboard 200 and the music performance assisting system 100 are working in parallel. In this instance, the central processing unit 1 formats music data codes in the MIDI standards. Tables and music parameters are further stored in the read only memory 3, and are used in the generation of the electric sounds and the instructions for the fingering. An important table for the assisting system 100 stores note patterns, which represents how a series of notes is varied in a tune.

The random access memory 4 offers a working area to the central processing unit 1. Registers and flags are formed in the working area, and pieces of music data information and pieces of assist information are temporarily stored in the random access memory 4 together with intermediate data thereof.

The detector 5 is connected between the keyboard 11 and the shared bus 10, and periodically searches the keyboard 11 to see whether or not a trainee depresses or releases any key. The keyboard 11 has plural black keys and plural white keys laid on the pattern of a standard keyboard musical instrument, and each of the black/white keys is moved between the rest position and the end position. When the trainee depresses a key, the detector 5 supplies a detecting signal representative of the depressed/released key through the shared bus 10 to the central processing unit 1, and the central processing unit 1 determines a key number assigned to the depressed/released key on the basis of the detecting signal and a timing at which the detecting signal is generated.

The timer 2 generates a tempo clock signal, and supplies the tempo clock signal 2 to the central processing unit 1.

The controller 6 is connected between the instructor 12 and the shared bus 10. The controller 6 is responsive to a piece of assist data information supplied from the central processing unit 1 so as to control the instructor 12. The instructor 12 gives the trainee instructions for the fingering visually, aurally and/or tactually. The aural instructions may be given through a synthetic voice. The synthetic voice identifies the fingers numbered in accordance with the continental fingering. In the continental fingering, the thumb is numbered as "1", and the other fingers are numbers as "2" to "5". Otherwise, the instructor 12 may pronounce the fingers such as "Thumb", "The first finger", "The middle finger", "The ring finger" and "The little finger". The words may be shortened as "Thumb", "First", "Middle", "Ring" and "Little".

The instructor 12 may have a visual display such as, for example, a liquid crystal display. In this instance, an image of hands is produced on the screen of the display unit, and the fingers to be used are moved on the screen so as to notify the trainee of the fingers used for depressing the keys. The motion of the finger is emphasized.

The instructor 12 may have an array of optical indicators. The optical indicators are respectively assigned to the keys of the keyboard 11. Each of the optical indicators radiates a light beam in a color selected from five candidates depending upon the finger used for depressing the associated key. In this instance, the instructor 12 notifies a key to be depressed and the finger used for depressing the key .

The detecting circuit 7 is connected between the manipulating panel 13 and the shared bus 10. Switches, keys and a display window are provided on the manipulating panel 13. Some switches are used for imparting an effect to the electric sounds, and another switch is assigned to the loudness. Other switches are assigned to the music performance assisting system 100. Upon completion of an analysis, which will be hereinbelow described in detail, a pianist can manually correct a piece of assist data information representative of a wrong finger by using the keys. The controller 6 produces a prompt message on the display window. The display window may be shared with the interface.

The external memory unit 8 is implemented by a hard disk drive unit, a floppy disk drive unit, a compact disk read only memory unit, a magneto-optical disk drive unit or a multipurpose disk drive unit for a digital video disk. Of course, more than one kind of disk drive unit may serve as the external memory unit 8. A set of music data codes represents a tune, and the music data codes are formatted in accordance with the MIDI standards. A hundred tunes form a standard MIDI file, and the standard MIDI file is stored in the external memory unit 8. The tunes in the standard MIDI file are selected from the Beyer, the Sonatina, children's songs, Japanese popular ballads and Japanese popular songs. In the following description, the title of the Japanese song is written in Italics, and English equivalent is given in parentheses. after the Japanese title. The music data codes of a selected set are transferred from the external memory unit 8 to the random access memory 4, and the central processing unit 1 sequentially reads out the music data codes from the random access memory 4 so as to generate the electric sounds and guide the fingers of a trainee.

The computer programs for the music performance assisting system may be stored in the external memory unit 8 or read from a suitable information storage medium such as, for example, a rewritable memory disk through the external memory unit 8. In this instance, the computer programs are not stored in the read only memory 3, and are transferred from the external memory 8 to the random access memory unit 4. The pieces of assist data information may be transferred from the random access memory 4 to the external memory unit 8 so as to be stored in the rewritable memory disk.

The MIDI interface 14 is connected to the shared bus 10, and the music data codes are transferred through the MIDI interface 14 to the other musical instrument 15 and vice versa.

The tone generator 9 is connected to the shared bus 10, and the music data codes are supplied to the tone generator 9. The tone generator 9 produces an audio signal from the music data codes, and supplies the audio signal to the sound system 16. The sound system 16 generates the electric sounds from the audio signal.

The keyboard musical instrument shown in FIG. 1 may be a combination of a personal computer system with a built-in tone generator and the keyboard 11 accompanied with the detector 5. A hard disk drive unit, a tone generator and a display unit may be combined with a sequencer so as to realize the keyboard musical instrument shown in FIG. 1.

Figure 2:
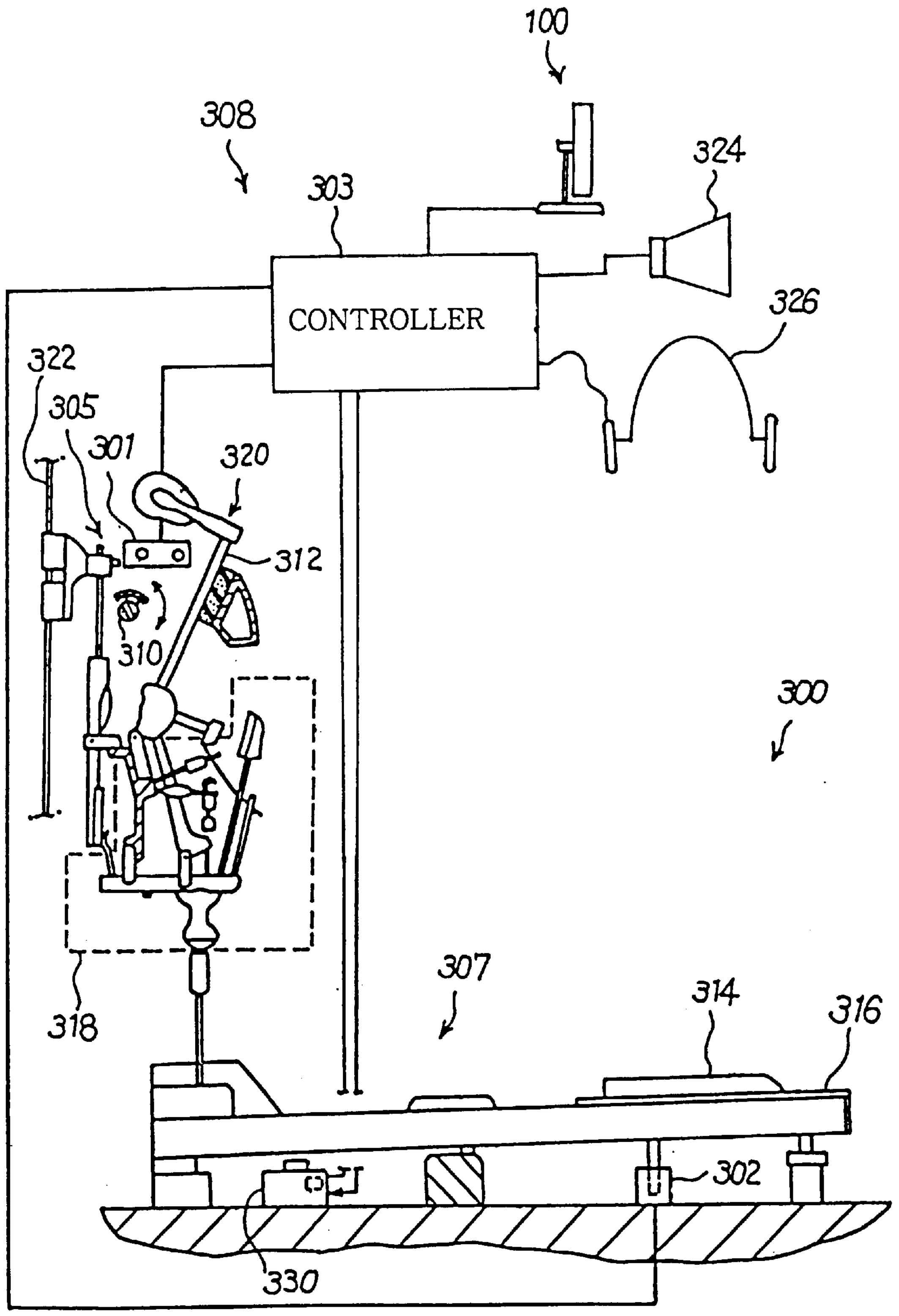
FIG. 2 is a schematic view showing a keyboard musical instrument with the music performance assisting system.
Figure 3:
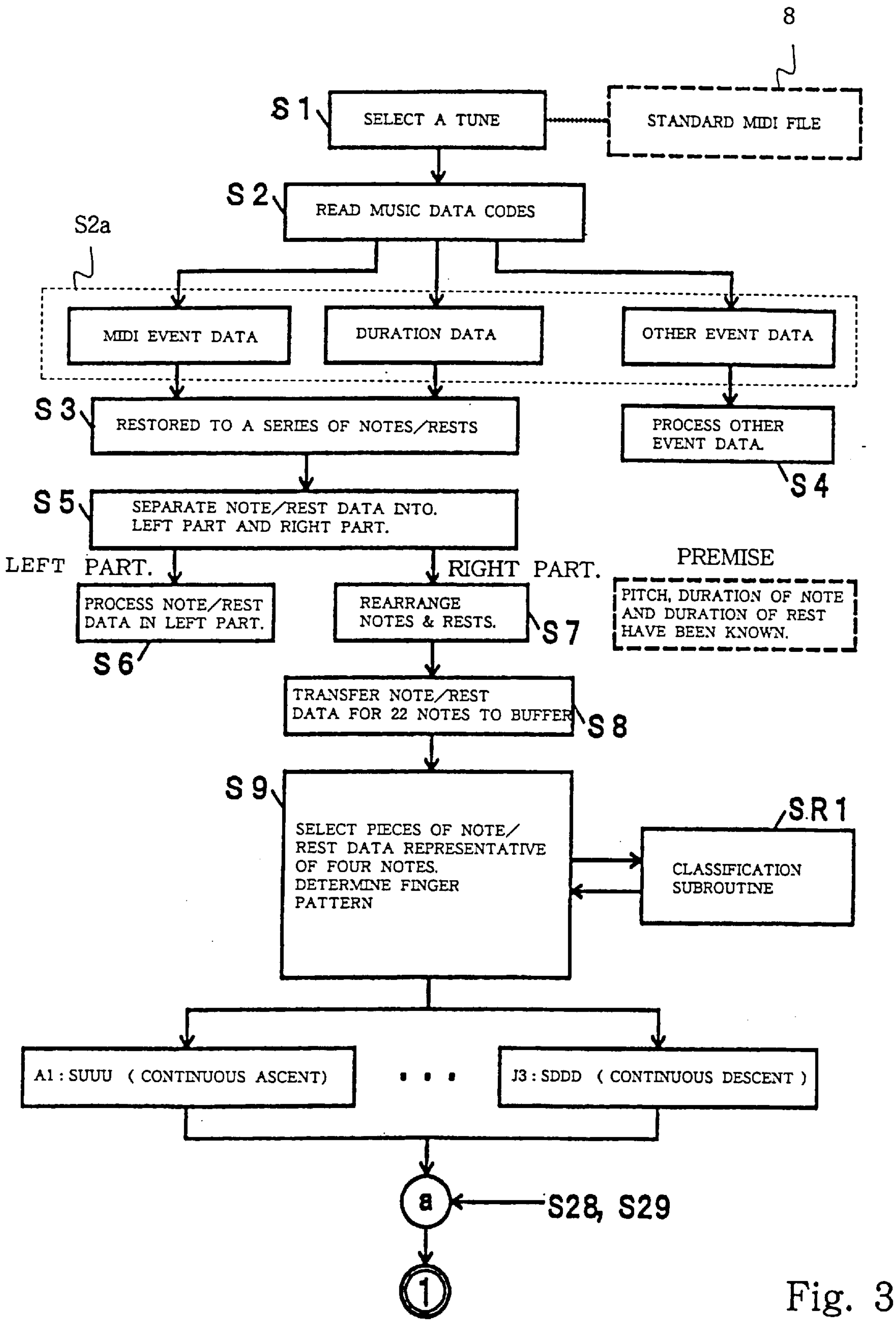
FIGS. 3 to 8 are flowcharts showing a method for guiding fingers of a trainee according to the present invention.
Figure 4:
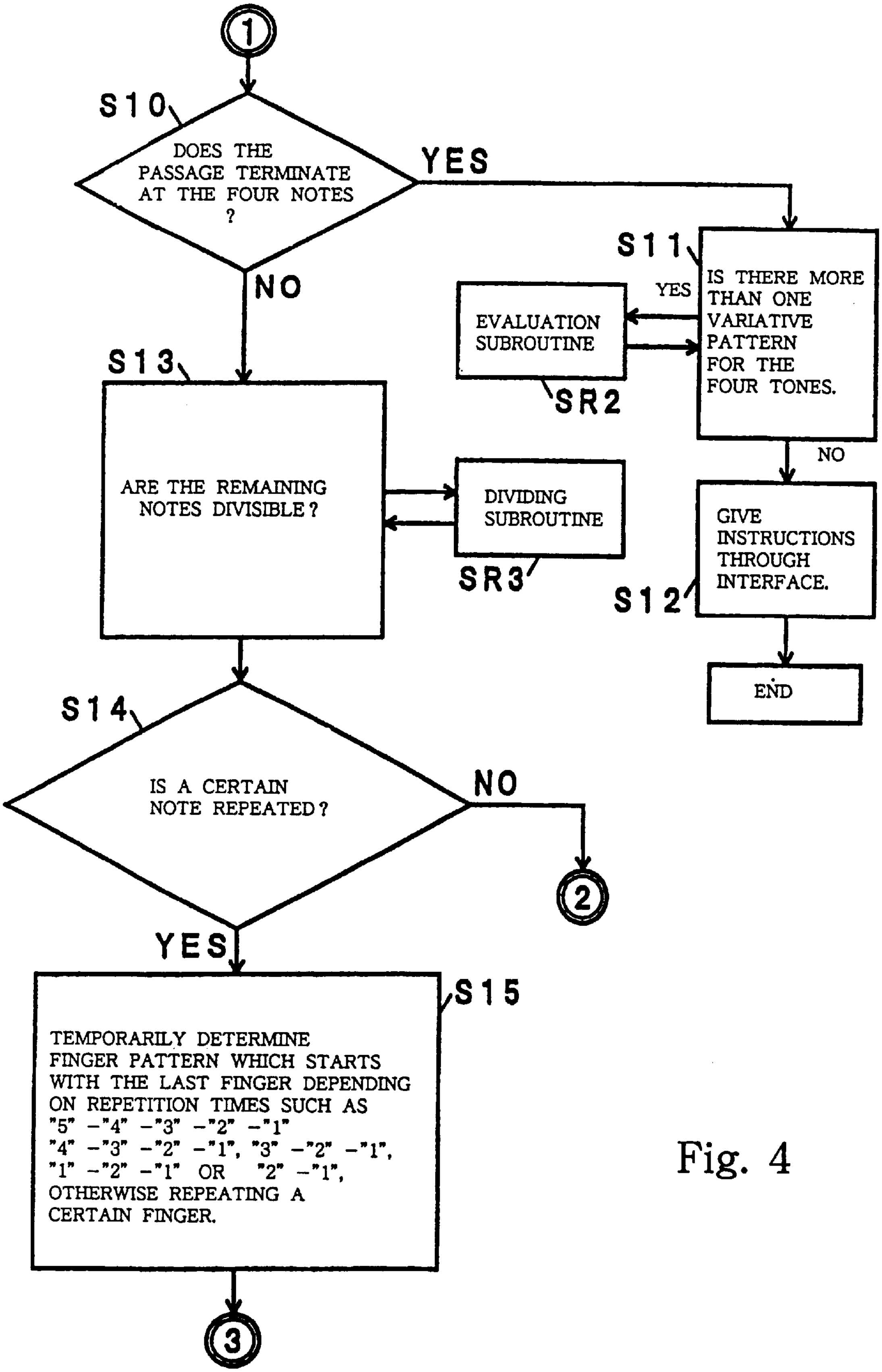
Figure 5:
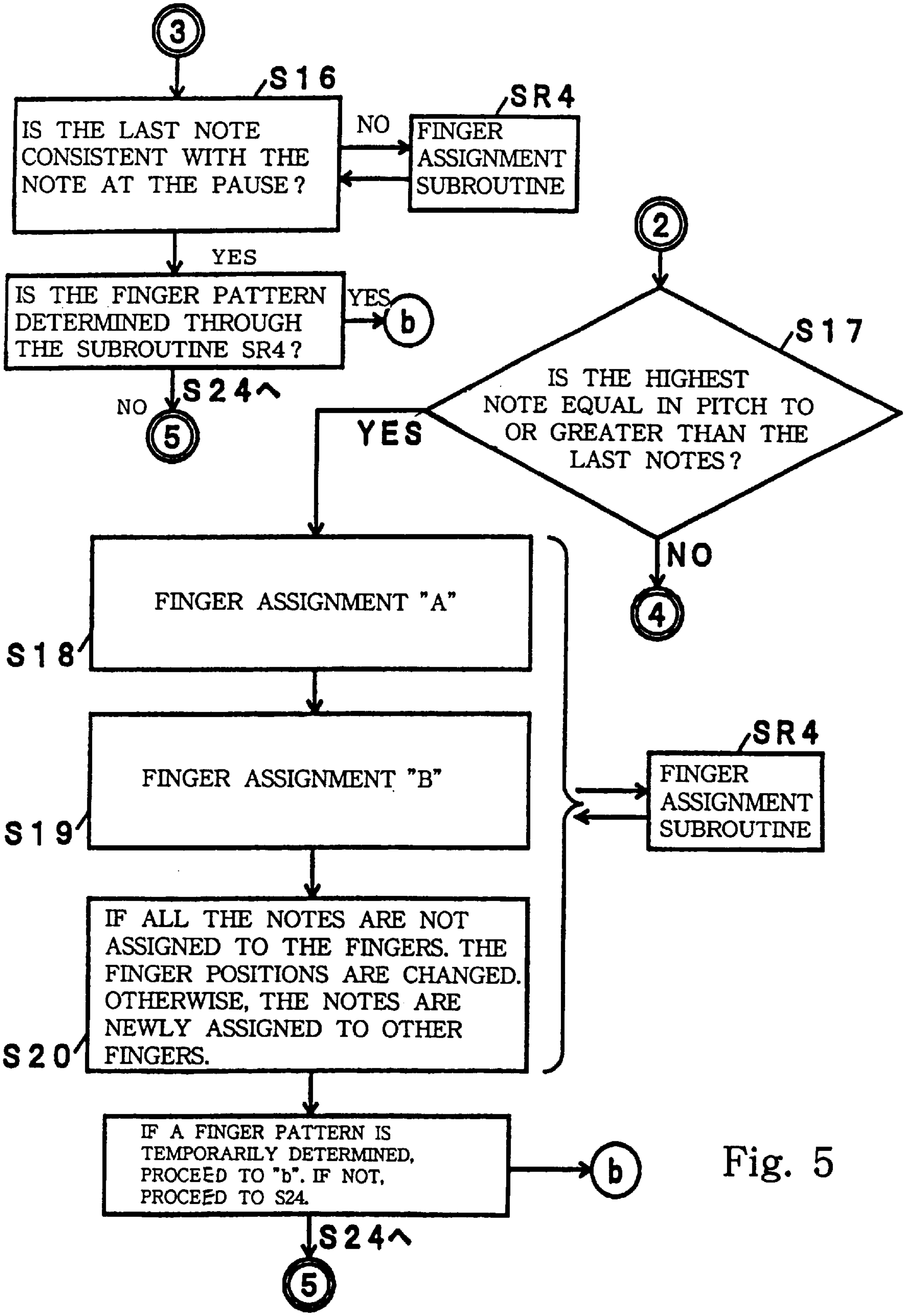
Figure 6:
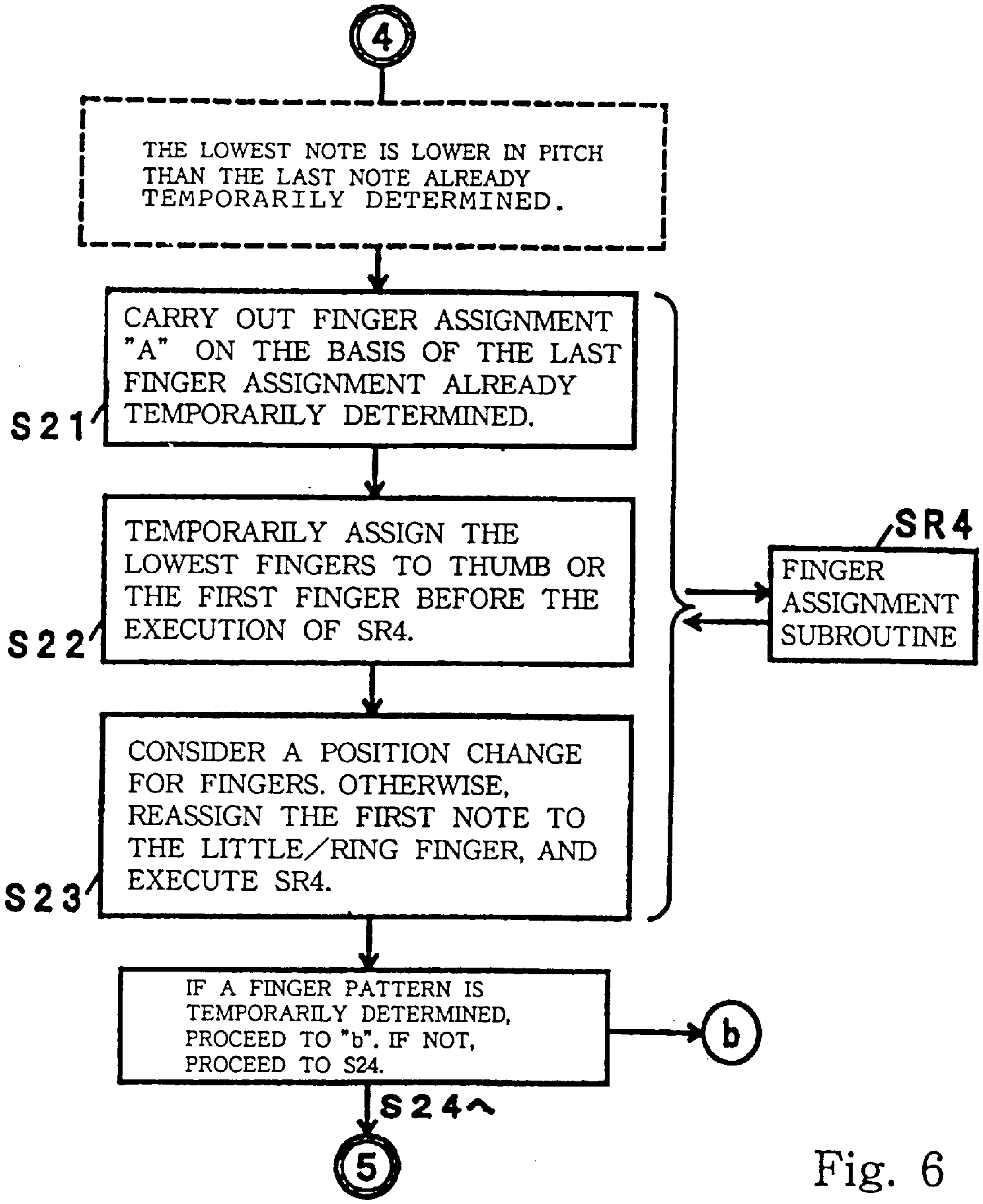
Figure 7:
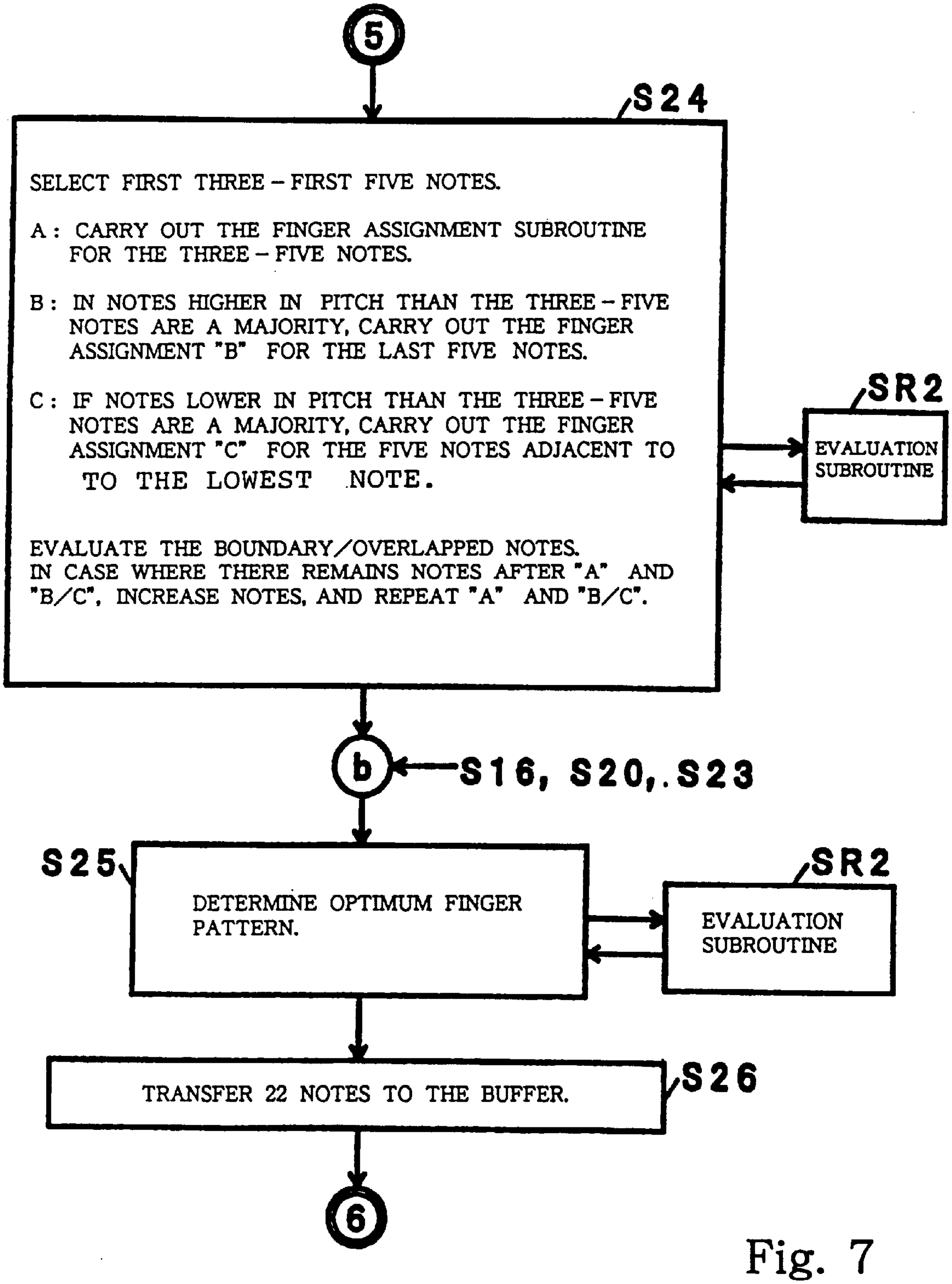
Figure 8:
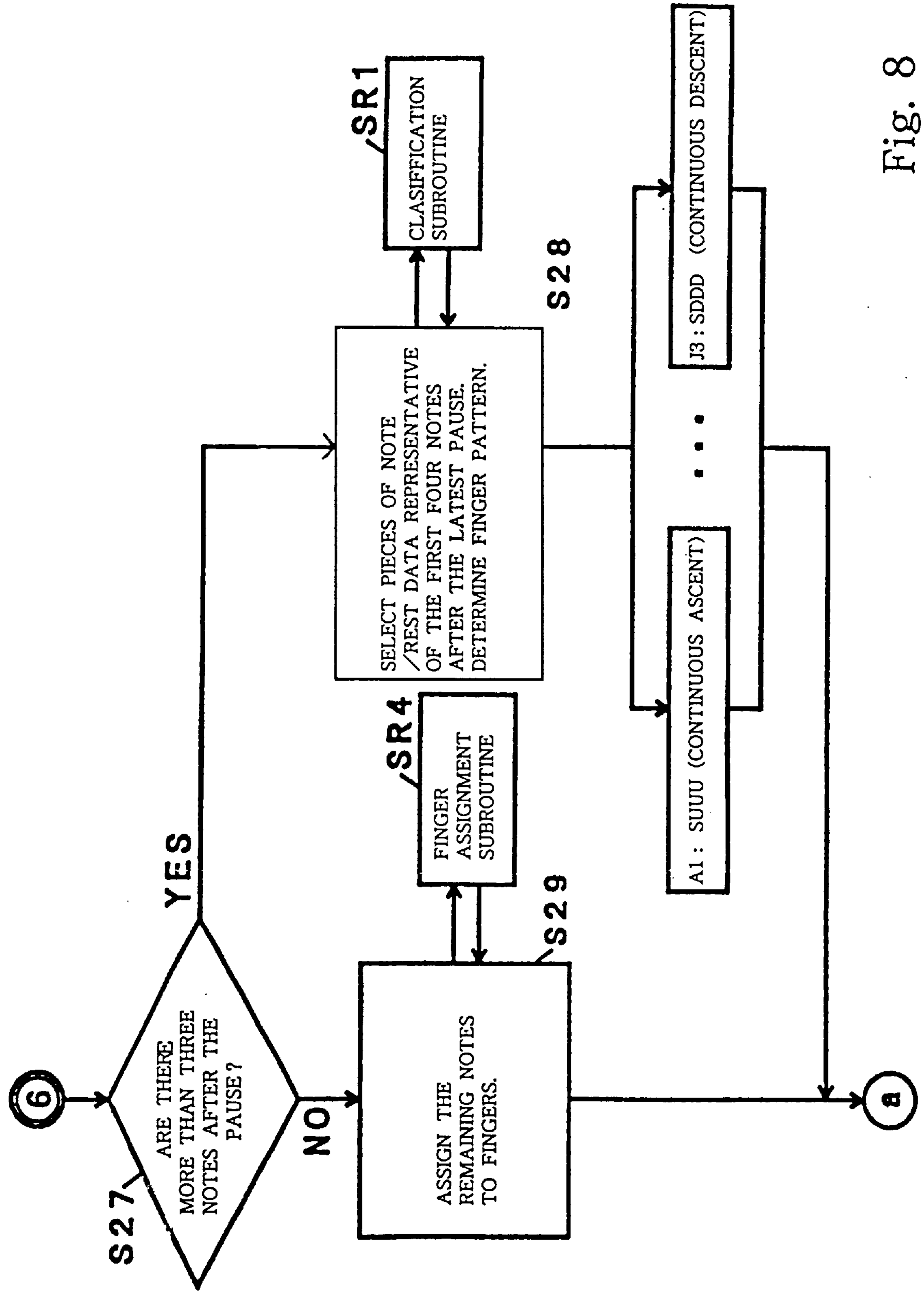

The music performance assisting system 100 is applicable to another kind of keyboard musical instrument such as, for example, an acoustic piano, a silent piano and an automatic player piano. FIG. 2 illustrates a keyboard musical instrument equivalent to a combination of the silent piano and the automatic player piano, and the keyboard musical instrument is accompanied with the music performance assisting system 100. The silent piano is broken down into an acoustic piano, a silent system and an electronic sound generating system, and the automatic player piano is constituted by an acoustic piano and an automatic playing system. In the keyboard musical instrument, an acoustic piano 300 is shared between the silent piano and the automatic player piano, and the silent system shares electronic components such as a central processing unit, memories and sensors 301/302 with the automatic player piano. The silent system further shares the central processing unit and the memories with the music performance assisting system 100. The electronic components form in combination a controller 303 in FIG. 2. The keyboard musical instrument comprises the acoustic piano 300, a silent system 305, an automatic playing system 307, an electronic system 308 and the music performance assisting system 100.

The acoustic piano 300 is a standard upright piano, and the structure of the standard upright piano is well known to skilled person. For this reason, description on the acoustic piano 300 is omitted for the sake of simplicity.

The silent system 305 has a hammer stopper 310. Though not shown in FIG. 2, the hammer stopper 310 is connected to a suitable changeover mechanism, and the changeover mechanism makes the hammer stopper 310 turn as indicated by an arrow. A pianist manipulates the changeover mechanism so as to change the keyboard musical instrument between a silent mode and an acoustic sound mode. The hammer stopper 310 is moved into an orbit of the hammer shank 312 in the silent mode, and is moved out of the orbit in the acoustic sound mode. When a pianist depresses a black key 314 or a white key 316, the associated key action mechanism 318 escapes from the hammer 320, and gives rise to a free rotation of the hammer 320.

If the keyboard musical instrument is in the silent mode, the hammer shank 312 rebounds on the hammer stopper 310 before striking the strings 322, and any acoustic sound is generated from the strings 322. The sensors 302/305 report the current key position and the current hammer position to the controller 303, and the controller 303 produces an audio signal on the basis of the key motion and the hammer motion. The audio signal is supplied to a speaker system 324 and/or a headphone, and the speaker system/headphone 324/326 produce an electronic sound corresponding to the acoustic sound. Thus, the pianist plays a tune on the keyboard musical instrument without acoustic sounds.

On the other hand, if the keyboard musical instrument is in the acoustic sound mode, the hammer 320 strikes the strings 322, and the strings 322 vibrate so as to generate an acoustic sound. Thus, the silent system 305 allows the pianist to choose between the acoustic sounds and the electronic sounds for the tune.

The automatic playing system 307 includes an array of solenoid-operated key actuators 330, and the solenoid-operated key actuators 330 are provided under the rear portions of the black/white keys 314/316, respectively. The controller 303 produces driving signals from music data codes representative of a performance, and selectively supplies the driving signals to the solenoid-operated key actuators 330 associated with the black/white keys 314/316 to be moved. The driving signals energize the solenoid-operated key actuators, and the solenoid-operated key actuators drive the associated black/white keys 314/316 for rotation. The black/white keys 314/316 actuate the associated key action mechanisms 318, and give rise to free rotations of the hammers 320. The hammers 320 strike the associated strings 322, and the strings 322 vibrate so as to generate the acoustic sounds. Thus, the automatic playing system 307 moves the black/white keys 314/316 without fingering on the black/white keys 314/316. However, while the automatic playing system 307 is standing idle, a pianist plays a tune on the black/white keys 314/316.

The music performance assisting system 100 guides the fingering as described hereinbefore.

Software

Outline

Description is hereinbelow made on the computer programs with reference to the drawings. Although the music performance assisting system 100 notifies the use of fingers of the right hand to a trainee in the following description, the music performance assisting system 100 also guides the fingers of the left hand in a similar manner to the right hand. However, the guide is focused on the right hand, only.

FIGS. 3, 4, 5, 6, 7 and 8 illustrate a method for guiding fingers of a trainee embodying the present invention. The method starts with selection of a tune from the standard MIDI file as by step S1. The central processing unit 1 reads a set of music data codes representative of the selected tune from the external memory unit 8 to a data storage area in the random access memory 4 as by step S2.

The set of music data codes represent pieces of music data information, which are grouped into three classes, i.e., MIDI event data representing the note-on event, the note-off event, a pitch and a touch, duration representing a time period between two events and other event data such as a meta-event and a sysex event. A piece of music data information represents a tempo, and forms part of the meta-event data. If the piece of music data information represents another tempo, the keyboard musical instrument changes the tempo in the playback. The time period between two events is hereinbelow referred to as "delta time". The MIDI event data and the data representative of the delta times are called as "SMF data".

The central processing unit 1 extracts the music data codes representative of the MIDI event data and the duration data from the set of music data codes as by step S2*a*. The MIDI codes do not have any piece of music data information corresponding to a note, because the note represents a duration of a single sound as well as the pitch thereof. For this reason, the central processing unit restores the MIDI event data and the duration data to a series of notes and rests as by step S3. The central processing unit determines each of the notes on the basis of the note-on event for a certain pitch name, the note-off event for the certain pitch name and the delta time therebetween. If another note-on/note-off event is inserted between the note-on event and the note-off event, more than one delta time exists, and the total of more than one delta time gives the duration between the note-on event for the certain pitch name and the corresponding note-off event. If there is a time interval between two notes, the central processing unit assumes that a rest is inserted between the notes. The series of notes are stored in the random access memory as note/rest data. The central processing unit 1 processes the other event data as by step S4. A tempo is determined during the data processing at step S4.

Subsequently, the central processing unit separates the note/rest data into the left part and the right part as by step S5. A typical method for the separation into the left part and the right part is disclosed in Japanese Patent Publication of Unexamined Application No. 3-35581. The notes in the left part and the other notes in the right parts are assigned to the fingers of the left hand and the fingers of the right hand, respectively. The note/rest data in the left part are processed as by step S6 as similar to the note/rest data in the right part described hereinlater.

The central processing unit 1 rearranges the notes and the rests for the right part as by step S7. The notes and the rests in the left part have been deleted from the series of notes and rests for both hands. The central processing unit 1 may insert a rest into the series of notes/rests for the right hand, and vary another rest. Thus, the interval, the duration of the note and the duration of the rest are determined for the right hand.

Classification of Series of Notes

Figure 9:
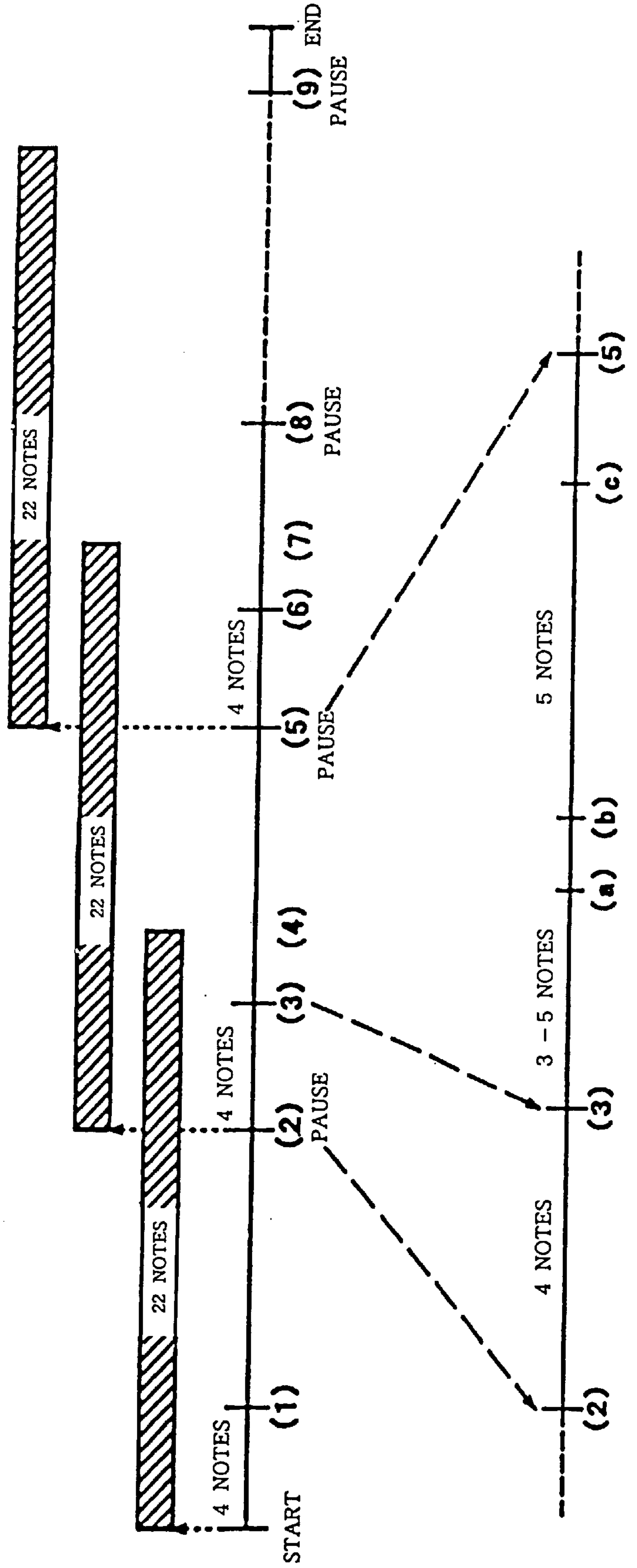
FIG. 9 is a timing chart showing a data processing for guiding a trainee in fingering.
Figure 10:
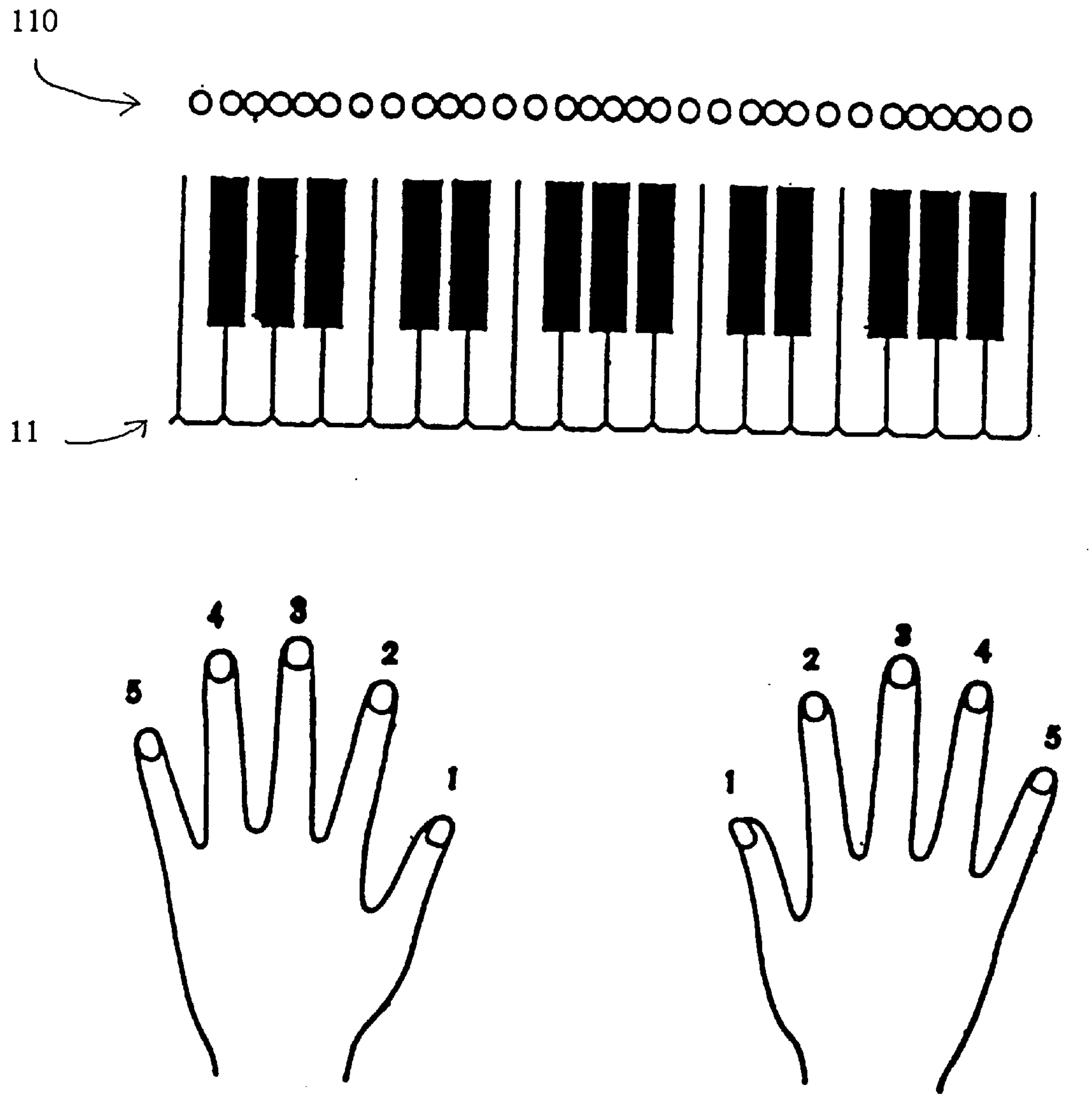
FIG. 10 is a schematic view showing relation between the fingers and numbers assigned thereto.

Firstly, the central processing unit 1 fetches pieces of note/rest data representative of the first notes of the series such as the first twenty-two notes, and transfers the pieces of note/rest data from the data storage area to a working storage area in the random access memory 4 serving as a data buffer as by step S8. The central processing unit 1 proceeds to step S9. The central processing unit 1 extracts pieces of note/rest data representative of the first four notes from the pieces of note/rest data stored in the buffer as by step S9, and determines one of the note patterns for the four notes through a classification subroutine SR1. Subsequently, the central processing unit 1 temporarily determines a finger pattern appropriate to the note pattern. The finger pattern means an order of fingers to be used for the note pattern. This is corresponding to a data processing from "START" to the position before (1) in figure 9. The fingers are numbered as shown in FIG. 10. Two examples of the classification subroutine SR1 will be described hereinlater in detail with reference to FIGS. 11 to 38 and FIGS. 39 to 65.

More than one finger pattern may be temporarily determined for the first four notes. In this situation, one finger pattern is selected from more than one finger pattern through an evaluation subroutine SR2 shown in FIGS. 66 and 67.

As described hereinbefore, the fingers are numbered as shown in FIG. 10. The thumb, the first finger, the middle finger, the ring finger and the little finger are numbered as "1", "2", "3", "4" and "5", respectively. If pieces of assist data information represents "1"-"2"-"3"-"4", the musical performance assisting system 100 notifies the use of fingers "thumb", "the first finger", "the middle finger" and "the ring finger". In FIG. 10, optical indicators 110 are installed along the keyboard 11, and are respectively assigned the black/white keys of the keyboard 11. The controller 6 selectively energizes the optical indicators 110 synchronism with the voice instructions or the activation of vibrators also assigned to the black/white keys. The optical indicator 110 may selectively radiate five colored light beams depending upon the finger to be used for depressing the associated black/white key. Thus, the interface 12 notifies the black/white keys to be depressed through more than one way. Although no further description is made on how to teach a trainee the fingering, the methods disclosed in Japanese Patent Publication of Unexamined Nos. 10-365712 and 11-13418 are available for the trainee.

Final Evaluation

Upon completion of the temporary determination, the central processing unit 1 proceeds to step S10, and checks the pieces of note/rest data for the right hand to see whether or not other notes follow the notes. The central processing unit 1 skips step S10 at the first execution. If there is not any note, the answer at step S10 is given affirmative, and the central processing unit 1 checks the random access memory 4 to see whether or not more than one finger pattern is stored for any series of notes as by step S11. If more than one finger pattern has been selected for the series of notes, the central processing unit 1 evaluates the more than one finger pattern, and determines the optimum finger pattern for the series of notes through the evaluation subroutine SR2.

When the central processing unit 1 completes the selection of the finger pattern for all parts of the selected tune, the central processing unit 1 obtains all pieces of assist data information for the selected tune, and sequentially transfers the pieces of assist data information to the controller 6 along the tune. Then, the controller 6 instructs the trainee through the interface 12 as by step S12. The interface radiates the light beam, and generates synthetic voice like "one", "two", "one", "three", . . . The central processing unit 1 further supplies the music data codes to the tone generator 9 in synchronism with the transfer of the pieces of assist data information. The tone generator 9 produces the audio signal from the pieces of music data information, and the sound system 16 radiates the electronic sounds corresponding to the black/white keys to be depressed by the trainee. Thus, the voice instructions as well as the electronic sounds guide the trainee in the fingering. As described hereinbefore, the image of the fingers are further produced on the screen of the visual display unit, and are varied like a motion picture so as to teach the use of the fingers on the screen. When the central processing unit 1 transfers the last piece of assist data information to the controller 6, the central processing unit 1 finishes the computer program at "END".

Punctuation

If there are pieces of note/rest data information representative of remaining notes after the four notes, the answer at step S10 is given negative, and the central processing unit 1 checks the pieces of note/rest data information to see whether or not the remaining notes are divisible as by step S13. The remaining notes form part of the twenty-two notes selected at step S8. The computer program branches into a dividing subroutine SR3. The dividing subroutine SR3 will be described in detail with reference to FIG. 68. The central processing unit 1 tries to find appropriate punctuation such as bar-lines of a music score in the series of remaining notes. The position to divide the remaining notes is hereinbelow referred to as "pause" (see FIG. 9).

Temporary Finger Assignment for Remaining Notes

Upon completion of the punctuation, the central processing unit 1 repeats steps S14 to S24 in order to temporarily determine the finger pattern for the remaining notes. First, the central processing unit temporarily determines the finger pattern for the notes from the position (1) to the pause (2) (see FIG. 9). As described hereinbefore, the central processing unit 1 has processed the pieces of note/rest data information for the first four notes of the series of twenty-two notes. The note at the next position is the fifth note. However, the central processing unit 1 may process pieces of note/rest data information representative of the first five notes or the first six notes (see FIG. 12, A111 and A112). In this case, the note at the next position is the sixth note or the seventh note. Nevertheless, the note at the next position is simply referred to "fifth note". Therefore, the term "fifth note" does not mean the fifth note next to the first four notes at all times.

The central processing unit 1 temporarily determines the finger pattern for the notes from position (1) to the pause (2), then temporarily determining the finger pattern for the notes from the fifth notes of the next series of twenty-two notes, which are counted from the pause (2), to the next pause, i.e., from the note at position (3) to the pause (5), thereafter, from note at position (6) to pause (8). In this way, the central processing unit 1 temporarily determines the finger pattern for each series from the fifth note to the next pause. In the following description, a series of notes from the fifth note to the next pause is referred to as "note group". FIG. 9 shows at least three note groups. The first note group contains the notes from position (1) to the pause (2), the second note group has the notes from position (3) to the pause (5), and the third note group includes the notes from position (6) to the pause (8).

Data Processing for Repeated Note

In detail, the central processing unit 1 checks the note groups to see whether or not a certain note is repeated as by step S14. The repetition of a certain note means that a trainee is expected to repeatedly depress a black/white key. If the answer at step S14 is given affirmative, the central processing unit 1 takes how many times the note is to be repeated into account, and temporarily determines the finger pattern for the repetition as by step S15. The finger pattern starts with the same finger as the finger used for the last note, i.e., the fourth note of the first four notes (see step S9) temporarily determined or the finger next thereto, and the finger number is varied as "5"-"4"-"3"-"2"-"1", "4"-"3"-"2"-"1", "3"-"2"-"1", "1"-"2"-"1", or "2"-"1". Otherwise, a finger is simply repeated. If the finger used for the last note, i.e., the fourth note is numbered as "5", the finger pattern is expressed as "5"-"4"-"3"-"2"-"1"-"5"- or "4"-"3"-"2"-"1"-"4". If the finger used for the last note is numbered as "4", the finger pattern is expressed as "4"-"3"-"2"-"1"-"4"- or "3"-"2"-"1"-"3"-. If the finger used for the last note is numbered as "3", the finger pattern is expressed as "3"-"2"-"1"-"3"- or "2"-"1"-"2"-. If the finger used for the last note is numbered as "2", the finger pattern is expressed as "2"-"1"-"2"- or "1"-"2"-"1". If the finger used for the last note is numbered as "1" and the last note is repeated more than three times, the finger pattern is expressed as "3"-"2"-"1"-"3"-. If the repetition is twice, the finger pattern is expressed as "3"-"1"-"3"-, "2"-"1"-"2" or "3"-"2"-"3". For the left hand, the finger pattern is vice versa.

Upon completion of the temporary determination of the finger pattern for the repetition, the central processing unit 1 compares the last note with the note at the pause to see whether or not they are consistent as by step S16. If the last note is inconsistent with the note at the pause, a note is inserted between the last note and the note at the pause, and the computer program branches to a finger assignment subroutine SR4. An example of the finger assignment subroutine SR4 will be described in detail with reference to FIGS. 69 and 70. The central processing unit 1 tries to temporarily determine a finger pattern for the repetition. If the central processing can not determine the finger pattern through the finger assignment subroutine SR4, the central processing unit 1 proceeds to step S24.

If the last note is consistent with the note at the pause, the temporary determination at step S15 is final, and the central processing unit 1 directly proceeds to step S25.

Data Processing for Highest Note

On the other hand, if any repetition is not found in the series of notes from the fifth note to the note at the pause, the answer at step S14 is given negative, and the central processing unit 1 compares the highest note of the note group with the last note already temporarily determined to see whether or not the highest note is equal in pitch or greater than the last note already temporarily determined as by step S17. If the highest note is equal in pitch to or greater than the last note already temporarily determined, the answer at step S17 is given affirmative, and the central processing unit 1 carries out a finger assignment "A" as by step S18. In the finger assignment "A", the central processing unit 1 determines the finger pattern for the notes through the finger assignment subroutine SR4 on the basis of the last note already temporarily determined. The rules of the finger assignment "A" are shown in FIG. 69.

Figure 69:
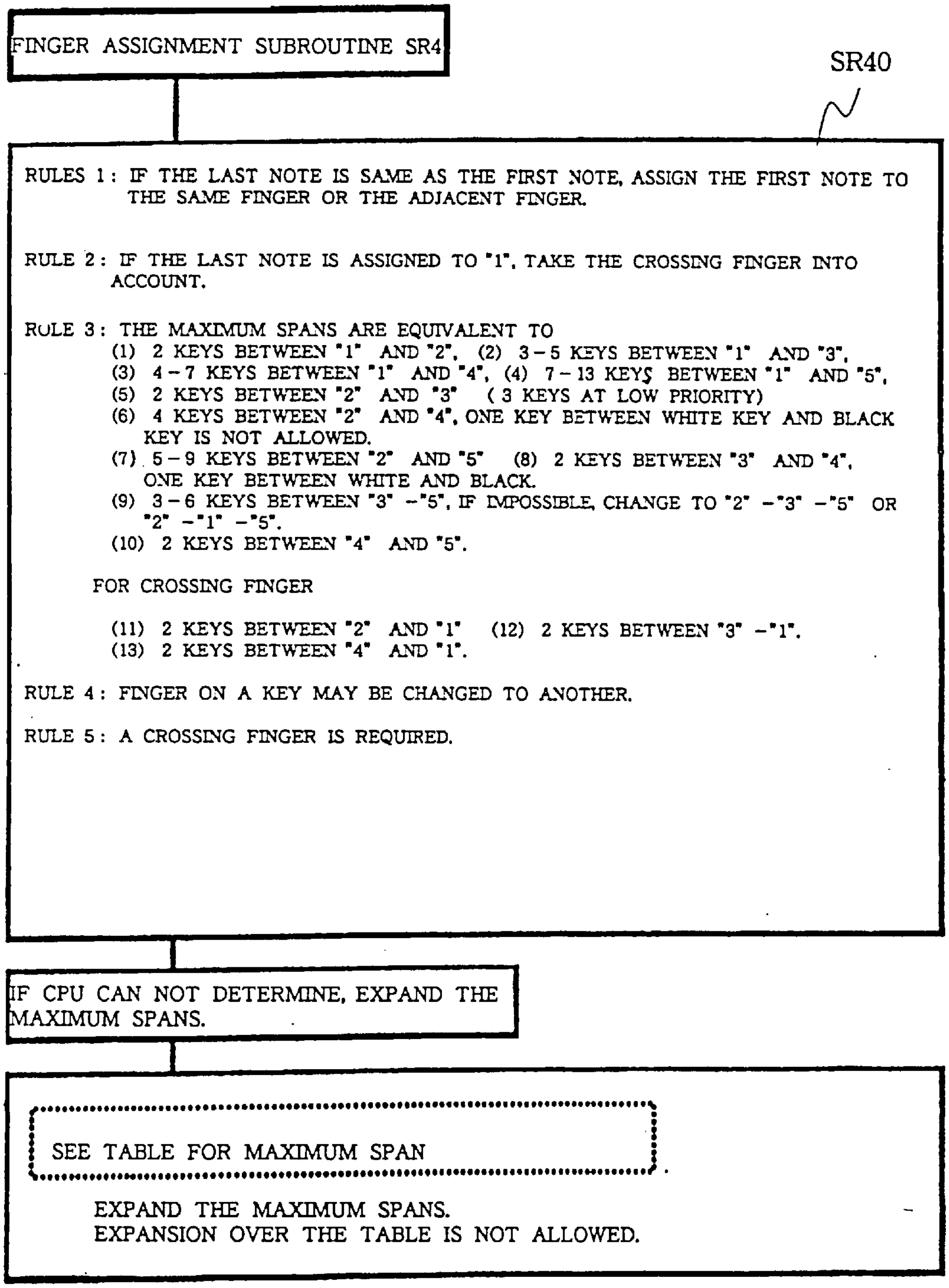
FIG. 69 is a view showing a finger assignment subroutine.

If the central processing unit 1 can not temporarily determine the finger pattern in accordance with the rules shown in FIG. 69, the central processing unit 1 carries out a finger assignment "B" as by step S19. In the finger assignment "B", the central processing unit 1 temporarily assigns the highest note to the ring finger or the little finger, and proceeds to the finger assignment subroutine SR4 so as to selectively assign the other notes of the finger group to the other fingers. If the highest note is assigned to the little finger, the notes on the left side of the highest note are sequentially assigned to the ring finger, the middle finger, the first finger and the thumb.

Subsequently, the central processing unit 1 proceeds to step S20. When central processing unit 1 carried out the finger assignment at step S18 or S19, the central processing unit 1 may not assign some notes to any finger without the position change. The central processing unit 1 changes the positions of the fingers. Otherwise, the central processing unit 1 cancels the temporary finger assignment. Thereafter, the central processing unit 1 newly assigns the first note of the note group to the thumb and the first finger, and temporarily determines the finger pattern through the finger assignment subroutine SR4.

For example, the pieces of note/rest data information are assumed to indicate that a series of notes is simply ascent such as "C→D→E→F→G→A". The highest note is "A ", and is temporarily assigned to the little finger at step S19. The notes "G", "F", "E" and "D" are temporarily assigned to the ring finger, the middle finger, the first finger and the thumb, respectively. The remaining note "C" is not assigned to any finger. In this situation, the central processing unit 1 cancels the previous finger assignment. The first note "C" is newly assigned to the thumb, and temporarily determines the finger pattern as "thumb"→"first finger"→"middle finger"→[change of finger position]→"thumb"→"first finger"→"middle finger" at step S20. Upon completion of the temporary determination, the central processing unit 1 proceeds to step S26. If all the notes are not assigned to the fingers without a position change, the central processing unit 1 proceeds to step S24.

Data Processing for Lowest Note

If the highest note is less in pitch than the last note already temporarily determined, the answer at step S17 is given negative. Then, the central processing unit 1 searches the pieces of note/rest data for the lowest note, and compares the last note of the first four notes with the lowest note to see whether or not the lowest note is less in pitch than the last note already temporarily determined. If the lowest note is lower in pitch than the last note, the central processing unit 1 proceeds to step S21. The central processing unit 1 executes the finger assignment subroutine SR4 on the basis of the last finger assignment already temporarily determined as finger assignment A (see FIG. 69) at step S21.

If the central processing unit 1 can note assign the notes of the note group to the fingers under the conditions shown in FIG. 69, the central processing unit 1 proceeds to step S22. The central processing unit 1 carries out finger assignment "C". In detail, the central processing unit 1 determines the lowest note, which means that the note has the pitch lower than the other notes of the same group, and temporarily assigns the lowest note to the thumb and the first finger. Then, the central processing unit 1 enters the finger assignment subroutine SR4 so as to selectively assign the other notes to the fingers.

Even though the central processing unit temporarily assigns the notes of the group to the fingers at step S21 or S22, a note or notes may not be assigned to any finger. In this situation, the central processing unit 1 proceeds to step S23. The central processing unit 1 considers a position change for the fingers, or reassigns the first note of the note group to the little finger and the ring finger before the execution of the finger assignment subroutine SR4 at step S23.

Data Processing for Non-categorized Note Pattern

If any finger pattern is not determined at step S16, S20 or S23, the central processing unit 1 proceeds to step S24 as described hereinbefore. This means that the note group is not categorized into the note pattern judged at steps S14 and S17. In this situation, the central processing unit 1 processes the pieces of note/rest data at step S24 as follows.

1. The central processing unit 1 selects the first three notes to the first five notes from the note group, and carries out the finger assignment subroutine SR4 for the first three–five notes on the basis of the last note already temporarily determined as similar to the finger assignment "A".
2. In case where notes higher in pitch than the first three–five notes are a majority in the remaining notes of the note group, the central processing unit 1 determines the highest note, and temporarily assigns the last five notes containing the highest note to the fingers as similar to the finger assignment "B". The central processing unit 1 assigns the highest note to the little finger and the ring finger, and, thereafter, assigns the remaining notes to other fingers toward the first three–five notes through the finger assignment subroutine SR4.
3. In case where notes lower in pitch than the first three–five notes are a majority in the remaining notes of the note group, the central processing unit 1 determines the lowest note, and temporarily assigns the last five notes containing the lowest note to the fingers as similar to the finger assignment "C". The central processing unit 1 temporarily assigns the lowest note to the thumb and the first finger, and, thereafter, assigns the remaining notes to other fingers toward the first three–five notes through the finger assignment subroutine SR4.
4. The boundary between the first three–five notes and the next five notes or the notes overlapped between the first three–five notes and the next five notes are evaluated through the evaluation subroutine SR2.
5. In case where there remains notes after the finger assignment "A" and the finger assignment "B"/"C", the central processing unit 1 increases the notes, and repeats the finger assignment "A" and the finger assignment "B"/"C". Upon completion, all the notes are to be assigned to the fingers.

The data processing at step S24 is described in detail with reference to FIG. 9. Assuming now that the notes from the fifth note at the position (3) to the pause (5) are subjected to the data processing, the central processing unit 1 selects the first three–five notes. The first three–five notes occupy the passage from the position (3) to position (a). The central processing unit 1 temporarily assigns the first three–five notes to the fingers through the finger assignment "A". Subsequently, the central processing unit 1 checks the remaining notes from position (a+1) to the pause (5) to see whether or not notes higher in pitch than the note at the position (a) is more than notes lower in pitch than the notes at the position (a). If the higher notes are a majority, the central processing unit 1 determines the highest note. The highest note is assumed to be at position (c). The central processing unit 1 selects five notes from the position (c) toward the position (a). The fifth note is assumed to be at position (b). The central processing unit 1 assigns the notes from position (b) to position (c) to the five fingers through the finger assignment "B". On the other hand, if the lower notes are a majority, the central processing unit 1 determines the lowest note. The lowest note is assumed to be at position (c), the central processing unit 1 assigns the five notes from position (b) to position (c) to the five fingers through the finger assignment "C".

If the position (a) is identical with the position (b) or the position (a) is on the right side of the position (b), the central processing unit 1 determines the optimum finger pattern through the evaluation subroutine SR2.

On the other hand, if there remains a note or notes between the position (a) and the position (b), the central processing unit 1 increases the notes between the position (3) and the position (a) or the notes between the position (b) and the position (c), and temporarily assigns the notes to the five fingers through the finger assignment "A" or the finger assignment "B"/"C".

When the central processing unit 1 completes the notes between the position (3) and the position "c", a note or notes may be left between the position "c" and the pause (5). In this situation, the central processing unit 1 repeats the finger assignment "A" for the remaining note or notes.

Evaluation

Upon completion of the finger assignment for the notes from the position (3) to the pause (5), the central processing unit 1 proceeds to step S25. The central processing unit 1 executes the evaluation subroutine SR2 at step S25. If more than one finger pattern has been already temporarily determined for a note group, the central processing unit 1 evaluates more than one finger pattern, and determines the optimum finger pattern for the note group.

Data Processing for Next 22 Notes

Subsequently, the central processing unit 1 newly stores pieces of note/rest data representative of twenty-two notes in the buffer as by step S26. The twenty-two notes occupy the passage from the position next to the latest pause toward the end of the tune. For example, the central processing unit 1 is assumed to have already stored the twenty-two notes from the pause (2) to position (7). The central processing unit 1 transfers the notes from the pause (5) to the twenty-second position to the buffer.

Upon completion of the data transfer, the central processing unit 1 checks the pieces of note/rest data to see whether Or not there remain more than three notes after the latest pause as by step S27. If there are more than three notes, the answer at step S27 is given affirmative, and the central processing unit 1 proceeds to step S28.

The central processing unit 1 selects pieces of note/rest data representative of the first four notes after the latest pause at step S28 through the classification subroutine SR1. The first four notes occupy the passage from the pause (2) to the position (3) after the first data transfer and the passage from the pause (5) to the position (6) after the second data transfer. If more than three notes occupy the passage from the pause (9) to the end, the central processing unit 1 executes the classification subroutine SR1 for the first four notes, and determines the finger pattern for the four notes or six notes.

Thereafter, the central processing unit 1 returns to step S10. When the central processing unit 1 executed the classification subroutine SR1 for the four notes occupying the passage from the pause (9) to the end, the answer at step S10 is given affirmative, and the central processing unit 1 executes step S11, the evaluation subroutine SR2 and step S12, and completes the computer software at "END".

On the other hand, if the remaining notes are less than four, the answer at step S27 is given negative, and the central processing unit 10 proceeds to step S29. The central processing unit 1 temporarily assigns the remaining notes to the fingers through the finger assignment SR4. Upon completion of the finger assignment, the central processing unit 1 returns to step S10. If the remaining notes occupy the passage from the pause (9) to the end, the answer at step S10 is given affirmative, and the central processing unit 1 executes step S11, the subroutine SR12 and the step S12.

Thus, the central processing unit 1 reiterates the loop consisting of steps S1 to S29, and assigns all the notes of the tune to the five fingers. Description is hereinbelow made on the subroutines.

Classification Subroutine

The computer program branches to the classification subroutine SR1 at step S9 or S29. The central processing unit 1 checks the pieces of note/rest data representative of four notes to see what note pattern is applied to the four notes. There are twenty-seven note patterns A1/A2/A3, B1/B2/B3, C1/C2/C3, D1/D2/D3, E1/E2/E3, F1/F2/F3, G1/G2/G3, H1/H2/H3 and J1/J2/J3 (see FIG. 11). In the twenty-seven note patterns, the four kinds of status "S", "U", "D" and "R" mean "start", "up", "down" and "repeat". A note in the status "U" is higher in pitch than the previous note. A note in the status "D" is lower in pitch than the previous note. A note in the status "R" is equal in pitch to the previous note. The status "S" is assigned to the first note at all times, and the three kinds of status "U", "D" and "R" are selectively assigned to the remaining three notes. When the status "U" is assigned to the remaining three notes, the pitch is stepwise increased from the first note to the fourth note, and the four notes are assigned the note pattern A1. On the other hand, when the status "D" is assigned to the remaining three notes, the pitch is stepwise decreased from the first note to the fourth note, and the four notes are assigned the note pattern J3. If the second note to the fourth note are identical with the first note, the four notes are represented as "SRRR", and are assigned the note pattern E1.

When the note pattern is determined, the central processing unit 1 temporarily assigns the notes to the fingers in accordance with the rules shown in FIGS. 12 to 38 or FIGS. 39 to 65.

FIRST EXAMPLE

First, the rules shown in FIGS. 12 to 38 are described hereinbelow.

Data Processing for Note Pattern A1

Figure 12:
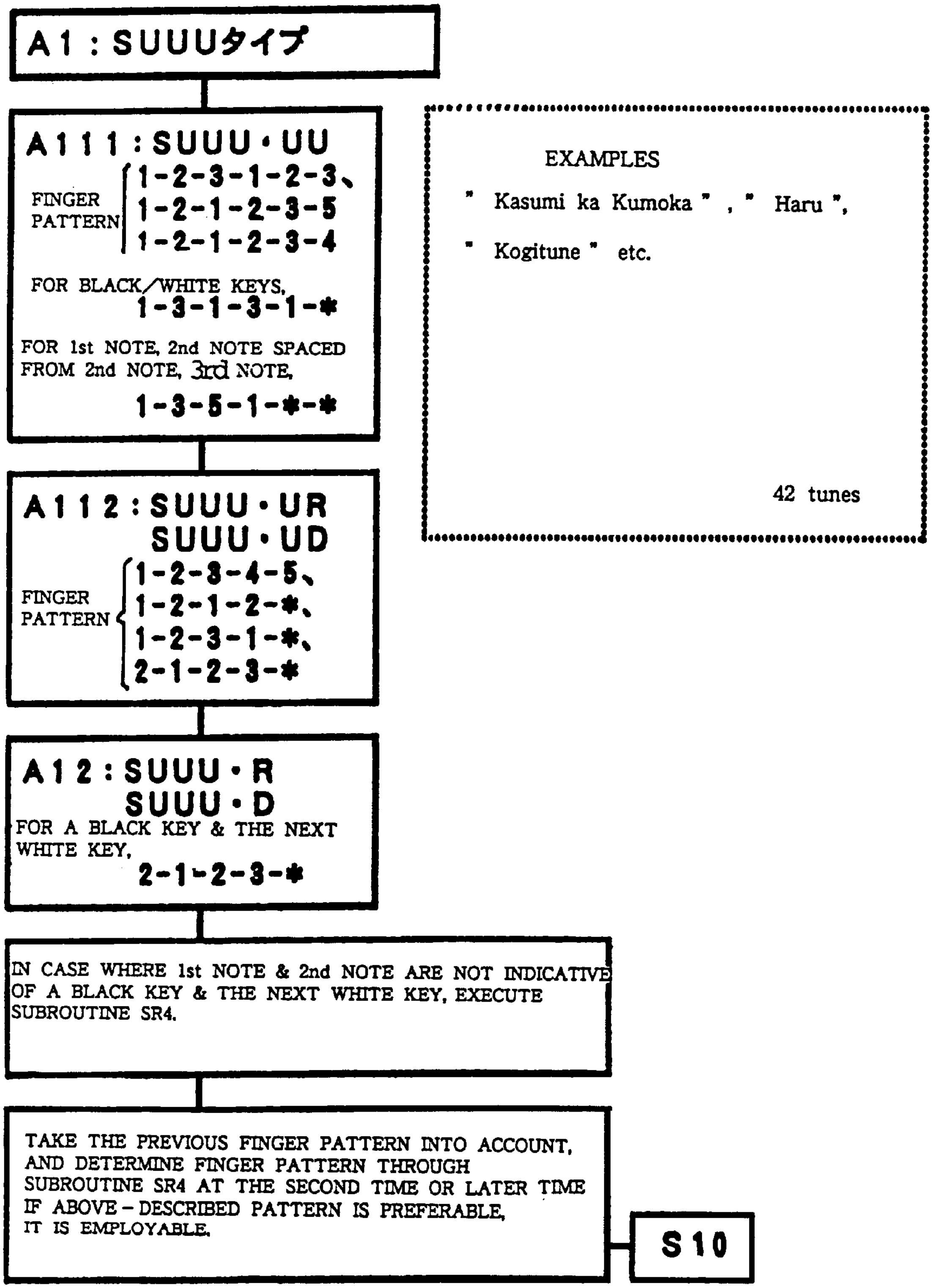

FIG. 12 illustrates the finger assignment for the note pattern A1. The note pattern A1 is represented as "SUUU", and passages categorized in the note pattern A1 are, by way of example, found in the following tunes, which are edited in the book entitled as "*Youchien no Tomo* 4" (Friends in Kindergarten book 4). Page 14, "*Kasumika Kumoka* (Mist or Cloud)". Page 16, "*Haru* (Oh Suzanne)". Page 69, "*Kogitune* (Little Fox)". Page 44, "*Jyugoya Otsukisan* (Full Moon)". Page 102, "*Yubi no Uta (Song of Fingers)*". Page 48, "*Hamachidori* (Plover on Shore)". Page 116, "*Akaikutu* (Red Shoes)". Page 36, "*Kodomo no Natu* (children's summer)". Other passages are further found in "Old Black Joe" (see Pretty Pianist, page 27), "*Tumugiuta* (Spinning Song)" (ditto, page 96), Beyer Nos. 1–5, 1–7, 1–8, 1–10, 1–19, 3, 4, 5, 6, 7, 12, 14, 15, 35, 44, 46, 47, 62, 65, 74, 81, 82, 86, 90, 97, 101, 105 and 106, "*Kobito ga Mori in Tatteiru* (Pigmy who stands in Forest)" (see, Beyer, vol. 2, page 40), "Spring Song" composed by Mendelssohn (see Pretty Pianist, page 90), "*Kasuba no Onna* (Woman in Casbah)" (see Night Ballads, page 102 ) and "*Hakodate no Onna* (Woman in Hakodate city)" (ditto, page 240).

The note pattern A1 is broken down into sub-patterns "A111", "A112" and "A12". When the note next to the four notes is represented as "U", the passage is categorized in the sub-pattern "A111" or "A112". On the other hand, if the note next to the four notes is represented as "R" or "D", the passage is categorized in the sub-pattern "A12". The sixth note makes the passage branch to the sub-pattern "A111" or "A112". Namely, when the sixth note is "U", the passage is categorized in the sub-pattern "A111". On the other hand, if the sixth note is "R" or "D", the passage is categorized in the sub-pattern "A112".

When the six notes are expressed as "SUUU. UU", the central processing unit 1 categorizes the passage in the sub-pattern "A111", and assigns the six notes to the finger pattern of "1"-"2"-"3"-"1"-"2"-"3", "1"-"2"-"1"-"2""3"-"5"and "1"-"2"-"1"-"2"-"3"-"4". However, in case where the black keys are altered with the white keys at intervals of semitone, the central processing unit 1 assigns the notes to the finger pattern of "1"-"3"-"1"-"3"-"1"-"*". The mark "*" represents a finger determined through the evaluation subroutine shown in FIG. 66 depending upon the next note. If the first note and the second note are spaced from the second note and the third note, respectively, the central processing unit 1 assigns the notes to the finger pattern of "1"-"3"-"5"-"1"-"*"-"*". Thus, there is a possibility to assign the notes to more than one finger pattern. If more than one finger pattern is assigned, the central processing unit 1 selects the optimum finger pattern through the evaluation subroutine SR2.

For the notes expressed as "SUUU. UR" or "SUUU. UD", the central processing unit 1 categorizes the notes in the sub-pattern "A112", and assigns the finger pattern of "1"-"2"-"3"-"4"-"5", "1"-"2"-"1"-"2"-"*", "1"-"2"-"3"-"1"-"*" and "2"-"1"-"2"-"3"-"*" to the notes. The optimum finger pattern The optimum finger pattern is selected through the evaluation subroutine.

For the notes expressed as "SUUU. R" or "SUUU. D", the central processing unit 1 categorizes the notes in the sub-pattern "A12", and checks the pieces of note/rest data to see whether or not the first note and the second note are indicative of a black key and the white key on the right side of the black key. If the answer is affirmative, the central processing unit 1 assigns the finger pattern of "2"-"1"-"2"-"3"-"*" to the notes.

Even if the notes are expressed as "SUUU. R" or "SUUU. D ", the first note and the second note may not be the black key and the white key, respectively. In this case, the central processing unit 1 does not assign the above-described finger patterns to the notes. The central processing unit 1 assigns the first note and the second note to the thumb and the first finger, respectively, and, thereafter, selectively assigns the remaining notes to the fingers through the finger assignment subroutine SR4 as by step S16.

However, if the central processing unit 1 executes the classification subroutine SR1 at the second time or later time, the central processing unit 1 takes the finger pattern assigned the previous passage into account, and temporarily assigns the notes to the fingers through the finger assignment subroutine SR4. However, if the above-described pattern or patterns are preferable, the central processing unit 1 temporarily employs the above-described pattern or patterns. The execution at the second time is carried out for the notes from the pause (2) to the position (3) in FIG. 9, and the next execution is carried out for the notes from the pause (5) to the position (6). In detail, the central processing unit 1 assigns the notes from "start" to the position (1) to the above-described finger pattern or patterns, because there is not any previous passage. However, there is a passage already temporarily assigned to a finger pattern before the notes from the pause (2) to the position (3), the notes from the pause (5) to the position (6), . . . For this reason, the central processing unit 1 temporarily assigns the above-described finger pattern or patterns to the notes, and further determines a finger pattern through the finger assignment subroutine SR4. The central processing unit 1 evaluates the finger patterns through the evaluation subroutine SR2, and determines the optimum finger pattern.

The central processing unit 1 similarly processes the pieces of note/rest data for the other note patterns shown in FIGS. 13 to 38 at the second time or later time, and determines the optimum finger pattern through the evaluation subroutine SR2. Upon completion, the central processing unit 1 proceeds to step S10 as shown.

Data Processing for Note Patterns A2 and A3

Figure 13:
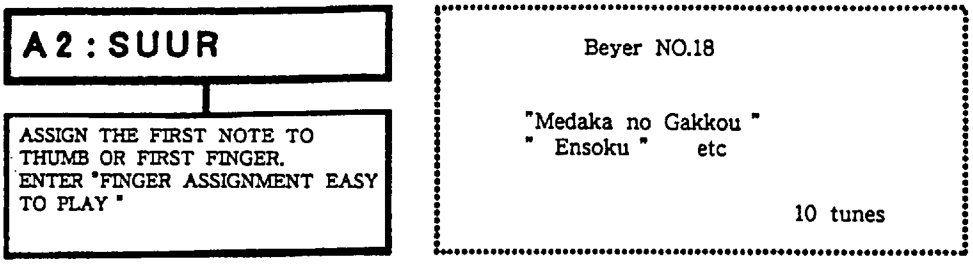

The note pattern A2 is expressed as "SUUR", and examples of the note pattern A2 are found in Beyer No. 18, "*Medaka no Gakkou* (Killifishes at School)" (see "*Youchien no Tomo* 4", page 21), "*Ensoku* (Picnic)" (ditto, page 22), "*Jankenpon* (Mora)" (ditto, see page 83), "*Kinoii Gacho* (Cheerful Goose)" (see Pretty Pianist, page 7), "*Fuyugesiki* (Winter Scenery)" (ditto, page 19), "*Tomoyo Sayonara* (Good-bye, Friend)" (ditto, page 36), "Skater's Waltz" (ditto, page 38), "*Mukashinonamae de Deteimasu* (I am known there by the previous name)" (see Night Ballads, page 276) and Sonatina "1" (see Op20, No. 1). The central processing unit 1 assigns the first note to the thumb and the first finger, and enters a part of the finger assignment subroutine SR4 as shown in FIG. 13. The part of the finger assignment subroutine is called "finger assignment easy to play SR40".

Figure 14:
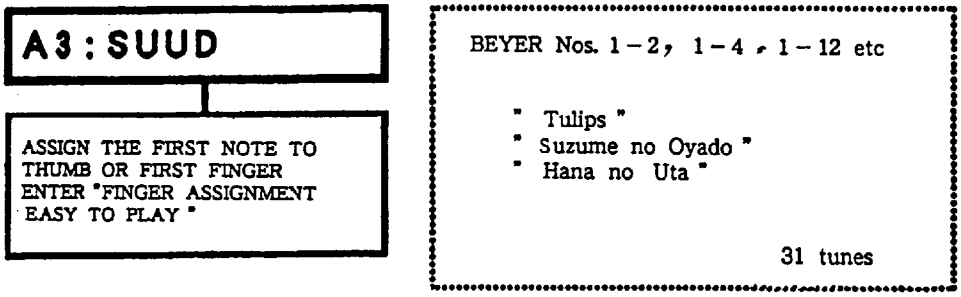

On the other hand, the note pattern A3 is expressed as "SUUD", and is found in Beyer Nos. 1–2, 1–4, 1–12, 1–18, 1–21, 10, 19, 22, 24, 27, 29, 30, 34, 39, 43, 51, 54, 55, 57, 60, 61, 63, 73, 85, 92, 98, 100 and 103, "Tulips" (see "*Yochien no Tomo* 4" vol. 1, page 11), "*Suzume no Oyado* (Sparrow's Inn)" (ditto, page 70) and "*Hana no Uta* (Flower's Song)" (see Pretty Pianist, page 54). The central processing unit 1 also assigns the first note to the thumb and the first finger, and enters the part SR40 of the finger assignment subroutine SR4 as shown in FIG. 14.

Data Processing for Note Patterns B1, B2 & B3

Figure 15:
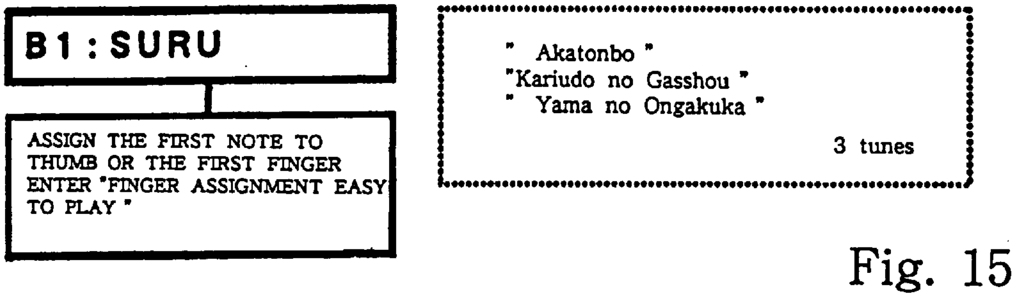

The note pattern B1 is expressed as "SURU", and is found in "*Akatonbo* (Red Dragonfly)" (see "*Yochien no Tomo* 4", page 51), "*Kariudo no Gasshou* (Hunter's Chorus)" (see Pretty Pianist, page 73) and "*Yama no Ongakuka* (Musician in Mountain)" (see *Yotien no Tomo* 4, page 71). The central processing unit 1 also assigns the first note to the thumb and the first finger, and enters the part SR40 of the finger assignment subroutine SR4 as shown in figure 15.

Figure 16:
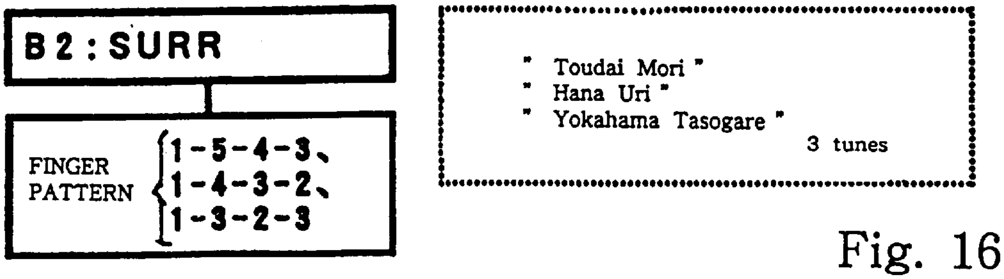

The note pattern B2 is expressed as "SURR", and is found in "*Toudai Mori* (Lighthouse Keeper)" (see Pretty Pianist, page 17), "*Hanauri* (Flower Bender)" (ditto, page 18) and "*Yokohama Tasogare* (Twilight in Yokohama)" (see Night Ballads, page 302). The central processing unit assigns the finger patterns "1"-"5"-"4"-"3", "1"-"4"-"3"-"2" and "1"-"3"-"2"-"3" to the notes as shown in FIG. 16.

Figure 17:
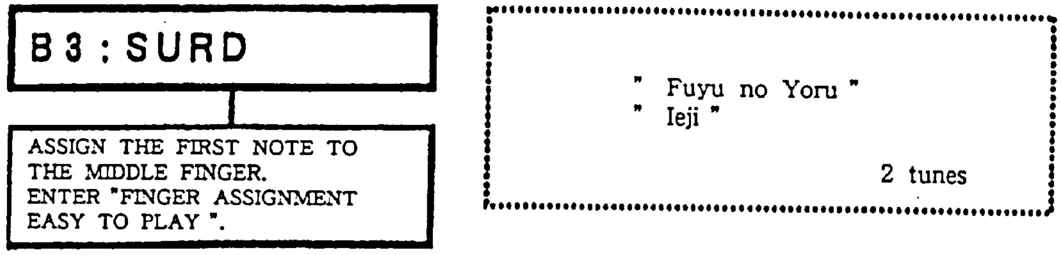
Figure 18:
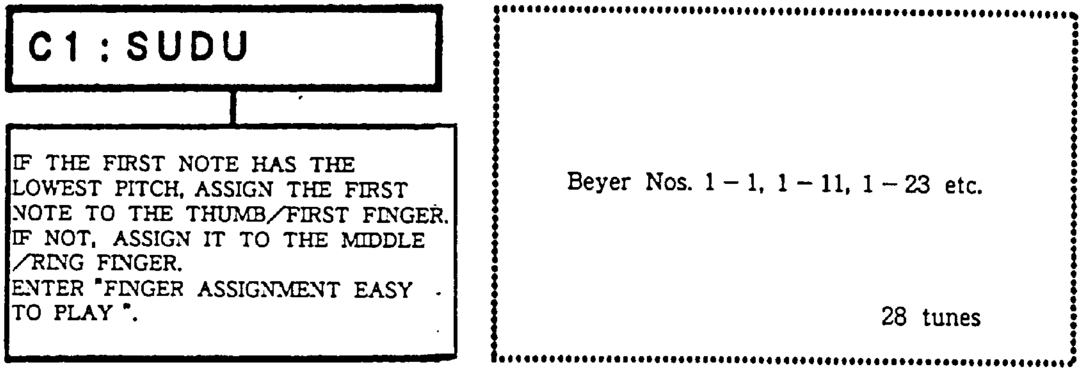
Figure 19:
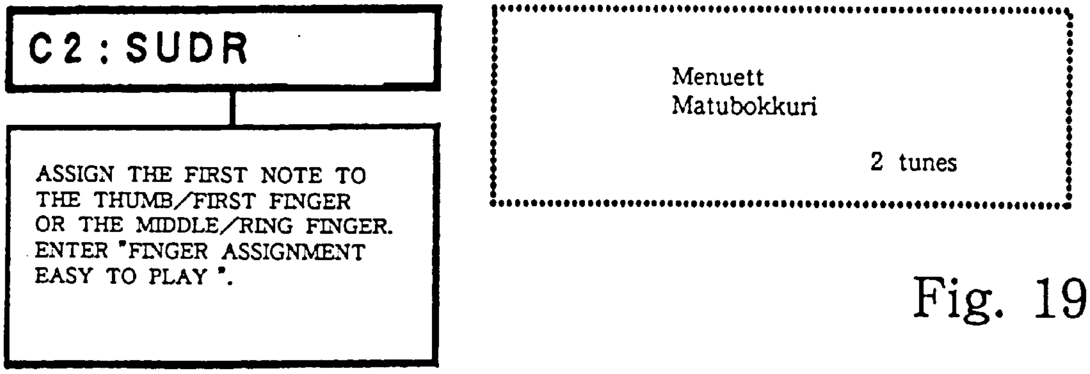
Figure 31:
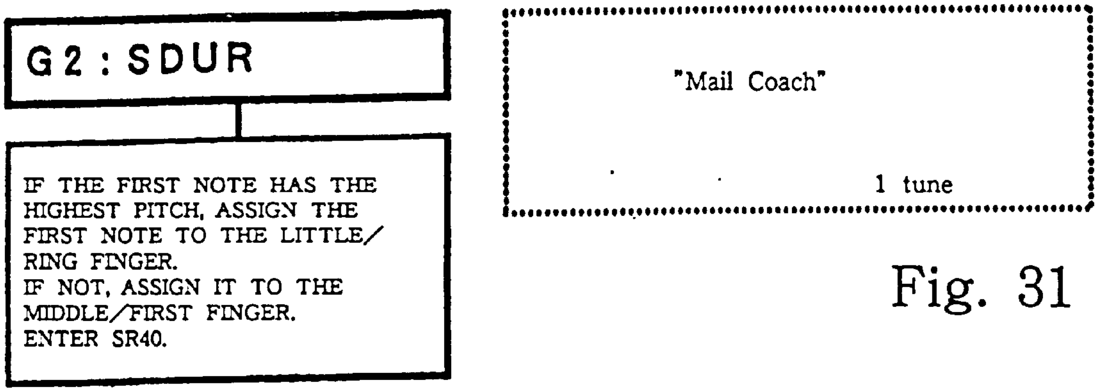
Figure 32:
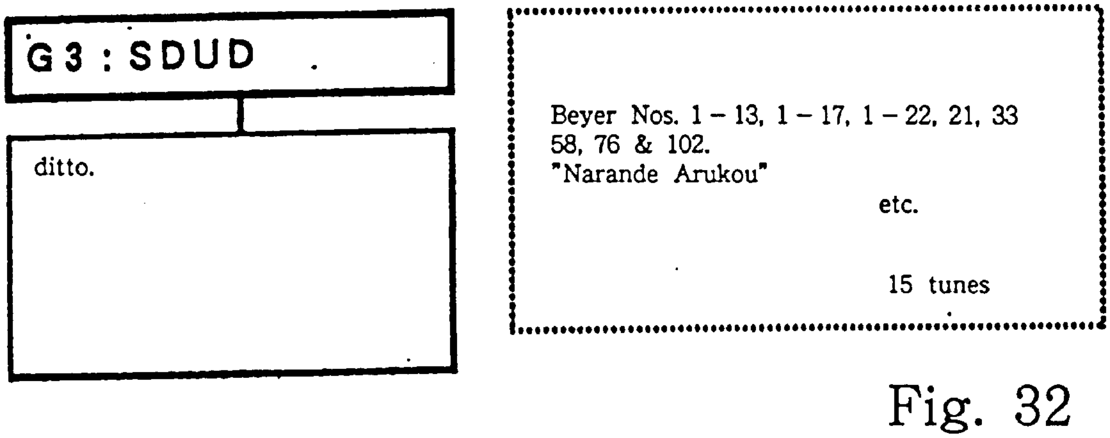
Figure 33:
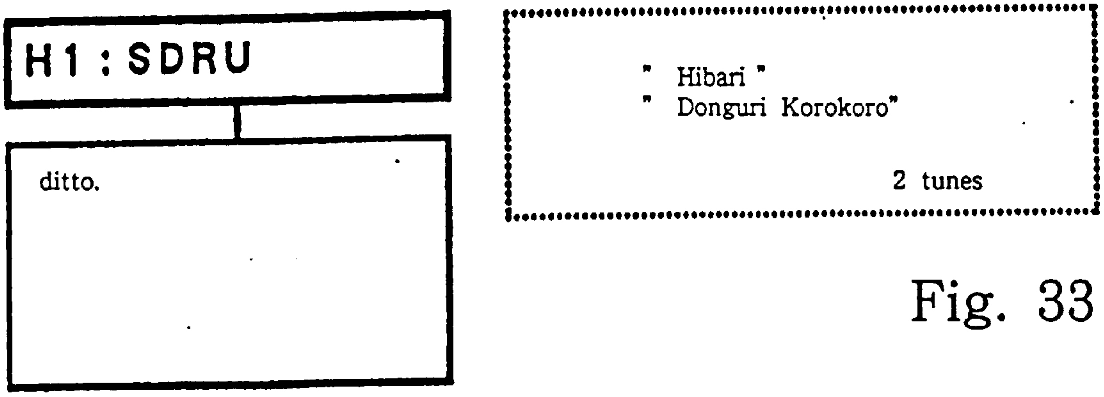
Figure 34:
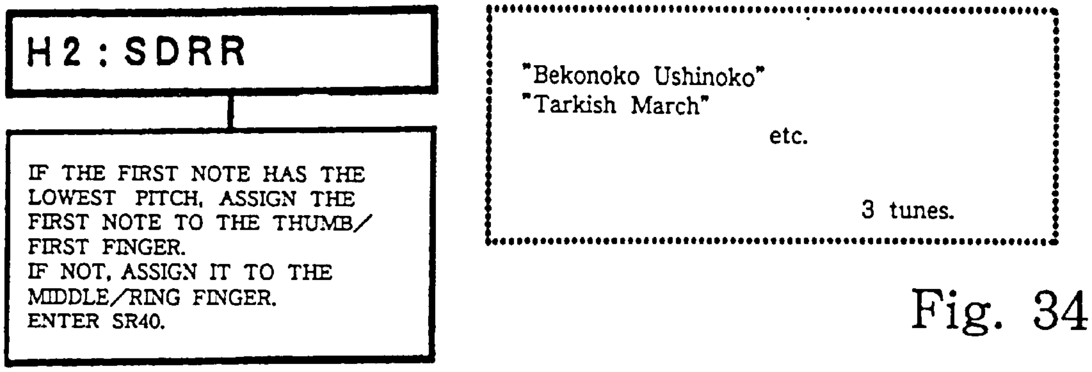
Figure 35:
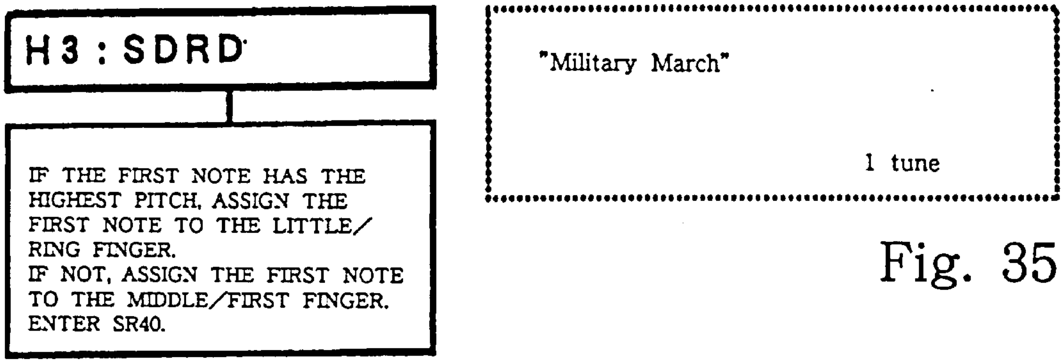
Figure 36:
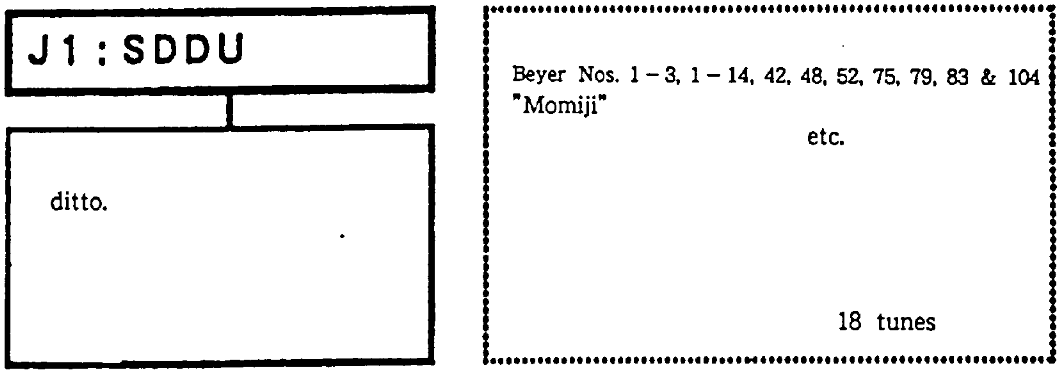

The note pattern B3 is expressed as "SURD", and is found in "*Fuyu no Yoru* (Winter Night)" (see Pretty Pianist, page 14) and "*Ieji* (Way to Home)" corresponding to the melody of "FROM THE NEW WORLD" (ditto, page 32). The central processing unit 1 assigns the first note to the middle finger, and enters the part SR40 of the finger assignment subroutine SR4 as shown in FIG. 17.

Data Processing for Note Patterns C1, C2 & C3

The note pattern C1 is expressed as "SUDU", and is found in Beyer Nos. 1–1, 1–11, 1–23, 1–24, 8, 11, 13, 16, 20, 26, 28, 37, 45, 50, 53, 56, 66, 93 and 94, "*Bara no Hana*

(Flowers of Rose)" (see Beyer vol.2, page 85), "*Yuki* (Snow)" (see *Youchien no Tomo* 4, page 56), "*Oshougatu* (New Year's Day)" (ditto, page 57), "Good Morning to You" (ditto, page 98), "*Haru no Asa* (Morning in Spring)" (see, Pretty Pianist, page 12), "*Mizu no Sei* (Water Fairy)" (ditto, page 76), "*Choshinoyoi Kajiya* (Smith Easily Elated by Praise or Flattery)" (ditto, page 56), "*Yawara* (Jyudo)" (see Night Ballads, page 290) and "*Namidagoi* (Love with Tear)" (ditto, page 224). The central processing unit 1 checks the notes to see whether or not the first note has the lowest pitch of all. When the first note has the lowest pitch, the central processing unit 1 assigns the first note to the thumb and the first finger. If not, the central processing unit 1 assigns the first note to the middle finger and the ring finger. Thereafter, the central processing unit 1 enters the part SR40 of the finger assignment subroutine SR4 (see FIG. 18).

The note pattern C2 is expressed as "SUDR", and is found in "Menuett" (see Beyer, vol. 2, page 113) and "*Matubokkuri* (Pinecone)" (see, *Youtien no Tomo* 4, page 123). The central processing unit 1 checks the notes to see whether or not the first note has the lowest pitch of all. When the first note has the lowest pitch, the central processing unit 1 assigns the first note to the thumb and the first finger. If not, the central processing unit 1 assigns the first note to the middle finger and the ring finger. Thereafter, the central processing unit 1 enters the part SR40 of the finger assignment subroutine SR4 (see FIG. 19).

The note pattern C3 is expressed as "SUDD", and is found in Beyer Nos. 9, 17, 36, 38 and 40, "*Mitsubati Bunbun* (Honeybee Booms)" (see *Youtien no Tomo* 4, page 13), "*Takibi* (Bonfire)" (ditto, page 53), "Yuki no Penkiyasan (Snow Painter)" (ditto, page 55), "*Okaasan* (Mama)" (ditto, page 93), "*Kiyosikonoyoru* (Holy Night)" (ditto, page 62), "*Hashiruno Daisuki* (I Like Running)" (ditto, page 99), "*Nawatobi Asobi* (Jump Rope)" (ditto, page 84), "Dance" (see Pretty Pianist, page 35), "*Tonton Tomodachi* (Friends)" (see *Youchien no Tomo* 4, page 95), "London Bridge" (ditto, page 125), "*Omochya no Koukyoukyoku* (Toy's Symphony)" (see Pretty Pianist, page 80), "Matador in Carmen" (ditto, page 104), "Gossec's Gavotte" (ditto, page 108) and "*Rabu Yu Tokyo* (I Love You in Tokyo)" (see Night Ballads, page 308). The central processing unit 1 checks the notes to see whether or not the first note has the lowest pitch of all. When the first note has the lowest pitch, the central processing unit 1 assigns the first note to the thumb and the first finger. If not, the central processing unit 1 assigns the first note to the middle finger and the ring finger. Thereafter, the central processing unit 1 enters the part SR40 of the finger assignment subroutine SR4 (see FIG. 20).

Data Processing for Note Patterns D1, D2 & D3

The note pattern D1 is expressed as "SRUU", and is found in "*Tsuki no Hikari* (Moon Light)" (see Beyer, vol.1, page 133), "*Ame* (Rain)" (see *Youtien no Tomo* 4, page 32), Beyer No. 91, "*Tanabatasama* (Festival of the Weaver)" (ditto, page 33), "*Kingyo no Hirune* (Goldfish in Siesta)" (ditto, page 37), "*Kitanokunikara* (From Northern Country)" (ditto, page 52), "*Uguisu* (Bush Warbler)" (ditto, page 61), "*Usagi* (Rabbit)" (ditto, page 68), "*Gogatsu no Uta* (May Song)" (see Pretty Pianist, page 8), "*Koujyou no Tuki* (Moon over Ruined Castle)", "Long Long Ago" (see Pretty Pianist, page 30) and "Donau no Sazanami (Donau that runs dimpling)" (ditto, page 31).

The central processing unit 1 checks the notes to see whether or not the first note has the lowest pitch. If the answer is given affirmative, the central processing unit 1 assigns the first note to the thumb and the first finger as follows. If the tempo at the first note is less than a predetermined value such as 120, the central processing unit 1 assigns the finger pattern "1"-"1" to the first two notes. On the other hand, if the tempo at the first note is greater than the predetermined value, the central processing unit 1 further checks the first two notes to see whether or not the first note is longer in duration than the second note. When the answer is given affirmative, the central processing unit 1 assigns the finger pattern "1"-"1" to the first two notes. If the answer is given negative, the central processing unit 1 assigns the finger pattern "2"-"1" to the first two notes. On the other hand, when the first note does not have the lowest pitch, the central processing unit 1 assigns the finger pattern "3"-"3" or "4"-"4" to the first two notes.

When the central processing unit 1 determines the fingers used for the first two notes, the central processing unit 1 enters the part SR40 of the finger assignment subroutine SR4 (see FIG. 21).

The note pattern D2 is expressed as "SRUR", and is found in "*Arisan no Ohanashi* (Story of Ant)" (see *Youtien no Tomo* 4, page 64), "*Fujisan* (Fuji Mounten)" (ditto, page 118), "*Shiawasenara Teotatakou* (Let's clap your hands when you feel yourselves happy)" (ditto, page 103) and "*Ningyo* (Doll)" (ditto, page 120).

The central processing unit 1 processes the pieces of note/rest data as similar to the note pattern D1 as shown in FIG. 22. The central processing unit 1 checks the notes to see whether or not the first note has the lowest pitch. If the answer is given affirmative, the central processing unit 1 assigns the first note to the thumb and the first finger as follows. If the tempo at the first note is less than a predetermined value such as 120, the central processing unit 1 assigns the finger pattern "1"-"1" to the first two notes. On the other hand, if the tempo at the first note is greater than the predetermined value, the central processing unit 1 further checks the first two notes to see whether or not the first note is longer in duration than the second note. When the answer is given affirmative, the central processing unit 1 assigns the finger pattern "1"-"1" to the first two notes. If the answer is given negative, the central processing unit 1 assigns the finger pattern "2"-"1" to the first two notes. On the other hand, when the first note does not have the lowest pitch, the central processing unit 1 assigns the finger pattern "3"-"3" or "4"-"4" to the first two notes.

When the central processing unit 1 determines the fingers used for the first two notes, the central processing unit 1 enters the part SR40 of the finger assignment subroutine SR4.

The note pattern D3 is expressed as "SRUD", and is found in "*Sakura* (Cherry Tree)" (see *Youtien no Tomo* 4, page 15), "Brahms's Nursery Song" (Pretty Pianist, page 13), "Scubert's Nursery Song" (ditto, page 24), "*Gakkyou no Toki* (Time to Enjoy Music)" (ditto, page 42) and "Faust's Walz" (ditto, page 62). The central procesing unit 1 assigns the first note to the middle finger, and enters the part SR40 of the finger assignment subroutine SR4 as shown in FIG. 23.

Data Processing for Note Patterns E1, E2 & E3

The note pattern E1 is expressed as "SRRU", and is found in Beyer No. 64, "*Nami to Kaigara* (Waves and Shell)" (see *Youchien no Tomo* 4, page 27), "Gavotte" (see Beyer vol.2, page 118), "*Mizuasobi* (Play in Water)" (see *Youchien no Tomo* 4, page 38), "*Chuchu Mezumi* (Squeaking Rat)" (ditto, page 67), "*Hotaru no Hikari* (Light of Firefly)" (see Pretty Pianist, page 20), "*Fushigi na Poketto* (Magical Pocket)" (see *Youchien no Tomo* 4, page 104), "*Oyama no Suginoko* (Little Cedar in Mountain)" (ditto, page 108), "*Furusato* (Native Place)" (see Prety Pianist, page 5), "*Sizukana Mizuumi* (Quiet Lake)" (ditto, page 23) and "Oushou (the King)" (see Night Ballads, page 56).

The central processing unit 1 checks the pieces of note/rest data to see whether or not the first note has the lowest pitch in the notes from the first note to the sixteenth note. When the answer is affirmative, the central processing unit 1 assigns the first note to the thumb and the first finger. On the other hand, if the answer is negative, the central processing unit 1 assigns the first note to the middle finger and the ring finger. Thereafter, the central processing unit 1 enters the part SR40 of the finger assignment subroutine SR4 as shown in FIG. 24.

The note pattern E2 is expressed as "SRRR", and is found in Beyer Nos. 72 and 99, "*Tanabata Matsuri* (Festival of the Weaver)" (see *Youtien no Tomo* 4, page 30), "*Darumasan* (Tumbler)" (ditto, page 82), "*Temari Uta* (Song of Handball)" (ditto, page 85), "Ten Indians" (ditto, page 124), "*Kisha* (Steam Locomotion)" (see Pretty Pianist, page 9), "*Uruwashi no Nagare* (Beautiful Stream)" (ditto, page 22), "*Hakutyou no Odori* (Dance of Swan)" (ditto, page 58, "*Onna no Iji* (Woman's Strong Will)" (see Night Ballads, page 86), "*Kitaguni no Hafu* (Northern Country in Spring)" (ditto, page 118), "*Tugarukaikyou Fuyugesiki* (Winter Scene at Straits of Tsugaru)" (ditto, page 204), "*Hoshikage no Warutu* (Starlight Walz)" (ditto, page 266) and "Bara ga Saita (Roses have been out)" (ditto, page 355). The central processing unit 1 checks the pieces of note/rest data to see whether or not notes lower in pitch than the first four notes are a majority in the eight notes after the first four notes. If the answer is affirmative, the central processing unit 1 assigns the finger patterns "5"-"5"-"5"-"5" and "4"-"4"-"4"-"4" to the first four notes. On the other hands, if the notes higher in pitch than the first four notes are a majority in the eight notes after the first four notes, the central processing unit 1 assigns the finger patterns "4"-"3"-"2"-"1", "1"-"1"-"1"-"1" and "1"-"2"-"1"-"2" to the four notes (see FIG. 25).

The note pattern E3 is expressed as "SRRD", and is found in "*Katatumuri* (Snail)" (see *Youtien no Tomo* 4, page 20), "Hotarugari (Firefly Catching)" (ditto, page 81), "*Tawara ha Gorogoro* (Rolling Straw Bag)" (ditto, page 91), "*Ohayou no Uta* (Song of Morning Greeting)" (ditto, page 92) and "*Ookina Taiko* (Big Drum)" (ditto, page 107). The central processing unit 1 checks the pieces of note/rest data to see whether or not notes lower in pitch than the first three notes are a majority in the eight notes after the first three notes. If the answer is affirmative, the central processing unit 1 assigns the lowest pitched note to the thumb, and enters the part SR40 of the finger assignment subroutine SR4 as shown in FIG. 25. On the other hands, if the notes higher in pitch than the first three notes are a majority in the eight notes after the first three notes, the central processing unit 1 assigns the finger pattern "4"-"3"-"2"-"1" to the four notes.

Data Processing for Note patterns F1, F2 & F3

The note pattern F1 is expressed as "SRDU", and is found in "*Haruyokoi* (Come, spring!)" (see *Youtien no Tomo* 4, page 6), "*Oborozukiyo* (Hazy Moon Night)" (ditto, page 19), "*Oyama no Osaru* (Monkey in Mountain) (ditto, page 65), "*Otukai Arisan* (Ant who goes shopping)" (ditto, page 80), "*Toryanse* (Pass here)" (ditto, page 86), "*Teotatakimasyou* (Let's beat with hands)" (ditto, page 100) and "*Itako Hanayomesan* (Bride in Riverside District)" (see Night Ballads, page 40). The central processing unit 1 checks the pieces of note/rest data to see whether or not the first note has the lowest pitch. When the first note has the lowest pitch, the central processing unit 1 assigns the first note to the thumb and the first finger, and, thereafter, enters the part SR40 of the finger assignment subroutine SR4 (see FIG. 27). On the other hand, if another note has the lowest pitch, the central processing unit 1 assigns the first note to the middle finger and the ring finger, and, thereafter, enters the part SR40 of the finger assignment subroutine SR4.

The note pattern F2 is expressed as "SRDR", and is found in "*Ame* (Rain)" (see Beyer vol. 1, page 13), "*Suzume no Gakkou* (Sparrow's School)" (see *Youtien no Tomo* 4, page 74), "*Akushu de Konnitiwa* (Great with a Hand-shake) (ditto, page 97) and "*Tokei no Uta* (Song of Clock)" (ditto, page 105). The central processing unit 1 checks the pieces of note/rest data to see whether or not the first note has the highest pitch. When the first note has the highest pitch, the central processing unit 1 assigns the first note to the little finger and the ring finger, and, thereafter, enters the part SR40 of the finger assignment subroutine SR4 (see FIG. 28). On the other hand, if another note has the highest pitch, the central processing unit 1 assigns the first note to the middle finger and the first finger, and, thereafter, enters the part SR40 of the finger assignment subroutine SR4.

The note pattern F3 is expressed as "SRDD", and is found in "*Sayounara* (Good-bye)" (see Beyer vol. 2, page 30), "*Kiku no Hana* (Chrysanthemum)" (see *Youtien no Tomo* 4, page 50), "*Sayounara no Uta* (Farewell Song) (ditto, page 94) and "*Kanasii Sake* (Liquor with Grief)" (see Night Ballads, page 106). The central processing unit 1 checks the pieces of note/rest data to see whether or not the first note has the highest pitch. When the first note has the highest pitch, the central processing unit 1 assigns the first note to the little finger and the ring finger, and, thereafter, enters the part SR40 of the finger assignment subroutine SR4 (see FIG. 29). On the other hand, if another note has the highest pitch, the central processing unit 1 assigns the first note to the middle finger and the first finger, and, thereafter, enters the part SR40 of the finger assignment subroutine SR4.

Data Processing for Note Patterns G1, G2 & G3

The note pattern G1 is expressed as "SUDD", and is found in Beyer Nos. 23, 31, 49, 59, 77, 80 and 88, "Menuett" (see Beyer vol. 2, page 74), "*Makiba no Asa* (Morning in Pasture)" (see *Youtien no Tomo* 4, page 28), "*Kyupisan* (Kewpie Doll) (ditto, page 113), "Boccherini's Menuett" (see Pretty Pianist, page 100), "*Naminori Koete* (Over the waves)" (dito, page 114) and "*Kitanoyadokara* (From Northern Inn)" (see Night Ballads, page 122). The central processing unit 1 checks the pieces of note/rest data to see whether or not the first note has the lowest pitch. When the first note has the lowest pitch, the central processing unit 1 assigns the first note to the thumb and the first finger, and, thereafter, enters the part SR40 of the finger assignment subroutine SR4 (see FIG. 30). On the other hand, if another note has the lowest pitch, the central processing unit 1 assigns the first note to the middle finger and the ring finger, and, thereafter, enters the part SR40 of the finger assignment subroutine SR4.

The note pattern G2 is expressed as "SDUR", and is, by way of example, found in "Mail Coach" (see Pretty Pianist, page 46). The central processing unit 1 checks the pieces of note/rest data to see whether or not the first note has the highest pitch. When the first note has the highest pitch, the central processing unit 1 assigns the first note to the little finger and the ring finger, and, thereafter, enters the part SR40 of the finger assignment subroutine SR4 (see FIG. 31). On the other hand, if another note has the highest pitch, the central processing unit 1 assigns the first note to the middle finger and the first finger, and, thereafter, enters the part SR40 of the finger assignment subroutine SR4.

The note pattern G3 is expressed as "SDUD", and is found in Beyer Nos. 1–13, 1–17, 1–22, 21, 33, 58, 76 and 102, in "*Narande Arukou* (Let's walk together)" (see Beyer vol. 2, page 134), "*Amefuri* (In the rain)" (see *Youtien no*

*Tomo* 4, page 18), "*Hibari* (Lark) (ditto, page 34), "*Arare* (Hail)" (ditto, page 58), "*Memekoyagi* (Goatling)" (ditto, page 78), "For Elyzee" (see Pretty Pianist, page 117) and "*Momotaro* (Boy born from Peach)" (see *Youtien no Tomo* 4, page 111). The central processing unit 1 checks the pieces of note/rest data to see whether or not the first note has the highest pitch. When the first note has the highest pitch, the central processing unit 1 assigns the first note to the little finger and the ring finger, and, thereafter, enters the part SR40 of the finger assignment subroutine SR4 (see FIG. 32). On the other hand, if another note has the highest pitch, the central processing unit 1 assigns the first note to the middle finger and the first finger, and, thereafter, enters the part SR40 of the finger assignment subroutine SR4.

Data Processing for Note Patterns H1, H2 & H3

The note pattern H1 is expressed as "SDRU", and is found in "*Hibari* (Lark)" (see *Youtien no Tomo* 4, page 17) and "*Donguri Korokoroi* (Rolling Acorn) (ditto, page 45). The central processing unit 1 checks the pieces of note/rest data to see whether or not the first note has the highest pitch. When the first note has the highest pitch, the central processing unit 1 assigns the first note to the little finger and the ring finger, and, thereafter, enters the part SR40 of the finger assignment subroutine SR4 (see FIG. 33). On the other hand, if another note has the highest pitch, the central processing unit 1 assigns the first note to the middle finger and the first finger, and, thereafter, enters the part SR40 of the finger assignment subroutine SR4.

The note pattern H2 is expressed as "SDRR", and is found in "*Bekonoko Ushinoko* (Calf)" (see *Youtien no Tomo* 4, page 63) and "Beethoven's Turkish March" (see Pretty Pianist, page 34) and "*Sekai wa Futarinotameni* (World for Couples)" (see Night Ballads, page 264). The central processing unit 1 checks the pieces of note/rest data to see whether or not the first note has the lowest pitch. When the first note has the lowest pitch, the central processing unit 1 assigns the first note to the thumb and the first finger, and, thereafter, enters the part SR40 of the finger assignment subroutine SR4 (see FIG. 34). On the other hand, if another note has the lowest pitch, the central processing unit 1 assigns the first note to the middle finger and the ring finger, and, thereafter, enters the part SR40 of the finger assignment subroutine SR4.

The note pattern H3 is expressed as "SDRD", and is found in "Schubert's Military March" (see Pretty Pianist, page 51). The central processing unit 1 checks the pieces of note/rest data to see whether or not the first note has the highest pitch. When the first note has the highest pitch, the central processing unit 1 assigns the first note to the little finger and the ring finger, and, thereafter, enters the part SR40 of the finger assignment subroutine SR4 (see FIG. 35). On the other hand, if another note has the highest pitch, the central processing unit 1 assigns the first note to the middle finger and the first finger, and, thereafter, enters the part SR40 of the finger assignment subroutine SR4.

Data Processing for Note Patterns J1, J2 & J3

The note pattern J1 is expressed as "SDDU", and is found in Beyer Nos. 1–3, 1–14, 42, 48, 52, 75, 79, 83 and 104, "*Momiji* (Maple)" (see *Youchien no Tomo* 4, page 46), "*Oyuki Koyuki* (Heavy Snowfall Light Snowfall)" (ditto, page 60), "*Zosan* (Elephant)" (ditto, page 73), "*Nanatu no Ko* (Seven Children)" (ditto, page 76), "*Omotya no Marchi* (Toy's March)" (ditto, page 112), "*Merisan no Hituji* (Mary's Sheep)" (ditto, page 115), "*Buranko* (Swing)" (ditto, page 121), "Suwannee River" (see Pretty Pianist, page 25) and "*Kutinasi no Hana* (Cape Jasmine)" (Night Ballads, page 130). The central processing unit 1 checks the pieces of note/rest data to see whether or not the first note has the highest pitch. When the first note has the highest pitch, the central processing unit 1 assigns the first note to the little finger and the ring finger, and, thereafter, enters the part SR40 of the finger assignment subroutine SR4 (see FIG. 35). On the other hand, if another note has the highest pitch, the central processing unit 1 assigns the first note to the middle finger and the first finger, and, thereafter, enters the part SR40 of the finger assignment subroutine SR4.

The note pattern J2 is expressed as "SDDR", and is found in Beyer No. 25 and "*Jinsei Gekijyou* (Life Theater)" (see Night Ballads, page 178). The central processing unit 1 checks the pieces of note/rest data to see whether or not the first note has the lowest pitch. When the first note has the lowest pitch, the central processing unit 1 assigns the first note to the thumb and the first finger, and, thereafter, enters the part SR40 of the finger assignment subroutine SR4 (see FIG. 37). On the other hand, if another note has the lowest pitch, the central processing unit 1 assigns the first note to the middle finger and the ring finger, and, thereafter, enters the part SR40 of the finger assignment subroutine SR4.

The note pattern J3 is expressed as "SDDD", and is a continuous descent. The note pattern J3 is found in Beyer Nos. 1–6, 1–9, 1–14, 1–16, 1–20, 32 and 41, "*Niwakaame* (Shower)" (see Beyer vol. 2, page 104), "Muses" (ditto, page 136), "*Bunbunbun* (Boom)" (see *Youtien no Tomo* 4, page 12), "*Umi* (Sea)" (ditto, page 31), "*Akatonbo* (Red Dragonfly)" (see Pretty Pianist, page 10) and "*Ginza no Koi no Monogatari* (Love Story in Ginza Street)" (see Night Ballads, page 128). The central processing unit 1 assigns the first note to the little finger and the ring finger, and enters the part SR40 of the finger assignment subroutine SR4 (see FIG. 38). Otherwise, the central processing unit 1 assigns the finger pattern "3"-"2"-"1"-"2" to the four notes.

As will be understood from the foregoing description, the central processing unit 1 selects a note pattern from the twenty-seven candidates, and temporarily assigns at least one finger pattern to the notes. However, the method described hereinbefore is an example of the method. Another example is described hereinbelow with reference to FIGS. 39 to 65.

SECOND EXAMPLE

The rules shown in FIGS. 39 to 65 are described hereinbelow.

Data Processing for Note Pattern A1

Figure 39:
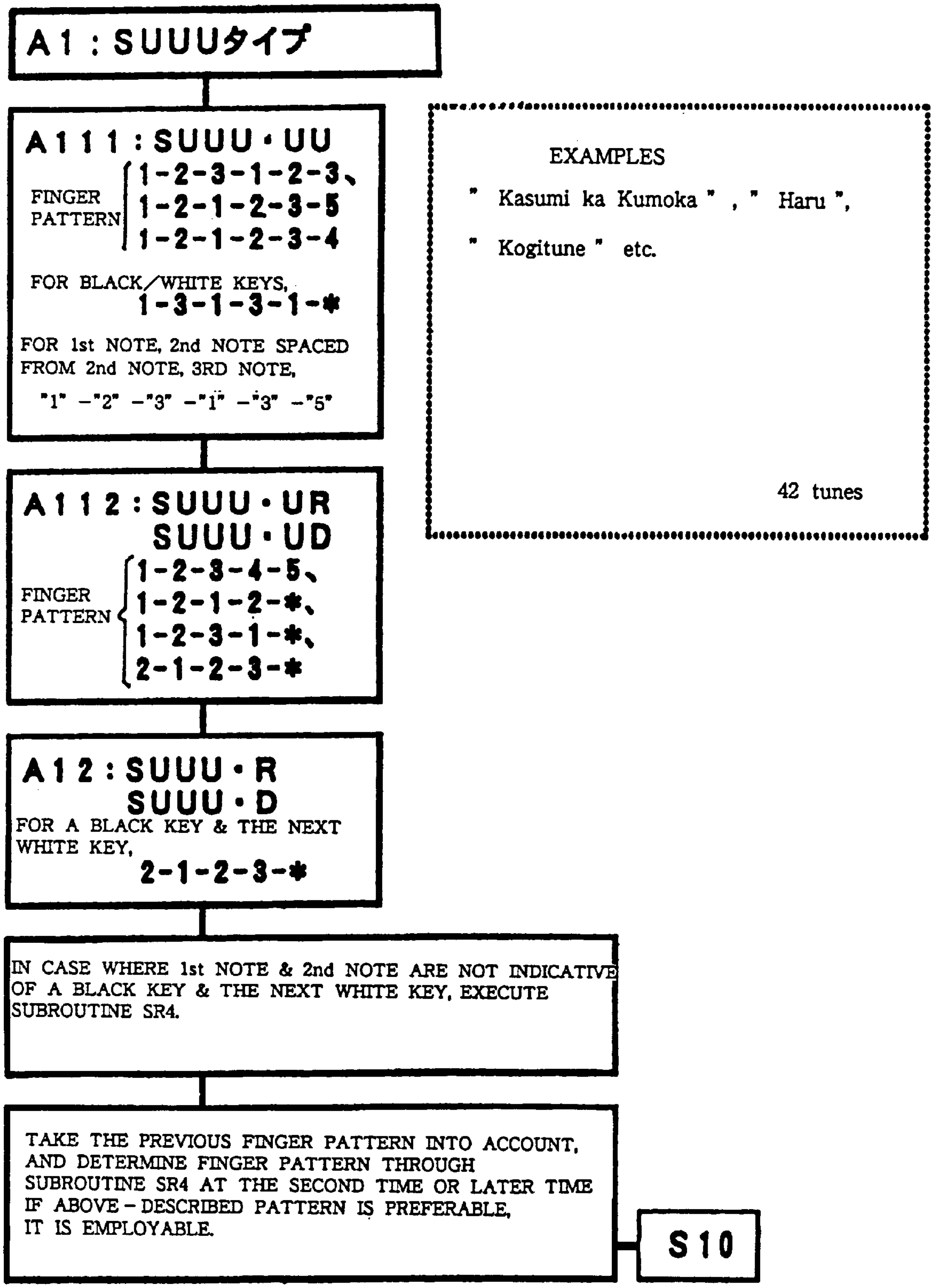

FIG. 39 illustrates the finger assignment for the note pattern A1. The note pattern A1 is expressed as "SUUU", and passages categorized in the note pattern A1 are, by way of example, found in "*Kasumika Kumoka* (Mist or Cloud)" (see *Youtien no Tomo* 4, page 14), "*Haru* (Oh Suzanne)" (ditto, page 16), "*Kogitune* (Little Fox)", (ditto, page 69), "*Jyugoya Otsukisan* (Full Moon)" (ditto, page 44), "*Yubi no Uta* (Song of Fingers)", (ditto, page 102), "*Hamachidori* (Plover on Shore)" (ditto, page 48), "*Akaikutu* (Red Shoes)", (ditto, page 116), "*Kodomo no Natu* (children's summer)" (ditto, page 36), Beyer Nos. 1–5, 1–7, 1–8, 1–10, 1–19, 3, 4, 5, 6, 7, 12, 14, 15, 35, 44, 46, 47, 62, 65, 74, 81, 82, 86, 90, 97, 101, 105 and 106, "Old Black Joe" (see Pretty Pianist, page 27), "*Tumugiuta* (Spinning Song)" (ditto, page 96), "*Kobito ga Mori ni Tatteiru* (Pigmy who stands in Forest)" (see, Beyer, vol. 2, page 40), "Spring Song" composed by Mendelssohn (see Pretty Pianist, page 90), "*Kasuba no Onna* (Woman in Casbah)" (see Night Ballads, page 102) and "*Hakodate no Onna* (Woman in Hakodate city)" (ditto, page 240).

The note pattern A1 is broken down into sub-patterns "A111", "A112" and "A12". When the note next to the four notes is represented as "U", the passage is categorized in the sub-pattern "A111" or "A112". On the other hand, if the note next to the four notes is represented as "R" or "D", the passage is categorized in the sub-pattern "A12". The sixth note makes the passage branch to the sub-pattern "A111" or "A112". Namely, when the sixth note is "U", the passage is categorized in the sub-pattern "A111". On the other hand, if the sixth note is "R" or "D", the passage is categorized in the sub-pattern "A112".

When the six notes are expressed as "SUU. UU", the central processing unit 1 categorizes the passage in the sub-pattern "A111", and assigns the six notes to the finger pattern of "1"-"2"-"3"-"1"-"2"-"3", "1"-"2"-"1"-"2"-"3"-"5" and "1"-"2"-"1"-"2"-"3"-"4". However, in case where the black keys are altered with the white keys at intervals of semitone, the central processing unit 1 assigns the notes to the finger pattern of "1"-"3"-"1"-"3"-"1"-"*". The mark "*" represents a finger determined through the evaluation subroutine shown in FIG. 66 depending upon the next note. If the first note and the second note are widely spaced from the second note and the third note, respectively, the central processing unit 1 assigns the notes to the finger pattern of "1"-"2"-"3"-"1"-"3"-"5". Thus, there is a possibility to assign the notes to more than one finger pattern. If more than one finger pattern is assigned, the central processing unit 1 selects the optimum finger pattern through the evaluation subroutine SR2.

For the notes expressed as "SUUU. UR" or "SUUU. UD", the central processing unit 1 categorizes the notes in the sub-pattern "A112", and assigns the finger pattern of "1"-"2"-"3"-"4"-"5", "1"-"2"-"1"-"2"-"*", "1"-"2"-"3"-"1"-"*" and "2"-"1"-"2"-"3"-"*" to the notes. The optimum finger pattern is selected through the evaluation subroutine.

For the notes expressed as "SUUU. R" or "SUUU. D", the central processing unit 1 categorizes the notes in the sub-pattern "A12", and checks the pieces of note/rest data to see whether or not the first note and the second note are indicative of a black key and the white key on the right side of the black key. If the answer is affirmative, the central processing unit 1 assigns the finger pattern of "2"-"1"-"2"-"3"-"*" to the notes.

Even if the notes are expressed as "SUUU. R" or "SUUU. D", the first note and the second note may not indicate the black key and the white key, respectively. In this case, the central processing unit 1 does not assign the above-described finger patterns to the notes. The central processing unit 1 assigns the first note and the second note to the thumb and the first finger, respectively, and, thereafter, selectively assigns the remaining notes to the fingers through the finger assignment subroutine SR4 as by step S16.

However, if the central processing unit 1 executes the classification subroutine SR1 at the second time or later time, the central processing unit 1 takes the finger pattern assigned the previous passage into account, and temporarily assigns the notes to the fingers through the finger assignment subroutine SR4. However, if the above-described pattern or patterns are preferable, the central processing unit 1 temporarily employs the above-described pattern or patterns. The execution at the second time is carried out for the notes from the pause (2) to the position (3) in FIG. 9, and the next execution is carried out for the notes from the pause (5) to the position (6). In detail, the central processing unit 1 assigns the notes from "start" to the position (1) to the above-described finger pattern or patterns, because there is not any previous passage. However, there is a passage already temporarily assigned to a finger pattern before the notes from the pause (2) to the position (3), the notes from the pause (5) to the position (6), . . . For this reason, the central processing unit 1 temporarily assigns the above-described finger pattern or patterns to the notes, and further determines a finger pattern through the finger assignment subroutine SR4. The central processing unit 1 evaluates the finger patterns through the evaluation subroutine SR2, and determines the optimum finger pattern.

The central processing unit 1 similarly processes the pieces of note/rest data for the other note patterns shown in FIGS. 40 to 65 at the second time or later time, and determines the optimum finger pattern through the evaluation subroutine SR2. Upon completion, the central processing unit 1 proceeds to step S10 as shown.

Data Processing for Note Patterns A2 and A3

Figure 40:
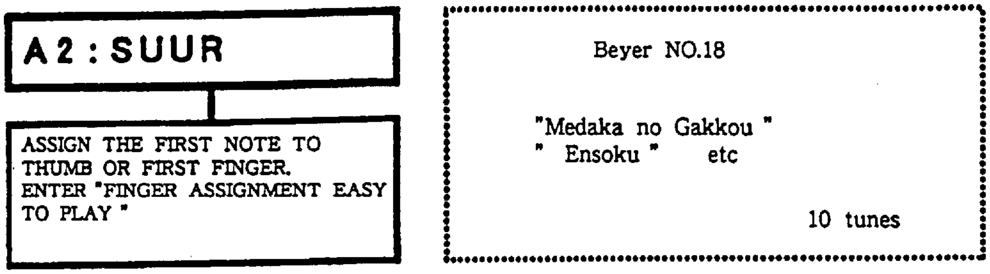

The note pattern A2 is expressed as "SUUR", and examples of the note pattern A2 are found in Beyer No. 18, "*Medaka no Gakkou* (Killifishes at School)" (see "*Youchien no Tomo* 4", page 21), "*Ensoku* (Picnic)" (ditto, page 22), "*Jankenpon* (Mora)" (ditto, see page 83), "*Kinoii Gacho* (Cheerful Goose)" (see Pretty Pianist, page 7), "*Fuyugesiki* (Winter Scenery)" (ditto, page 19), "*Tomoyo Sayonara* (Good-by, Friend)" (ditto, page 36), "Skater's Waltz" (ditto, page 38), "*Mukashinonamae de Deteimasu* (I am known there by the previous name)" (see Night Ballads, page 276) and Sonatina "1" (see Op20, No. 1). The central processing unit 1 assigns the first note to the thumb and the first finger, and enters the part SR40 of the finger assignment subroutine SR4 as shown in FIG. 40.

Figure 41:
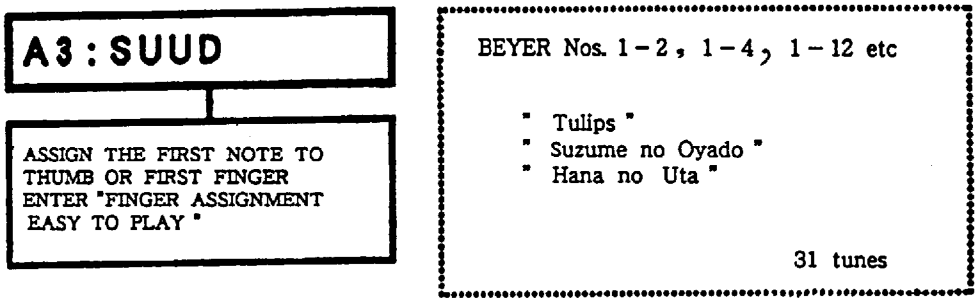

On the other hand, the note pattern A3 is expressed as "SUUD", and is found in Beyer Nos. 1–2, 1–4, 1–12, 1–18, 1–21, 10, 19, 22, 24, 27, 29, 30, 34, 39, 43, 51, 54, 55, 57, 60, 61, 63, 73, 85, 92, 98, 100 and 103, "Tulips" (see "*Yochien no Tomo* 4" vol. 1, page 11), "*Suzume no Oyado* (Sparrow's Inn)" (ditto, page 70) and "*Hana no Ula* (Flower's Song)" (see Pretty Pianist, page 54). The central processing unit 1 also assigns the first note to the thumb and the first finger, and enters the part SR40 of the finger assignment subroutine SR4 as shown in FIG. 41.

Data Processing for Note Patterns B1, B2 & B3

Figure 42:
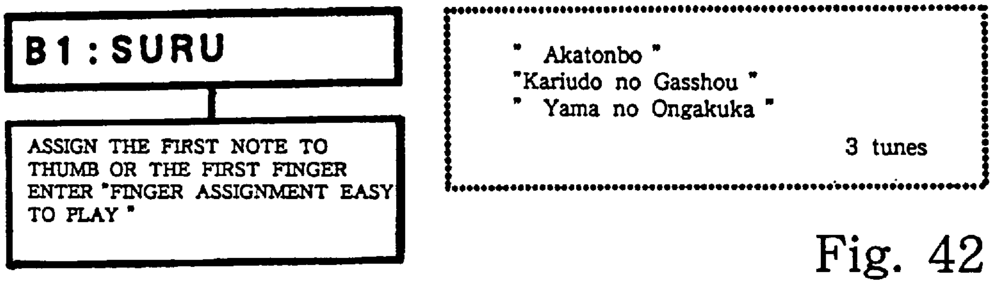

The note pattern B1 is expressed as "SURU", and is found in "*Akatonbo* (Red Dragonfly)" (see "*Yochien no Tomo* 4", page 51), "*Kariudo no Gasshou* (Hunter's Chorus)" (see Pretty Pianist, page 73) and "*Yama no Ongakuka* (Musician in Mountain)" (see *Yotien no Tomo* 4, page 71). The central processing unit 1 also assigns the first note to the thumb and the first finger, and enters the part SR40 of the finger assignment subroutine SR4 as shown in FIG. 42.

Figure 43:
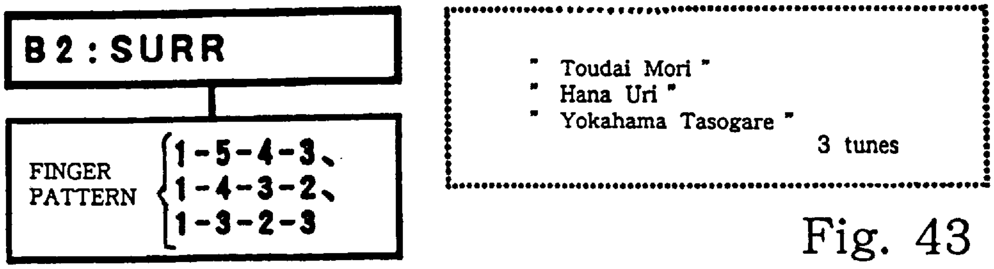

The note pattern B2 is expressed as "SURR", and is found in "*Toudai Mori* (Lighthouse Keeper)" (see Pretty Pianist, page 17), "*Hanauri* (Flower Bender)" (ditto, page 18) and "*Yokohama Tasogare* (Twilight in Yokohama)" (see Night Ballads, page 302). The central processing unit assigns the finger patterns "1"-"5"-"4"-"3", "1"-"4"-"3"-"2" and "1"-"3"-"2"-"3" to the notes as shown in FIG. 43.

Figure 44:
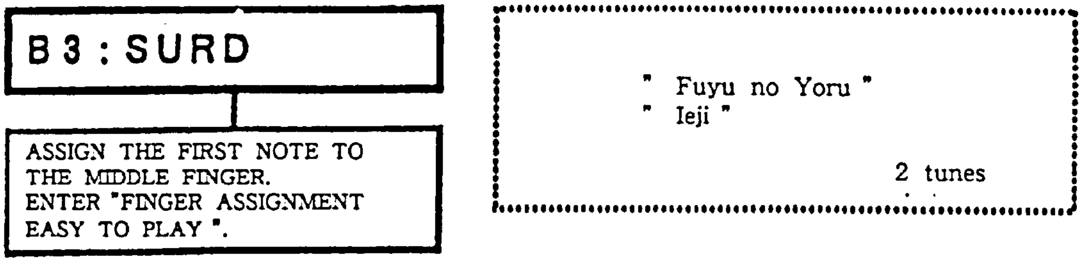
Figure 45:
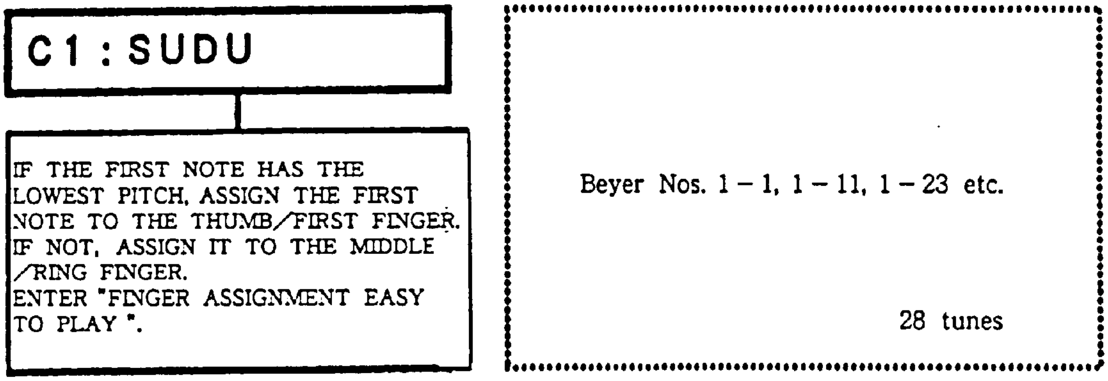
Figure 46:
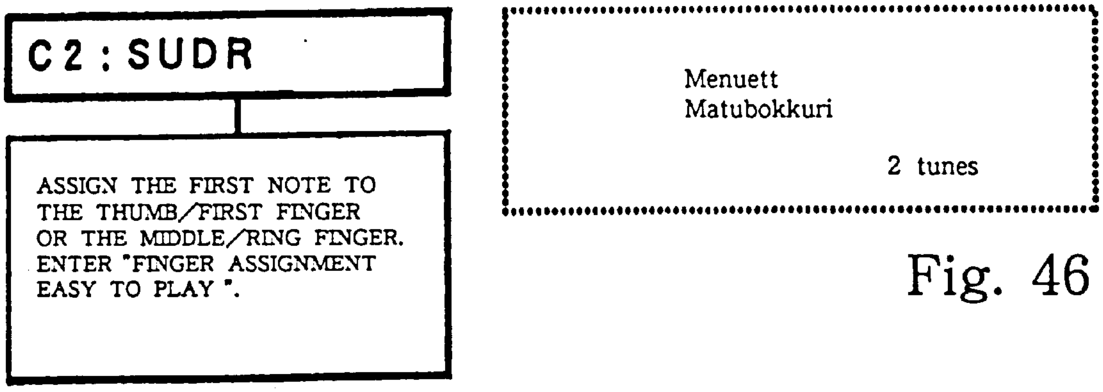
Figure 47:
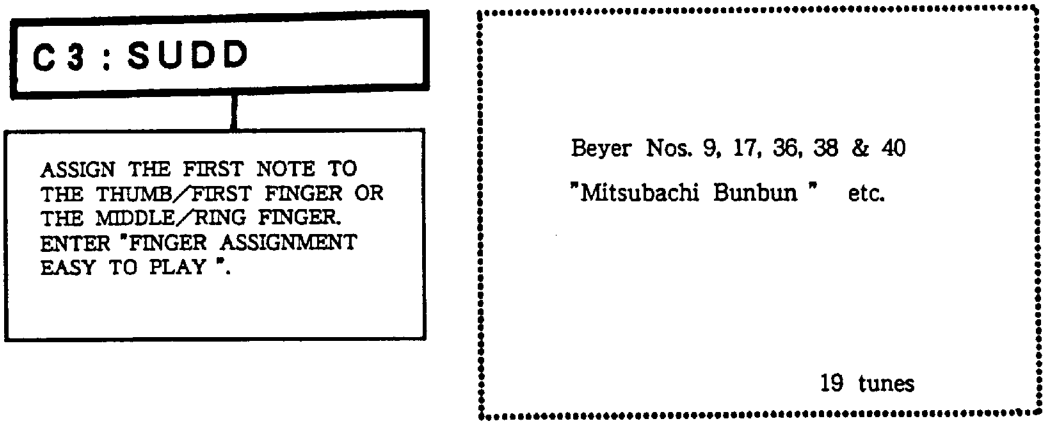

The note pattern B3 is expressed as "SURD", and is found in "*Fuyu no Yoru* (Winter Night)" (see Pretty Pianist, page 14) and "*Ieji* (Way to Home)" corresponding to the melody of "FROM THE NEW WORLD" (ditto, page 32). The central processing unit 1 assigns the first note to the middle finger, and enters the part SR40 of the finger assignment subroutine SR4 as shown in FIG. 44.

Data Processing for Note Patterns C1, C2 & C3

The note pattern C1 is expressed as "SUDU", and is found in Beyer Nos. 1–1, 1–11, 1–23, 1–24, 8, 11, 13, 16, 20, 26, 28, 37, 45, 50, 53, 56, 66, 93 and 94, "*Bara no Hana* (Flowers of Rose)" (see Beyer vol.2, page 85), "*Yuki* (Snow)" (see *Youchien no Tomo* 4, page 56), "Oshougatu (New Year's Day)" (ditto, page 57), "Good Morning to You" (ditto, page 98), "*Haru no Asa* (Morning in Spring)" (see, Pretty Pianist, page 12), "Mizu no Sei (Water Fairy)" (ditto, page 76), "*Choshinoyoi Kajiya* (Smith Easily Elated by Praise or Flattery)" (ditto, page 56), "*Yawara* (Jyudo)" (see Night Ballads, page 290) and "*Namidagoi* (Love with Tear)" (ditto, page 224). The central processing unit 1 checks the notes to see whether or not the first note has the lowest pitch of all. When the first note has the lowest pitch, the central processing unit 1 assigns the first note to the thumb and the first finger. If not, the central processing unit 1 assigns the first note to the middle finger and the ring finger. Thereafter, the central processing unit 1 enters the part SR40 of the finger assignment subroutine SR4 (see FIG. 45).

The note pattern C2 is expressed as "SUDR", and is found in "Menuett" (see Beyer, vol. 2, page 113) and "*Matubokkuri* (Pinecone)" (see, *Youtien no Tomo* 4, page 123). The central processing unit 1 checks the notes to see whether or not the first note has the lowest pitch of all. When the first note has the lowest pitch, the central processing unit 1 assigns the first note to the thumb and the first finger. If not, the central processing unit 1 assigns the first note to the middle finger and the ring finger. Thereafter, the central processing unit 1 enters the part SR40 of the finger assignment subroutine SR4 (see FIG. 46).

The note pattern C3 is expressed as "SUDD", and is found in Beyer Nos. 9, 17, 36, 38 and 40, "*Mitsubati Bunbun* (Honeybee Booms)" (see *Youtien no Tomo* 4, page 13), "*Takibi* (Bonfire)" (ditto, page 53), "Yuki no Penkiyasan (Snow Painter)" (ditto, page 55), "*Okaasan* (Mama)" (ditto, page 93), "*Kiyosikonoyoru* (Holy Night)" (ditto, page 62), "*Hashiruno Daisuki* (I Like Running)" (ditto, page 99), "*Nawatobi Asobi* (Jump Rope)" (ditto, page 84), "Dance" (see Pretty Pianist, page 35), "*Tonton Tomodachi* (Friends)" (see *Youchien no Tomo* 4, page 95), "London Bridge" (ditto, page 125), "*Omochya no Koukyoukyoku* (Toy's Symphony)" (see Pretty Pianist, page 80), "Matador in Carmen" (ditto, page 104), "Gossec's Gavotte" (ditto, page 108) and "*Rabu Yu Tokyo* (I Love You in Tokyo)" (see Night Ballads, page 308). The central processing unit 1 checks the notes to see whether or not the first note has the lowest pitch of all. When the first note has the lowest pitch, the central processing unit 1 assigns the first note to the thumb and the first finger. If not, the central processing unit 1 assigns the first note to the middle finger and the ring finger. Thereafter, the central processing unit 1 enters the part SR40 of the finger assignment subroutine SR4 (see FIG. 47).

Data Processing for Note Patterns D1, D2 & D3

The note pattern D1 is expressed as "SRUU", and is found in "*Tsuki no Hikari* (Moon Light)" (see Beyer, vol.1, page 133), "*Ame* (Rain)" (see *Youtien no Tomo* 4, page 32), Beyer No. 91, "*Tanabatasama* (Festival of the Weaver)" (ditto, page 33), "*Kingyo no Hirune* (Goldfish in Siesta)" (ditto, page 37), "*Kitanokunikara* (From Northern Country)" (ditto, page 52), "*Uguisu* (Bush Warbler)" (ditto, page 61), "*Usagi* (Rabbit)" (ditto, page 68), "*Gogatsu no Uta* (May Song)" (see Pretty Pianist, page 8), "*Koujyou no Tuki* (Moon over Ruined Castle)", "Long Long Ago" (see Pretty Pianist, page 30) and "Donau no Sazanami (Donau that runs dimpling)" (ditto, page 31).

The central processing unit 1 checks the notes to see whether or not the first note has the lowest pitch. If the answer is given affirmative, the central processing unit 1 assigns the first note to the thumb and the first finger as follows. If the tempo at the first note is less than a predetermined value such as 120, the central processing unit 1 assigns the finger pattern "1"-"1" to the first two notes. On the other hand, if the tempo at the first note is greater than the predetermined value, the central processing unit 1 further checks the first two notes to see whether or not the first note is longer in duration than the second note. When the answer is given affirmative, the central processing unit 1 assigns the finger pattern "1"-"1" to the first two notes. If the answer is given negative, the central processing unit 1 assigns the finger pattern "2"-"1" to the first two notes. On the other hand, when another note has the lowest pitch, the central processing unit 1 assigns the finger pattern "3"-"3" or "2"-"2" to the first two notes.

Figure 48:
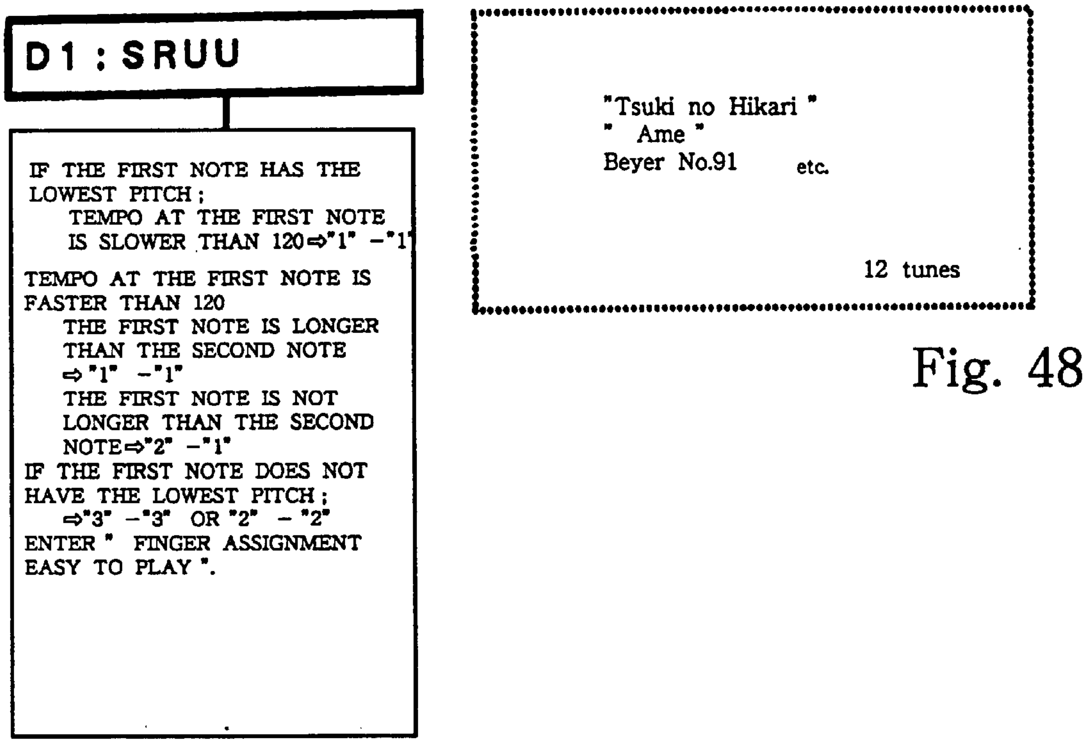
Figure 55:
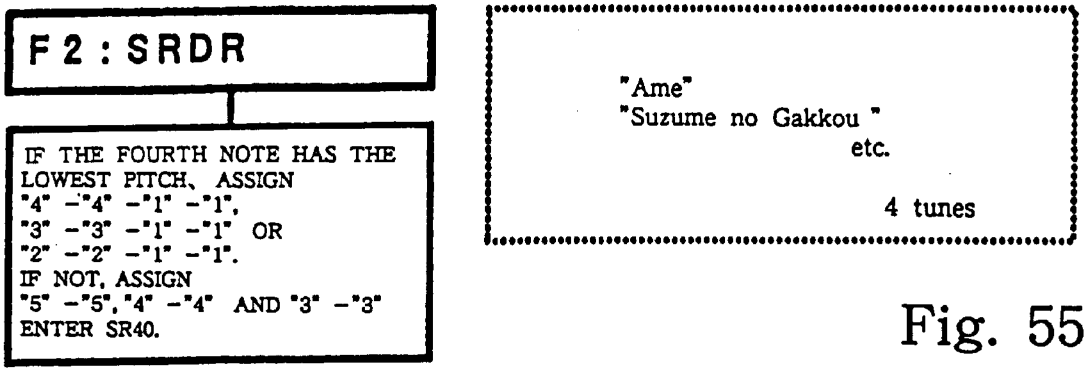
Figure 56:
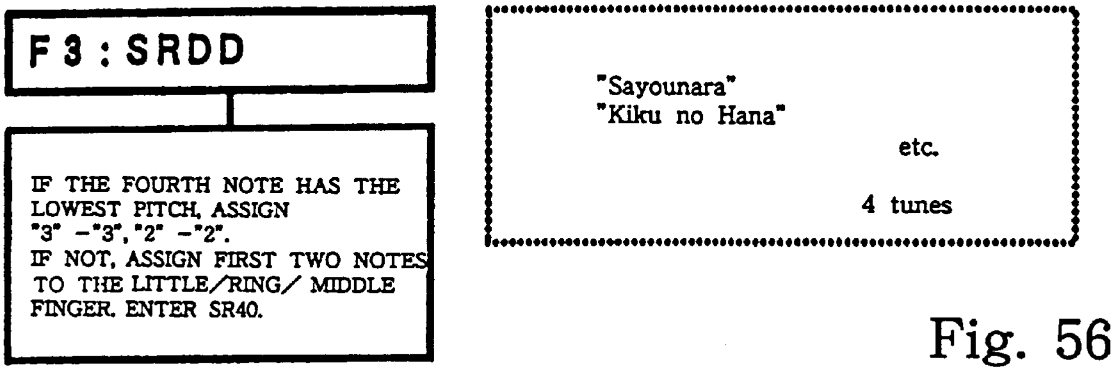
Figure 57:
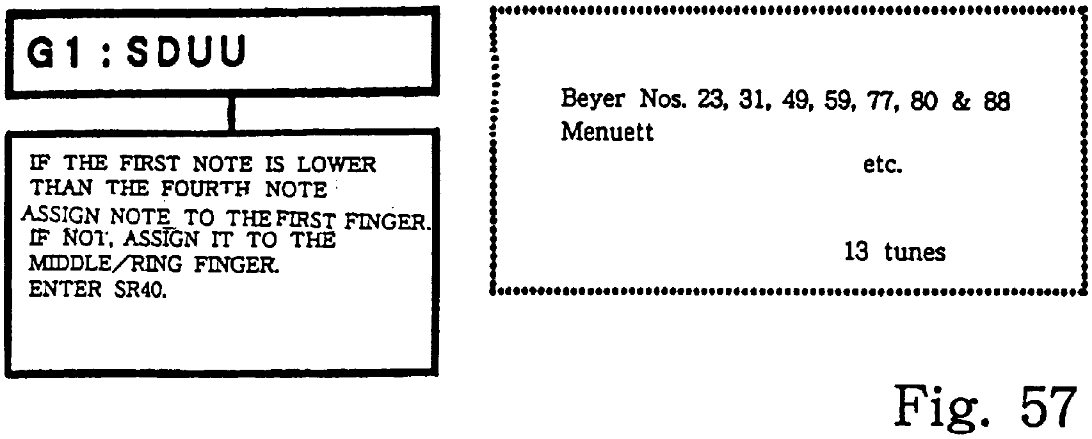
Figure 61:
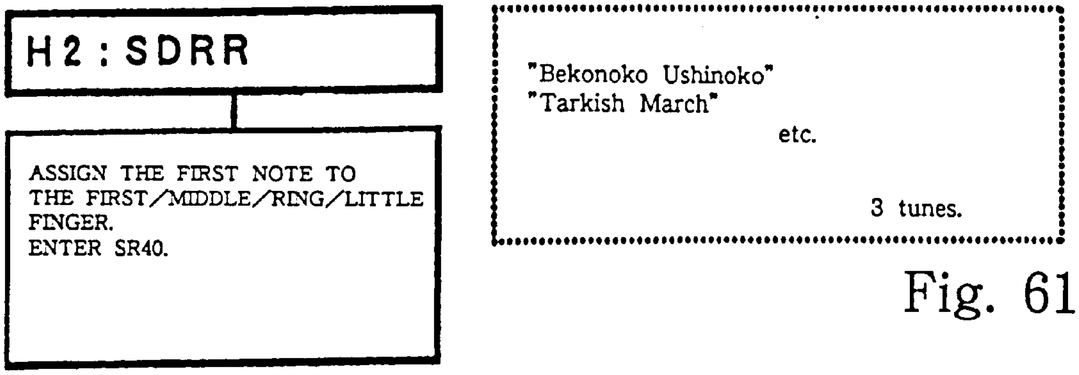
Figure 62:
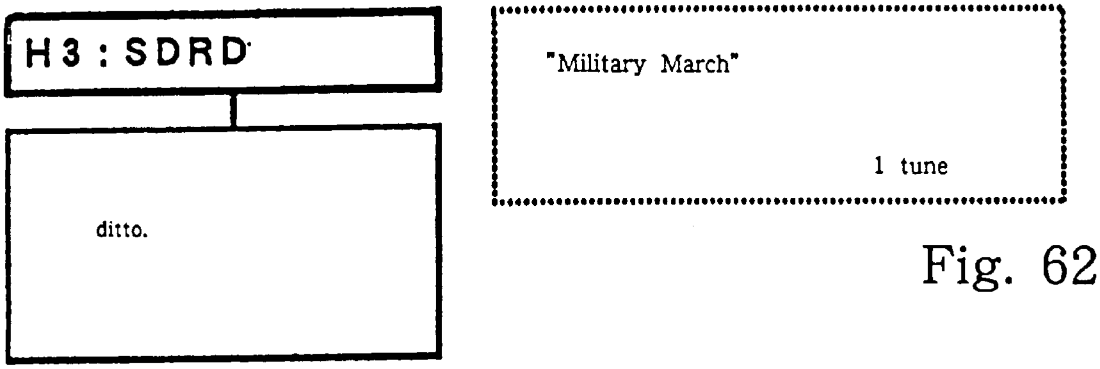
Figure 63:
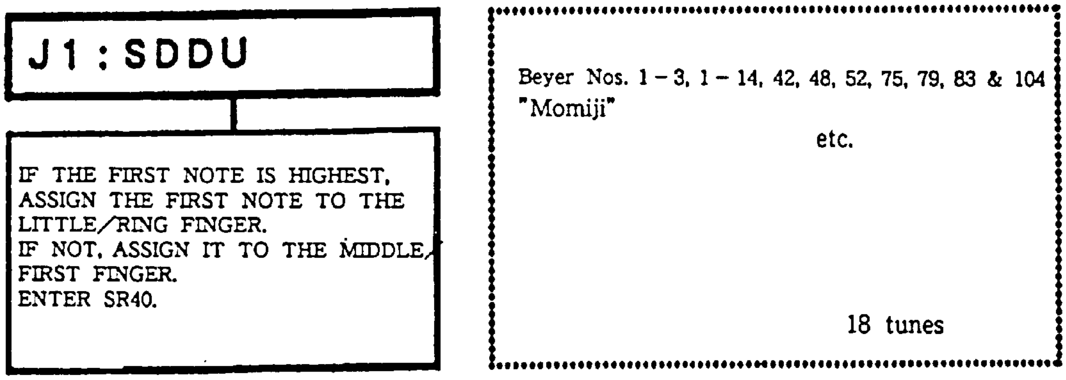
Figure 64:
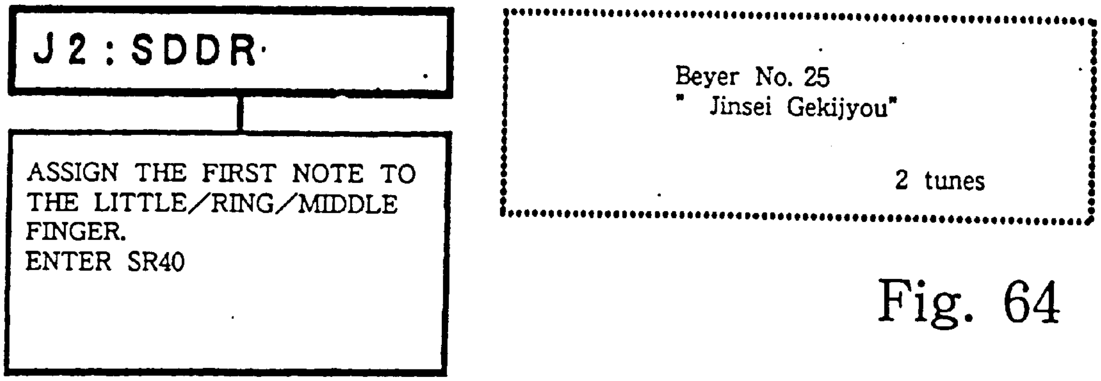
Figure 65:
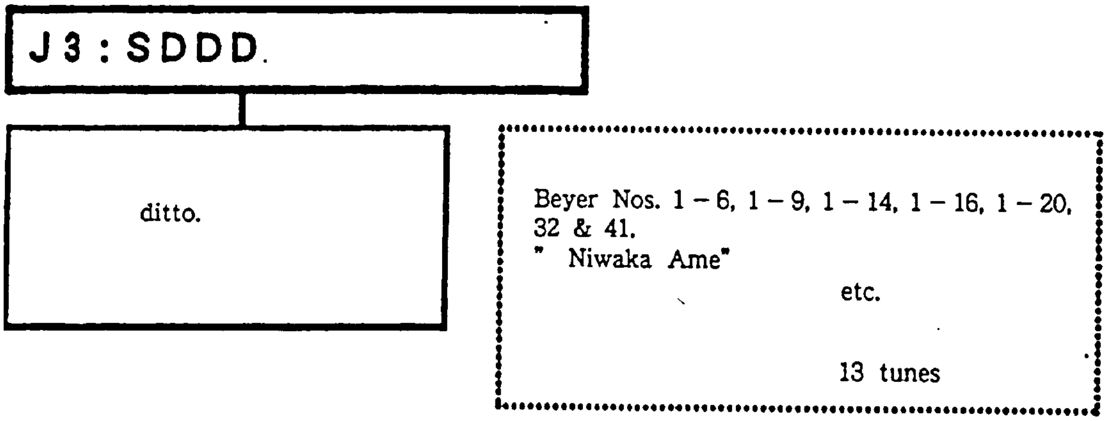

When the central processing unit 1 determines the fingers used for the first two notes, the central processing unit 1 enters the part SR40 of the finger assignment subroutine SR4 (see FIG. 48).

The note pattern D2 is expressed as "SRUR", and is found in "*Arisan no Ohanashi* (Story of Ant)" (see *Youtien no Tomo* 4, page 64), "*Fujisan* (Fuji Mounten)" (ditto, page 118), "*Shiawasenara Teotaiakou* (Let's clap your hands when you feel yourselves happy)" (ditto, page 103) and "*Ningyo* (Doll)" (ditto, page 120).

The central processing unit 1 processes the pieces of note/rest data as similar to the note pattern D1 except that the first note is not lowest as shown in FIG. 49. The central processing unit 1 checks the notes to see whether or not the first note has the lowest pitch. If the answer is given affirmative, the central processing unit 1 assigns the first note to the thumb and the first finger as follows. If the tempo at the first note is less than a predetermined value such as 120, the central processing unit 1 assigns the finger pattern "1"-"1" to the first two notes. On the other hand, if the tempo at the first note is greater than the predetermined value, the central processing unit 1 further checks the first two notes to see whether or not the first note is longer in duration than the second note. When the answer is given affirmative, the central processing unit 1 assigns the finger pattern "1"-"1" to the first two notes. If the answer is given negative, the central processing unit 1 assigns the finger pattern "2"-"1" to the first two notes. On the other hand, when the first note does not have the lowest pitch, the central processing unit 1 assigns the finger pattern "3"-"3" and "4"-"4" to the first two notes.

When the central processing unit 1 determines the fingers used for the first two notes, the central processing unit 1 enters the part SR40 of the finger assignment subroutine SR4.

The note pattern D3 is expressed as "SRUD", and is found in "*Sakura* (Cherry Tree)" (see *Youtien no Tomo* 4, page 15), "Brahms's Nursery Song" (Pretty Pianist, page 13), "Scubert's Nursery Song" (ditto, page 24), "*Gakkyou no Toki* (Time to Enjoy Music)" (ditto, page 42) and "Faust's Walz" (ditto, page 62). The central processing unit 1 assigns the first note to the middle finger. Otherwise, the central processing unit 1 assigns the first note to the ring finger. As a result, the finger pattern is "3"-"3" or "4"-"4". Thereafter, the central processing unit 1 enters the part SR40 of the finger assignment subroutine SR4 as shown in FIG. 50.

Data Processing for Note Patterns E1, E2 & E3

The note pattern E1 is expressed as "SRRU", and is found in Beyer No. 64, "*Nami to Kaigara* (Waves and Shell)" (see *Youchien no Tomo* 4, page 27), "Gavotte" (see Beyer vol.2, page 118), "*Mizuasobi* (Play in Water)" (see *Youchien no Tomo* 4, page 38), "*Chuchu Mezumi* (Squeaking Rat)" (ditto, page 67), "*Hotaru no Hikari* (Light of Firefly)" (see Pretty Pianist, page 20), "*Fushigi na Poketto* (Magical Pocket)" (see *Youchien no Tomo* 4, page 104), "*Oyama no Suginoko* (Little Cedar in Mountain)" (ditto, page 108), "*Furusato*

(Native Place)" (see Prety Pianist, page 5), "*Sizukana Mizuumi* (Quiet Lake)" (ditto, page 23) and "Oushou (the King)" (see Night Ballads, page 56).

The central processing unit 1 checks the pieces of note/rest data to see whether or not the first note has the lowest pitch in the notes from the first note to the sixteenth note. When the answer is affirmative, the central processing unit 1 assigns the first note to the thumb and the first finger. On the other hand, if the answer is negative, the central processing unit 1 assigns the first note to the middle finger and the ring finger. Thereafter, the central processing unit 1 enters the part SR40 of the finger assignment subroutine SR4 as shown in FIG. 51.

The note pattern E2 is expressed as "SRRR", and is found in Beyer Nos. 72 and 99, "*Tanabata Matsuri* (Festival of the Weaver)" (see *Youtien no Tomo* 4, page 30), "*Darumasan* (Tumbler)" (ditto, page 82), "*Temari Uta* (Song of Handball)" (ditto, page 85), "Ten Indians" (ditto, page 124), "*Kisha* (Steam Locomotion)" (see Pretty Pianist, page 9), "*Uruwashi no Nagare* (Beautiful Stream)" (ditto, page 22), "*Hakutyou no Odori* (Dance of Swan)" (ditto, page 58, "*Onna no Iji* (Woman's Strong Will)" (see Night Ballads, page 86), "*Kitaguni no Hafu* (Northern Country in Spring)" (ditto, page 118), "*Tugarukaikyou Fuyugesiki* (Winter Scene at Straits of Tsugaru)" (ditto, page 204), "*Hoshikage no Warutu* (Starlight Walz)" (ditto, page 266) and "Bara ga Saita (Roses have been out)" (ditto, page 355). The central processing unit 1 checks the pieces of note/rest data to see whether or not notes lower in pitch than the first four notes are a majority in the four notes after the first four notes. If the answer is affirmative, the central processing unit 1 assigns the finger patterns "5"-"5"-"5"-"5" and "4"-"4"-"4"-"4" to the first four notes. On the other hands, if the notes higher in pitch than the first four notes are a majority in the eight notes after the first four notes, the central processing unit 1 assigns the finger patterns "4"-"3"-"2"-"1", "1"-"1"-"1"-"1" and "1"-"2"-"1"-"2" to the four notes (see FIG. 52). The reason why the four notes are changed to the eight notes is that the later case requires a complicated fingering.

The note pattern E3 is expressed as "SRRD", and is found in "*Katatumuri* (Snail)" (see *Youtien no Tomo* 4, page 20), "Hotarugari (Firefly Catching)" (ditto, page 81), "*Tawara ha Gorogoro* (Rolling Straw Bag)" (ditto, page 91), "*Ohayou no Uta* (Song of Morning Greeting)" (ditto, page 92) and "*Ookina Taiko* (Big Drum)" (ditto, page 107). The central processing unit 1 checks the pieces of note/rest data to see whether or not notes lower in pitch than the first three notes are a majority in the four notes after the first three notes. If the answer is affirmative, the central processing unit 1 assigns the lowest pitched note to the thumb, and enters the part SR40 of the finger assignment subroutine SR4 as shown in FIG. 53. As a result, the finger pattern for the first three notes is "5"-"5"-"5", "4"-"4"-"4" or "3"-"3"-"5". On the other hands, if the notes higher in pitch than the first three notes are a majority in the four notes after the first three notes, the central processing unit 1 assigns the finger pattern "4"-"3"-"2"-"1".

Data Processing for Note Patterns F1, F2 & F3

The note pattern F1 is expressed as "SRDU", and is found in "*Haruyokoi* (Come, spring!)" (see *Youtien no Tomo* 4, page 6), "*Oborozukiyo* (Hazy Moon Night)" (ditto, page 19), "*Oyama no Osaru* (Monkey in Mountain) (ditto, page 65), "*Otukai Arisan* (Ant who goes shopping)" (ditto, page 80), "*Toryanse* (Pass here)" (ditto, page 86), "*Teotatakimasyou* (Let's beat with hands)" (ditto, page 100) and "*Itako Hanayomesan* (Bride in Riverside District)" (see Night Ballads, page 40). The central processing unit 1 checks the pieces of note/rest data to see whether or not the fourth note has the highest pitch. When the fourth note has the highest pitch, the central processing unit 1 assigns the first two notes to the first finger, the middle finger and the ring finger, and, thereafter, enters the part SR40 of the finger assignment subroutine SR4 (see FIG. 54). On the other hand, if another note has the highest pitch, the central processing unit 1 assigns the first two notes to the little finger, the ring finger and the middle finger, and, thereafter, enters the part SR40 of the finger assignment subroutine SR4.

The note pattern F2 is expressed as "SRDR", and is found in "*Ame* (Rain)" (see Beyer vol. 1, page 13), "*Suzume no Gakkou* (Sparrow's School)" (see *Youtien no Tomo* 4, page 74), "*Akushu de Konnitiwa* (Great with a Hand-shake) (ditto, page 97) and "*Tokei no Uta* (Song of Clock)" (ditto, page 105). The central processing unit 1 checks the pieces of note/rest data to see whether or not the fourth note has the lowest pitch in the first eight notes. When the fourth note has the highest pitch, the central processing unit 1 assigns the note pattern "4"-"4"-"1"-"1", "3"-"3"-"1"-"1" or "2"-"2"-"1"-"1" to the first four notes, and, thereafter, enters the part SR40 of the finger assignment subroutine SR4 (see FIG. 55). On the other hand, if another note has the lowest pitch, the central processing unit 1 assigns the finger pattern "5"-"5", "4"-"4" or "3"-"3" to the two first notes, and, thereafter, enters the part SR40 of the finger assignment subroutine SR4.

The note pattern F3 is expressed as "SRDD", and is found in "*Sayounara (Good-bye)" (see Beyer vol.* 2, page 30), "*Kiku no Hana* (Chrysanthemum)" (see *Youtien no Tomo* 4, page 50), "*Sayounara no Uta* (Farewell Song) (ditto, page 94) and "*Kanasii Sake* (Liquor with Grief)" (see Night Ballads, page 106). The central processing unit 1 checks the pieces of note/rest data to see whether or not the fourth note has the lowest pitch in the first eight notes. When the fourth note has the lowest pitch, the central processing unit 1 assigns the finger pattern "3"-"3"-"2"-"1" to the first four notes, and, thereafter, enters the part SR40 of the finger assignment subroutine SR4 (see FIG. 56). On the other hand, if another note has the lowest pitch, the central processing unit 1 assigns the first two notes to the little finger, the ring finger and the middle finger, and, thereafter, enters the part SR40 of the finger assignment subroutine SR4.

Data Processing for Note Patterns G1, G2 & G3

The note pattern G1 is expressed as "SUDD", and is found in Beyer Nos. 23, 31, 49, 59, 77, 80 and 88, "Menuett" (see Beyer vol. 2, page 74), "*Makiba no Asa* (Morning in Pasture)" (see *Youtien no Tomo* 4, page 28), "*Kyupisan* (Kewpie Doll) (ditto, page 113), "Boccherini's Menuett" (see Pretty Pianist, page 100), "*Naminori Koete* (Over the waves)" (dito, page 114) and "*Kitanoyadokara* (From Northern Inn)" (see Night Ballads, page 122). The central processing unit 1 checks the pieces of note/Test data to see whether or not the first note is lower in pitch than the fourth note. When the answer is afirmative, the central processing unit 1 assigns the first note to the first finger, and, thereafter, enters the part SR40 of the finger assignment subroutine SR4 (see FIG. 57). On the other hand, if not, the central processing unit 1 assigns the first note to the middle finger and the ring finger, and, thereafter, enters the part SR40 of the finger assignment subroutine SR4.

The note pattern G2 is expressed as "SDUR", and is, by way of example, found in "Mail Coach" (see Pretty Pianist, page 46). The central processing unit 1 checks the pieces of note/rest data to see whether or not the first note has the highest pitch of the first four notes. When the first note has the highest pitch, the central processing unit 1 assigns the first note to the little finger and the ring finger, and, thereafter, enters the part SR40 of the finger assignment subroutine SR4 (see FIG. 58). On the other hand, if another note has the highest pitch, the central processing unit 1 assigns the first note to the middle finger and the first finger, and, thereafter, enters the part SR40 of the finger assignment subroutine SR4.

The note pattern G3 is expressed as "SDUD", and is found in Beyer Nos. 1–13, 1–17, 1–22, 21, 33, 58, 76 and 102, in "*Narande Arukou* (Let's walk together)" (see Beyer vol. 2, page 134), "*Amefuri* (In the rain)" (see *Youtien no Tomo* 4, page 18), "*Hibari* (Lark) (ditto, page 34), "*Arare* (Hail)" (ditto, page 58), "*Memekoyagi* (Goatling)" (ditto, page 78), "For Elyzee" (see Pretty Pianist, page 117) and "*Momotaro* (Boy born from Peach)" (see *Youtien no Tomo* 4, page 111). The central processing unit 1 checks the pieces of note/rest data to see whether or not the first note has the highest pitch of the first four notes. When the first note has the highest pitch, the central processing unit 1 assigns the first note to the little finger and the ring finger, and, thereafter, enters the part SR40 of the finger assignment subroutine SR4 (see FIG. 59). On the other hand, if another note has the highest pitch, the central processing unit 1 assigns the first note to the middle finger and the first finger, and, thereafter, enters the part SR40 of the finger assignment subroutine SR4.

Data Processing for Note Patterns H1, H2 & H3

The note pattern H1 is expressed as "SDRU", and is found in "*Hibari* (Lark)" (see *Youtien no Tomo* 4, page 17) and "*Donguri Korokoroi* (Rolling Acorn) (ditto, page 45). The central processing unit 1 checks the pieces of note/rest data to see whether or not the first note has the highest pitch of the first four notes. When the first note has the highest pitch, the central processing unit 1 assigns the first note to the little finger and the ring finger, and, thereafter, enters the part SR40 of the finger assignment subroutine SR4 (see FIG. 60). On the other hand, if another note has the highest pitch, the central processing unit 1 assigns the first note to the middle finger and the first finger, and, thereafter, enters the part SR40 of the finger assignment subroutine SR4.

The note pattern H2 is expressed as "SDRR", and is found in "*Bekonoko Ushinoko* (Calf)" (see *Youtien no Tomo* 4, page 63) and "Beethoven's Turkish March" (see Pretty Pianist, page 34) and "*Sekai wa Futarinotameni* (World for Couples)" (see Night Ballads, page 264). The first note has the highest pitch of the first four notes, and the central processing unit 1 assigns the first note to the first finger, the middle finger, the ring finger and the little finger. Thereafter, the central processing unit 1 enters the part SR40 of the finger assignment subroutine SR4 (see FIG. 61).

The note pattern H3 is expressed as "SDRD", and is found in "Schubert's Military March" (see Pretty Pianist, page 51). The first note has the highest pitch of the first four notes, and the central processing unit 1 assigns the first note to the first finger, the middle finger, the ring finger and the little finger. Thereafter, the central processing unit 1 enters the part SR40 of the finger assignment subroutine SR4 (see FIG. 62).

Data Processing for Note Patterns J1, J2 & J3

The note pattern J1 is expressed as "SDDU", and is found in Beyer Nos. 1–3, 1–14, 42, 48, 52, 75, 79, 83 and 104, "*Momiji* (Maple)" (see *Youchien no Tomo* 4, page 46), "*Oyuki Koyuki* (Heavy Snowfall Light Snowfall)" (ditto, page 60), "*Zosan* (Elephant)" (ditto, page 73), "*Nanatu no Ko* (Seven Children)" (ditto, page 76), "*Omotya no Marchi* (Toy's March)" (ditto, page 112), "*Merisan no Hituji* (Mary's Sheep)" (ditto, page 115), "*Buranko* (Swing)" (ditto, page 121), "Suwannee River" (see Pretty Pianist, page 25) and "*Kutinasi no Hana* (Cape Jasmine)" (Night Ballads, page 130). The central processing unit 1 checks the pieces of note/rest data to see whether or not the first note has the highest pitch of the first four notes. When the first note has the highest pitch, the central processing unit 1 assigns the first note to the little finger and the ring finger, and, thereafter, enters the part SR40 of the finger assignment subroutine SR4 (see FIG. 35). On the other hand, if another note has the highest pitch, the central processing unit 1 assigns the first note to the middle finger and the first finger, and, thereafter, enters the part SR40 of the finger assignment subroutine SR4.

The note pattern J2 is expressed as "SDDR", and is found in Beyer No. 25 and "*Jinsei Gekijyou* (Life Theater)" (see Night Ballads, page 178). The central processing unit 1 assigns the first note to the little finger, the ring finger and the middle finger, and, thereafter, enters the part SR40 of the finger assignment subroutine SR4 (see FIG. 64).

The note pattern J3 is expressed as "SDDD", and is a continuous descent. The note pattern J3 is found in Beyer Nos. 1–6, 1–9, 1–14, 1–16, 1–20, 32 and 41, "*Niwakaame* (Shower)" (see Beyer vol. 2, page 104), "Muses" (ditto, page 136), "*Bunbunbun* (Boom)" (see *Youtien no Tomo* 4, page 12), "*Umi* (Sea)" (ditto, page 31), "*Akatonbo* (Red Dragonfly)" (see Pretty Pianist, page 10) and "*Ginza no Koi no Monogatari* (Love Story in Ginza Street)" (see Night Ballads, page 128). The central processing unit 1 assigns the first note to the little finger, the ring finger and the middle finger, and, thereafter, enters the part SR40 of the finger assignment subroutine SR4 (see FIG. 65).

Evaluation Subroutine

Subsequently, description is made on the evaluation subroutine SR2 with reference to FIGS. 66 and 67. As described hereinbefore, the rules for the finger assignment allows the central processing unit 1 to assign more than one finger pattern to a passage. In this situation, the central processing unit 1 determines the optimum finger pattern at a pause corresponding to the bar-line in the music score through the evaluation subroutine SR2. The computer program shown in FIGS. 3 to 8 branches to the evaluation subroutine SR2 at steps S11/S24/S25.

In detail, the evaluation subroutine SR2 has evaluation rules shown in FIG. 67. The central processing unit 1 gives points to the use of fingers in each of the finger patterns in accordance with the rules, and keeps the scores of the finger patterns. Comparing the scores, then the central processing unit 1 determines the finger pattern with the highest score to be optimum.

The principles of the evaluation are as follows. First, the best points such as "10" are given to natural intervals of fingers. Second, if the fingers become wider or narrower than the natural intervals, the points are decreased.

Regular Rules

Followings are regular rules EVR employed in the evaluation.

1. First, the rules for the use of the thumb and the first finger are evaluated as follows. When the first note is spaced from the second note by four keys or less, the use of the thumb and the use of the first finger or vice versa get 10 points. If the span between the two notes is increased by one key, the score is decremented by 2 points each time. As to a crossing finger, i.e., a finger crossing over the adjacent finger which is corresponding to the change of finger position, if white the first note is spaced from the second note by two keys or less, the use of the two fingers gets 10 points. If the finger pattern is indicative of the first note assigned to the thumb and the second note assigned to the first finger, the crossing finger gets 10 points in so far as the two notes are spaced by one key. If the span is increased to two keys, the crossing finger gets only 7 points. If the thumb is assigned to a black key and the first finger is assigned to the white finger, the crossing finger is not allowed.

2. The use of the thumb and the middle finger is evaluated as follows. When the first note is spaced from the second note by three keys or four keys, the use of the thumb and the use of the middle finger or vice versa get 10 points. The span between the first note and the second note may be increased or decreased by one key, and each time the score is decremented by 2 points. If two notes are indicative of a white key to be depressed by the thumb and another white key to be depressed by the middle finger, the crossing finger gets 10 points in so far as the span is equivalent to or less than two keys. If two notes are indicative of a white key to be depressed by the thumb and a black key to be depressed by the middle finger, the crossing finger gets 10 points in so far as the two notes are spaced by one key. If the span is increased to two keys, the crossing finger only gets 7 points. A black key to be depressed by the thumb and a white key to be depressed by the middle finger are not allowed.
3. The use of the thumb and the ring finger is evaluated as follows. When the first note is spaced from the second note by five keys, the use of the thumb and the use of the ring finger or vice versa get 10 points. The span between the first note and the second note may be decreased by one key, and each time the score is decreased by 2 points. If two notes are indicative of a white key to be depressed by the thumb and another white key to be depressed by the ring finger, the crossing finger gets 10 points in so far as the span is equivalent to or less than two keys. If two notes are indicative of a white key to be depressed by the thumb and a black key to be depressed by the ring finger, the crossing finger gets 10 points in so far as the two notes are spaced by one key. If the span is increased to two keys, the crossing finger only gets 7 points. A black key to be depressed by the thumb and a white key to be depressed by the ring finger are not allowed.
4. The use of the thumb and the little finger is evaluated as follows. When the first note is spaced from the second note by seven keys, the use of the thumb and the use of the little finger or vice versa get 10 points. The span between the first note and the second note may be increased by one key, and each time the score is decreased by 1 point. On the other hand, if the span is decreased by one key, each time the score is decreased by 2 points.
5. The use of the first finger and the middle finger is evaluated as follows. When the first note is spaced from the second note by two keys, the use of the fingers gets 10 points. The span between the first note and the second note may be increased or decreased by one key, and each time the score is decreased by 2 points.
6. The use of the first finger and the ring finger is evaluated as follows. When two notes are indicative of a white key to be depressed by the first finger and another white key to be depressed by the ring finger, the use of the two fingers get 10 points in so far as the two notes are spaced by three keys or four keys. If two notes are indicative of black keys respectively to be depressed by the first finger and the ring finger, the use of the fingers gets 10 points in so far as the two notes are spaced by four keys. If two notes are indicative of a white key to be depressed by the first finger and a black key to be depressed by the ring finger or vice versa, the use of the fingers gets 7 points in so far as the notes are spaced by three keys or four keys. The span may be increased or decreased by one key, and each time the score is decremented by three points.
7. The use of the first finger and the use of the little finger are evaluated as follows. When two notes are indicative of white keys respectively to be depressed by the first finger and the little finger, the use of the fingers gets 10 points in so far as the two notes are spaced by 5 keys to 7 keys. On the other hand, if two notes are indicative of black keys respectively to be depressed by the first finger and the little finger, the use of the fingers gets 10 points in so far as the two notes are spaced by 5 keys. The span may be incremented or decremented by one key, and each time the score is decreased by 3 points.
8. The use of the middle finger and the ring finger is evaluated as follows. When two notes are indicative of white keys to be depressed by the two fingers, respectively, the use of the two fingers gets 10 points in so far as the two notes are spaced by one key or two keys. If the two notes are indicative of black keys, the use of the fingers gets 10 points in so far as the two notes are spaced by two keys. When the two notes are indicative of a white key to be depressed by the middle finger and a black key to be depressed by the ring finger, the use of the fingers gets 7 points in so far as the two notes are spaced by one key or two keys. On the other hand, if a black key and a white key are to be depressed by the middle finger and the ring finger, respectively, the use of the fingers gets 9 points in so far as the two notes are spaced by one key or two keys. The span may be increased by one key, and each time the score is decreased by 3 points each time.
9. The use of the middle finger and the use of the ring finger are evaluated as follows. When two notes are indicative of white keys to be depressed by the two fingers, respectively, the use of the two fingers gets 10 points in so far as the two notes are spaced by three keys or four keys. If the two notes are indicative of black keys to be depressed by the two fingers, respectively, the use of the two fingers gets 10 points in so far as the two notes are spaced by four keys. If the two notes are indicative of a white key to be depressed by the middle finger and a black key to be depressed by the little finger or vice versa, the use of the two fingers gets 7 points in so far as the span is equivalent to three keys or four keys. The span may be increased or decreased by one key, and each time the score is decremented by three points.
10. The use of the ring finger and the use of the little finger are evaluated as follows. When two notes are indicative of white keys to be depressed by the two fingers, respectively, the use of the two fingers gets 10 points in so far as the span is equivalent to three keys or four keys. If the two notes are indicative of black keys to be depressed by the two fingers, respectively, the use of the two fingers gets 10 points in so far as the span is equivalent to four keys. If the two notes are indicative of a white key and a black key to be depressed by the two fingers, the use of the fingers gets 7 points in so far as the span is equivalent to three keys or four keys. The span may be increased or decreased by one key, and each time the score is decremented by three points.

Additional Rules

Additional rules SPR are taken into account.

1. The thumb, the first finger, the middle finger and the ring finger are not used for depressing another key except a chord. There is a possibility to simultaneously generate plural tones forming a chord.
2. The little finger may be used for successively depressing keys downwardly.

3. More than one finger pattern is equally scored in the evaluation. One finger pattern is assumed to change the use from the first finger, the middle finger, the ring finger or the little finger to the thumb. Another finger pattern is assumed to change the use from the thumb, the middle finger, the ring finger or the little finger to the first finger. The former is preferable except the crossing finger.
4. The crossing finger from the thumb to the first finger has the highest priority. The second priority is given to the crossing finger from the thumb to the middle finger, and the next is the crossing finger from the thumb to the ring finger.
5. It is most appropriate to use the thumb for generating the last tone of a tune.
6. When the tune is to be played at standard tempo, it is not recommendable to repeatedly use a same finger. However, the repetition is allowable in a tune at slow tempo.

Dividing Subroutine SR3

Figure 68:
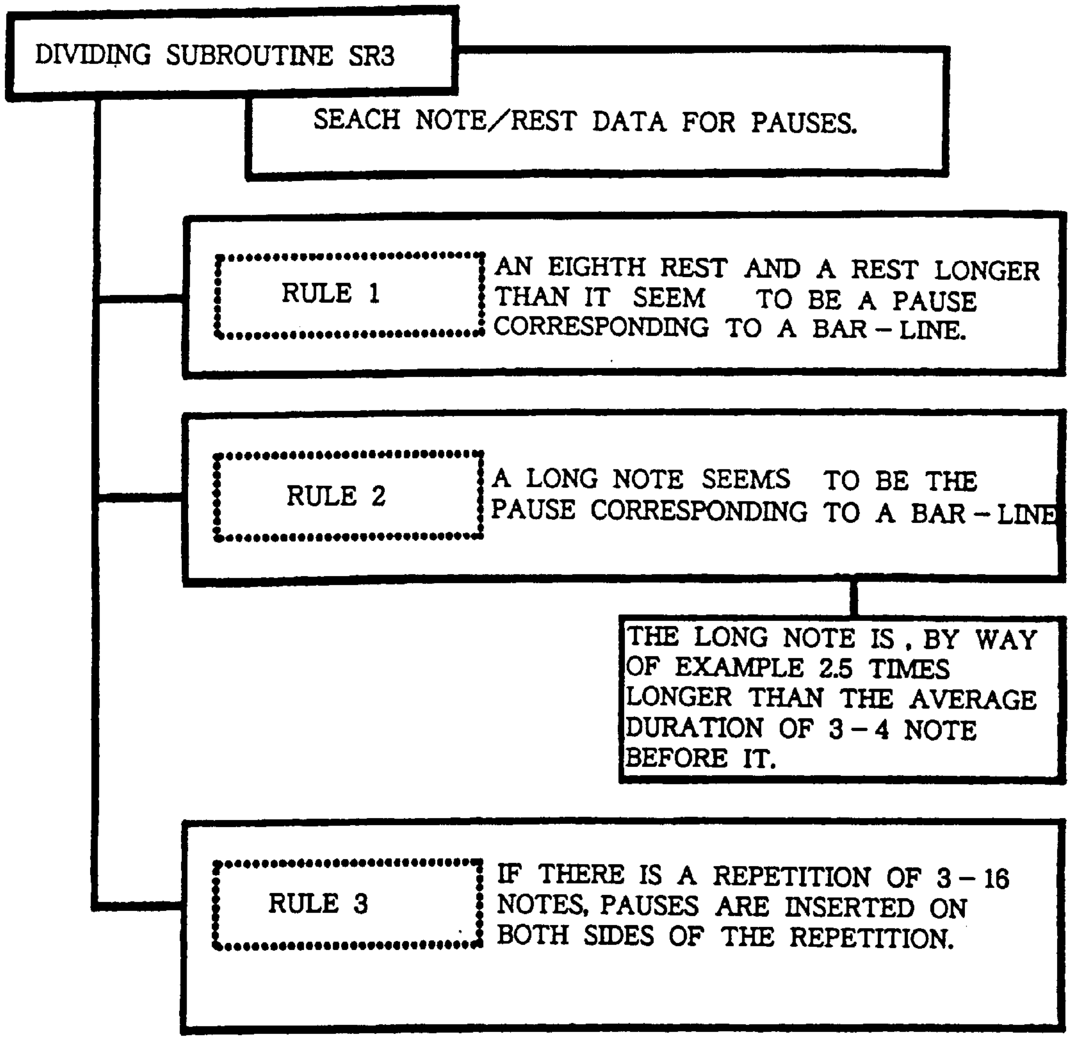
FIG. 68 is a view showing a dividing subroutine.

FIG. 68 illustrates the dividing subroutine SR3. The central processing unit 1 searches the pieces of note/rest data for pauses like the bar-lines in the music score, and determines the pauses. This means that the central processing unit 1 divides a series of notes and rests into groups like measures at the pauses. The central processing unit 1 determines a finger pattern for each of the groups. The central processing unit 1 finds the pauses through the dividing subroutine SR3, and the computer program branches to the dividing subroutine at step S13. The central processing unit 1 finds the pauses in accordance with the following rules.

Rule 1: An eighth rest is long enough to change the pieces of note/rest data. For this reason, the central processing unit 1 assumes the bar-line exists at an eighth rest or a rest longer than an eighth rest.

Rule 2: A composer usually uses a long note such as a half note or a quarter note at the end of a melodic subject. The criterion for the long note is to be equal or longer than a multiple of average duration. The central processing unit 1 averages three or four notes before the given note, and calculates the average duration. Default value of the multiplier is, by way of example, 2.5. The central processing unit 1 multiplies the average duration by 2.5. The product is used as the criterion. However, the multiplier is variable. If the central processing unit 1 can not divide the tune by using the multiple, the central processing unit 1 changes the multiplier, and divides the tune by using the new criterion, again.

A section is assumed to consist of twenty-three notes after the dividing with the default value. The central processing unit 1 decreases the multiplier, and divides the tune into sections each consisting of twenty-two notes or less under the new criterion.

Rule 3: If there is a pattern in the remaining three to sixteen notes, the series of notes is dividable before and the after the pattern. When comparing a series of notes with another series of notes, the notes of the series are identical in pitch with the notes of another series. Moreover, if the intervals of adjacent two notes are equal between the series and the other series, the central processing unit 1 determines the series of notes to be the pattern. The central processing unit 1 does not interpret a repetition of a certain note as the pattern.

Finger Assignment Subroutine SR4

Figure 70:
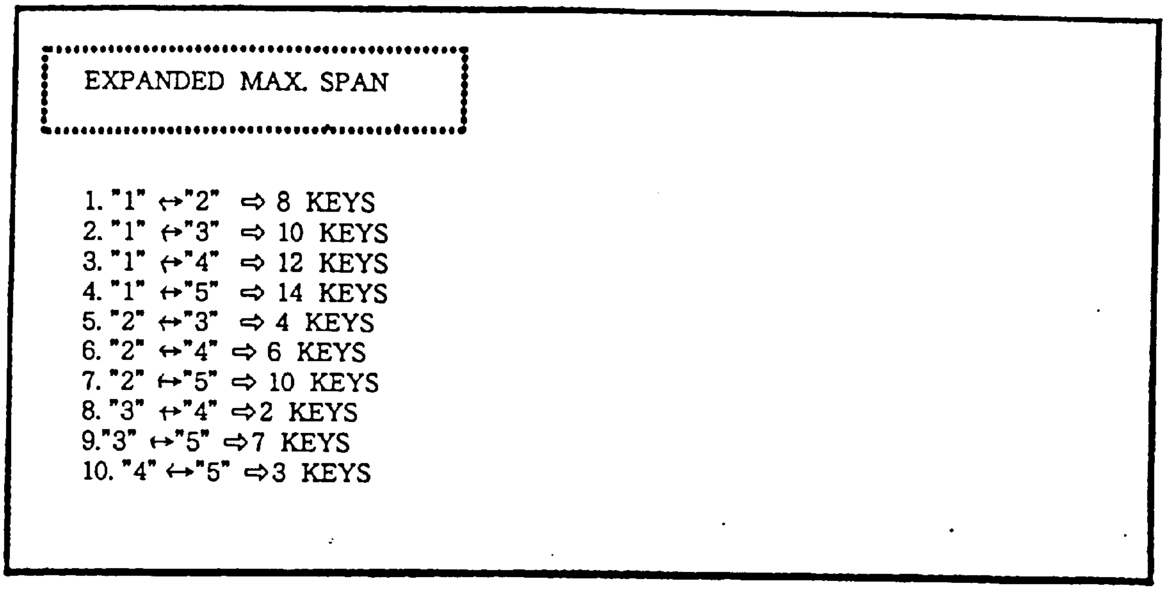
FIG. 70 is a view showing a table for maximum spans between the fingers.

FIGS. 69 and 70 illustrate the finger assignment subroutine SR4. The central processing unit 1 temporarily assigns notes to the fingers through the finger assignment subroutine SR4. As described hereinbefore, the finger assignment SR40 is incorporated in the finger assignment subroutine SR4. The finger assignment subroutine SR4 further has a table for the maximum span. The central processing unit 1 makes the fingering at the boundary between the groups and the boundary between the first four notes and the other notes in each group natural through the finger assignment subroutine SR4. The computer program branches to the finger assignment subroutine at steps S16, S18–S20, S21–S23 and S29.

The finger assignment SR40 is appropriate for a smooth transition of the fingering, and contains five rules.

Rule 1: When the central processing unit 1 assigns a finger pattern to a series of notes, the central processing unit 1 compares the last note of the series with the note next to the series to see if the next note is identical in pitch with one another. If the answer is given affirmative, the central processing unit 1 assigns the same finger pattern or a finger pattern starting with the finger next to it.

Rule 2: If the last note is assigned to the thumb, the central processing unit 1 takes the crossing finger into account.

Rule 3: The maximum span between two notes is determined on the basis of the following sub-rules.

3-1. The maximum span between the thumb and the first finger is equivalent to two keys. If the priority is lowered, the maximum span is increased to four keys.

3-2. The maximum span between the thumb and the middle finger is equivalent to 3 to 5 keys.

3-3. The maximum span between the thumb and the ring finger is equivalent to 4 to 7 keys.

3-4. The maximum span between the thumb and the little finger is equivalent to 7 to 13 keys.

3-5. The maximum span between the first finger and the middle finger is equivalent to 2 keys. If the priority is lowered, the maximum span is increased to 3 keys.

3-6. The maximum span between the first finger and the ring finger is equivalent to 4 keys. If the two notes are indicative of a white key to be depressed by one of the two fingers and a black key to be depressed by the other finger, the span equivalent to one key is not allowed.

3-7. The maximum span between the first finger and the little finger is equivalent to 5 to 9 keys.

3-8. When the two notes are indicative of white keys to be depressed by the middle finger and the ring finger, the maximum span is equivalent to 2 keys. If the two notes are indicative of a white key to be depressed by one of the two fingers and a black key to be depressed by the other finger, the maximum span is equivalent to one key. If the two notes are indicative of black keys to be depressed by the two fingers, the maximum span is equivalent to 2 keys.

3-9. The maximum span between the middle finger and the little finger is equivalent to 3–6 keys. When the span exceeds the maximum value, the central processing unit 1 checks the finger prior to the middle finger. If the first finger is at the previous position, the central processing unit 1 changes the finger pattern from "2"-"3"-"5" to "2"-"1"-"5".

3-10. The maximum span between the ring finger and the little finger is equivalent to 2 keys.

As to the crossing finger, the central processing unit 1 takes the following rules into account.

3-11. The maximum span between the first finger and the thumb is equivalent to 2 keys.

3-12. The maximum span between the middle finger and the thumb is equivalent to 2 keys.

3-13. The maximum span between the ring finger and the thumb is equivalent to 2 keys.

Rule 4: While a key is being depressed, a finger on the depressed key may be changed to another finger.

Rule 5: While the black/white keys are being successively depressed for the continuous ascent or the continuous descent, the crossing finger is required for the fingering.

If the central processing unit 1 can not temporarily assigned a finger pattern to a series of notes through the finger assignment SR40, the central processing unit 1 checks the table of the maximum span for the finger pattern, and expands the spans between the fingers. Thereafter, the central processing unit 1 tries to assign the notes to the fingers, again. The limit on the expansion is described hereinbelow.

1. The table sets a limit on the maximum span between the thumb and the first finger to be equivalent to 8 keys.
2. The table sets a limit on the maximum span between the thumb and the middle finger to be equivalent to 10 keys.
3. The table sets a limit on the maximum span between the thumb and the ring finger to be equivalent to 12 keys.
4. The table sets a limit on the maximum span between the thumb and the little finger to be equivalent to 14 keys.
5. The table sets a limit on the maximum span between the first finger and the middle finger to be equivalent to 4 keys.
6. The table sets a limit on the maximum span between the first finger and the ring finger to be equivalent to 6 keys.
7. The table sets a limit on the maximum span between the first finger and the little finger to be equivalent to 10 keys.
8. The table sets a limit on the maximum span between the middle finger and the ring finger to be equivalent to 2 keys.
9. The table sets a limit on the maximum span between the middle finger and the little finger to be equivalent to 7 keys.
10. The table sets a limit on the maximum span between the ring finger and the little finger to be equivalent to 3 keys.

Example of Data Processing

Figure 71:
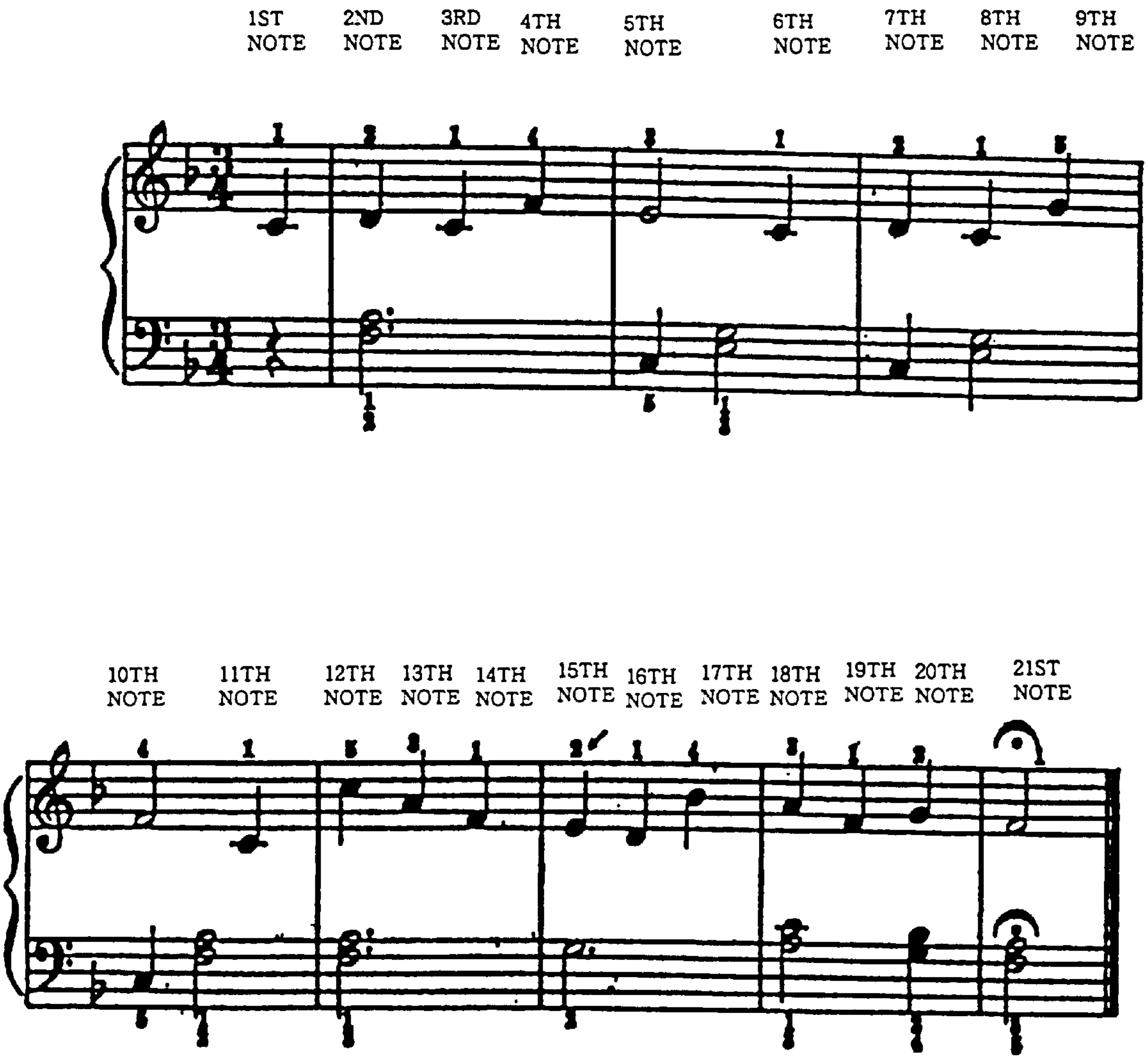
FIG. 71 is a view showing a tune the notes of which are to be assigned to fingers through the method according to the present invention.

FIG. 71 illustrates a music score, the tune of which is known as "Good Morning to You" (see *Youtien no Tomo* 4, page 98). The tune consists of the first note to the twenty-first note as shown. The first note to the twenty-first note are selectively assigned to the five fingers in accordance with a standard fingering, and the fingers are expressed by their numbers "1" to "5" over the notes. A set of MIDI codes is representative of the tune, and is stored in the external memory 8.

The central processing unit 1 selectively assigns the first note to the twenty-first note to the five fingers as follows. The notes are less than twenty-two. Then, the central processing unit 1 transfers all the notes to the buffer.

The central processing unit 1 checks the pieces of note/rest data for a note pattern at step S9. The computer program branches to the classification subroutine SR1, and the central processing unit 1 determines the first four notes to have the note pattern C1 expressed as "SUDU" (see FIG. 11). The first note has the lowest pitch of the four notes. The central processing unit 1 temporarily assigns the first note to the thumb and the first finger (see FIGS. 18 and 45). Then, the central processing unit 1 enters the part SR40 of the finger assignment subroutine SR4.

The central processing unit 1 assigns the second note to the fourth note to the fingers through the part SR40 of the finger assignment subroutine SR4 as follows.

The first note C3 is assumed to have been already assigned to the thumb.

The second note D3 is on the right side of the first note C3, and is spaced from the first note by the interval equivalent to two keys. Then, the central processing unit 1 assigns the second note D3 to the first finger.

The third note C3 is on the left side of the second note D3, and is spaced from the second note by the interval equivalent to two keys. Then, the central processing unit 1 assigns the third note C3 to the thumb.

The fourth note F3 is on the right side of the third note C3, and is spaced from the third note by the interval equivalent to five keys. Then the central processing unit 1 assigns the fourth note F3 to the middle finger or the ring finger.

As a result, the two finger patterns are temporarily determined for the first four notes as "1"-"2"-"1"-"3" and "1"-"2"-"1"-"4", which are respectively referred to as "first finger pattern" and "second finger pattern".

On the other hand, the first note C3 is assumed to have been assigned to the first finger.

The second note D3 is on the right side of the first note C3, and is spaced from the first note by the interval equivalent to two keys. Then, the central processing unit 1 assigns the second note D3 to the middle finger.

The third note C3 is on the left side of the second note D3, and is spaced from the second note by the interval equivalent to two keys. Then, the central processing unit 1 assigns the third note C3 to the first finger.

The fourth note F3 is on the right side of the third note C3, and is spaced from the third note by the interval equivalent to five keys. Then the central processing unit 1 assigns the fourth note F3 to the little finger.

As a result, the finger pattern is temporarily determined for the first four notes as "2"-"3"-"2"-"5", which is referred to as "third finger pattern".

Subsequently, the central processing unit 1 proceeds to step S13, and checks the pieces of note/rest data to see whether or not there is any pause through the dividing subroutine SR3. The central processing unit 1 applies the rule 2 for the dividing subroutine SR3. Although the fifth note is a half note, the four notes before the fifth note are quarter notes, and the average duration is equivalent to a quarter note. The central processing unit multiplies the average duration by 2.5. The product is (a half note+an eighth note), and is longer than the duration of the fifth note. Then, the central processing unit 1 determines that the fifth note is not the long note. Thus, any long note is not incorporated in the tune.

Subsequently, the central processing unit 1 proceeds through step S14 to step S17. The central processing unit 1 searches the pieces of note/rest data representative of the fifth note to the last note for a note with the highest pitch. The note with the highest pitch is twelfth note C4, which is higher in pitch than the last note of the first four notes, i.e., the fourth note F4. Then, the central processing unit 1 proceeds to step S18, and selectively assigns the fifth note to the twenty-first note to the fingers through the finger assignment "A".

When the central processing unit 1 employs the first finger pattern "1"-"2"-"1"-"3" to the first four notes, the fifth note to the twenty-first note are temporarily assigned to the fingers as follows.

1. The fifth note E3 is on the left side of the fourth note F3, and the span is equivalent to one key. The central processing unit 1 assigns the fifth note E3 to the first finger.

2. The sixth note C3 is on the left side of the fifth note E3, and the span is equivalent to four keys. The central processing unit 1 assigns the sixth note C3 to the thumb.
3. The seventh note D3 is on the right side of the sixth note C3, and the span is equivalent to two keys. The central processing unit 1 assigns the seventh note D3 to the first finger.
4. The eighth note C3 is on the left side of the seventh note D3, and the span is equivalent to one key. The central processing unit 1 assigns the fifth note E3 to the first finger.
5. The ninth note G3 is on the right side of the eighth note C3, and the span is equivalent to seven keys. The central processing unit 1 assigns the ninth note G3 to the little finger.
6. The tenth note F3 is on the left side of the ninth note G3, and the span is equivalent to two keys. The central processing unit 1 assigns the tenth note F3 to the ring finger.
7. The eleventh note C3 is on the left side of the tenth note F3, and the span is equivalent to five keys. The central processing unit 1 assigns the eleventh note C3 to the thumb.
8. The twelfth note C4 is on the right side of the eleventh note C3, and the span is equivalent to twelve keys. The central processing unit 1 assigns the twelfth note C4 to the little finger.
9. The thirteenth note A4 is on the left side of the twelfth note C4, and the span is equivalent to three keys. The central processing unit 1 assigns the thirteenth note A4 to the middle finger.
10. The fourteenth note F3 is on the left side of the thirteenth note A4, and the span is equivalent to four keys. The central processing unit 1 assigns the fourteenth note F3 to the thumb.
11. The fifteenth note E3 is on the left side of the fourteenth note F3, and the span is equivalent to one key. The central processing unit 1 assigns the fifteenth note E3 to the first, middle and ring fingers through the crossing finger. The central processing unit 1 is assumed to assign the fifteenth note E3 to the first finger, and temporarily assigns the sixteenth note to the twenty-first note as follows.
12. The sixteenth note D3 is on the left side of the fifteenth note E3, and the span is equivalent to two keys. The central processing unit 1 assigns the sixteenth note D3 to the thumb.
13. The seventeenth note B4*b* is on the right side of the sixteenth note D3, and the span is equivalent to nine keys. The central processing unit 1 assigns the seventeenth note B4*b* to the little finger.
14. The eighteenth note A4 is on the left side of the seventeenth note B4*b*, and the span is equivalent to two keys. The central processing unit 1 assigns the eighteenth note A4 to the ring finger.
15. The nineteenth note F3 is on the left side of the eighteenth note A4, and the span is equivalent to four keys. The central processing unit 1 assigns the nineteenth note F3 to the thumb and the first finger.
16. The twentieth note G3 is on the right side of the nineteenth note F3, and the span is equivalent to two keys. If the nineteenth note F3 is assigned to the thumb, the central processing unit 1 assigns the twentieth note G3 to the first finger. On the other hand, if the nineteenth note F3 is assigned to the first finger, the central processing unit 1 assigns the twentieth note G3 to the middle finger.
17. The twenty-first note F3 is on the left side of the twentieth note G3, and the span is equivalent to two keys. If the twentieth note G3 is assigned to the first finger, the central processing unit 1 assigns the twenty-first note F3 to the thumb. On the other hand, if the twentieth note G3 is assigned to the middle finger, the central processing unit 1 assigns the twenty-first note F3 to the first finger.

Thus, the central processing unit 1 temporarily assigns two finger patterns to the first note to the twenty-first note as follows.

Finger pattern 1-1: "1"-"2"-"1"-"3"-"2"-"1"-"2"-"1"-"5" - - - "1"-"2"-"1"-"5"-"4"-"1"-"2"-"1"

Finger pattern 1-2: "1"-"2"-"1"-"3"-"2"-"1"-"2"-"1"-"5" - - - "1"-"2"-"1"-"5"-"4"-"2"-"3"-"2"

If the fifteenth note E3 is assigned to the middle finger after the crossing finger, the central processing unit 1 assigns the sixteenth note to the twenty-first note as follows.

1. The sixteenth note D3 is on the left side of the fifteenth note, and the span is equivalent to two keys. The central processing unit 1 assigns the sixteenth note D3 to the first finger.
2. The seventeenth note B4*b* is on the right side of the sixteenth note D3, and the span is equivalent to nine keys. The central processing unit 1 assigns the seventeenth note B4*b* to the little finger.
3. The eighteenth note A4 is on the left side of the seventeenth note, and the span is equivalent to two keys. The central processing unit 1 assigns the eighteenth note A4 to the ring finger.
4. The nineteenth note to the twenty-first note are assigned to the fingers as similar to the above-described finger assignment on the basis of the fifteenth note assigned to the first finger.

If the fifteenth note E3 is assigned to the ring finger after the crossing finger, the central processing unit 1 assigns the sixteenth note to the middle finger, because the sixteenth note is leftwardly spaced from the fifteenth note by two keys. However, the seventeenth note B4*b* is on the right side of the sixteenth note, and the span is equivalent to nine keys. There is not any rule applicable to the seventeenth note in the part SR40 of the finger assignment subroutine SR4. The central processing unit 1 terminates the finger assignment "A" at the sixteenth note. Thus, the first finger pattern for the first four notes further results in two finger patterns 1-3 and 1-4.

Finger pattern 1-3: "1"-"2"-"1"-"3"-"2"-"1"-"2"-"1"-"5" - - - "1"-"3"-"2"-"5"-"4"-"1"-"2"-"1"

Finger Pattern 1-4: "1"-"2"-"1"-"3"-"2"-"1"-"2"-"1"-"5" - - - "1"-"3"-"2"-"5"-"4"-"2"-"3"-"2"

On the other hand, if the fourth note F3 is temporarily assigned to the ring finger, the central processing unit 1 assigns the other notes to the fingers as follows.

1. The fifth note E3 is on the left side of the fourth note, and the span is equivalent to one key. The central processing unit assigns the fifth note E3 to the middle finger.
2. The sixth note C3 is on the left side of the fifth note, and the span is equivalent to four keys. The central processing unit 1 assigns the sixth note C3 to the thumb.
3. The seventh note to the twenty-first note are similar to those of the first finger pattern.

Thus, the central processing unit 1 determines four finger patterns 2-1, 2-2, 2-3 and 2-4 on the basis of the second finger pattern. The finger patterns 2-1 to 2-4 are different from the finger patterns 1-1 to 1-4 in that the fourth note and the fifth note are changed from the middle finger and the first finger to the ring finger and the middle finger, respectively.

Finally, when the central processing unit 1 temporarily assigns the fourth note F3 to the little finger, the other notes are assigned to the fingers as follows.

1. The fifth note E3 is on the left side of the fourth note, and the span is equivalent to one key. Then central processing unit assigns the fifth note E3 to the ring finger.
2. The sixth note C3 is on the left side of the fifth note, and the span is equivalent to four keys. Then central processing unit 1 assigns the sixth note C3 to the thumb or the first finger.
3. When the sixth note C3 is assigned to the thumb, the seventh note to the twenty-first note are assigned to the fingers as similar to those of the first finger pattern.

As a result, the central processing unit 1 determines four finger patterns 3*a*-1, 3*a*-2, 3*a*-3 and 3*a*-4. The finger patterns 3*a*-1 to 3*a*-4 are different from the finger patterns 1-1 to 1-4 in that the first note to the fifth note are changed from the pattern "1"-"2"-"1"-"3"-"2" to the pattern "2"-"3"-"2"-"5"-"4".

If the central processing unit 1 assigns the sixth note to the first finger on the basis of the third finger pattern. The other notes are assigned to the fingers as follows.

1. The seventh note D3 is on the right side of the sixth note, and the span is equivalent to two keys. The central processing unit 1 assigns the seventh note D3 to the middle finger.
2. The eighth note C3 is on the left side of the seventh note, and the span is equivalent to two keys. The central processing unit 1 assigns the eighth note to the first finger.
3. The ninth note G3 is on the right side of the eighth note, and the span is equivalent to seven keys. The central processing unit 1 assigns the ninth note G3 to the little finger.
4. The tenth note to the twenty-first note are similar to those of the first finger pattern.

As a result, four finger patterns 3*b*-1, 3*b*-2, 3*b*-3 and 3*b*-4 are determined on the basis of the third finger pattern. The finger patterns 3*b*-1 to 3*b*-4 are different from the finger patterns 1-1 to 1-4 in that the first note to the ninth note are changed from the pattern "1"-"2"-"1"-"3"-"2"-"1"-"1"-"1"-"5" to the pattern "2"-"3"-"2"-"5"-"4"-"2"-"3"-"2"-"5". Thus, the central processing unit 1 obtains sixteen finger patterns through the finger assignment "A" as shown in FIG. 72.

Upon completion of the temporary finger assignment, the central processing unit 1 proceeds through steps S21, S25–S27 and S10 to step S11. The central processing unit 1 evaluates the sixteen finger patterns through the evaluation subroutine SR2, and determines the optimum finger pattern. First, the central processing unit 1 takes the regular rules shown in FIG. 67, and scores points of the first four notes of the finger patterns as shown in FIG. 73.

Although the second finger pattern and the third finger pattern get 10 points at the finger change from the third note to the fourth note, the first finger pattern gets only 8 points. Then, the central processing unit 1 rejects the first finger pattern. Subsequently, the central processing unit 1 takes the additional rules into account. The third additional rule is applicable to the finger change from the second note to the third note, and the central processing unit 1 employs the second finger pattern. Thus, the central processing unit 1 has determined the use of fingers from the first note to the fourteenth note.

The finger patterns 2-1 to 2-4 are different in the use of fingers from the fifteenth note to the last note, and the central processing unit 1 evaluates the finger patterns 2-1 to 2-4. The finger change from the fourteenth note to the fifteenth note requires the crossing finger, and the central processing unit 1 applies the fourth additional rule to the finger change. The crossing finger from the thumb to the first finger has the highest priority. Then, the central processing unit 1 rejects the finger patterns 2-3 and 2-4. As a result, the central processing unit 1 has determined the use of fingers from the fifteenth note to the eighteenth note.

The central processing unit 1 evaluates the finger patterns 2-1 and 2-2. The central processing unit 1 applies the fifth additional rule to the last note, i.e., the twenty-first note. According to the fifth additional rule, it is preferable to use the thumb for the last note. Then, the central processing unit 1 employs the finger pattern 2-1, and determines that the finger pattern 2-1 is optimum. The finger pattern 2-1 is at the fifth from the left side in FIG. 72.

Comparing the finger pattern 2-1 with the standard finger pattern shown in FIG. 71, the differences are only the use of fingers at the seventeenth note and the eighteenth note. The differences are not anything serious for trainees. Thus, the appropriate use of fingers is given through the method according to the present invention.

As will be appreciated from the foregoing description, the music performance assisting system, the method and the information storage medium according to the present invention firstly apply the rules of fingering to groups of notes/rests so as to obtain the candidates of the optimum use of fingers, and, thereafter, evaluates the candidates in accordance with rules of evaluation, thereby determining the optimum use of fingers. Thus, only the rules of fingering and the rules of evaluation are required. This means that the system, the method and the information storage medium do not require the large amount of database for all the combinations between the use of the fingers and pieces of melody. The rules occupy relatively narrow data storage area, and the data processing is sped-up. Moreover, the use of fingers is optimized through the evaluation. This results in that the system, method and the information storage medium offer an appropriate guide to the trainee.

Although particular embodiments of the present invention have been shown and described, it will be apparent to those skilled in the art that various changes and modifications may be made without departing from the spirit and scope of the present invention.

The pieces of note/rest data to be transferred to the buffer may represent more than twenty-two or less than twenty-two notes. The amount of the pieces of note/rest data is dependent on the data storage capacity of the buffer defined in the random access memory 4. If a tune is short, the pieces of note/rest data may represent all the notes of the tune.

In the above-described embodiment, the long note is seemed to be equivalent to the bar-line so as to give the pause. However, there is a computer program, which reproduces a music score from the SMF data. Another system may use the computer program so as to put the pauses at the bar-lines.

In the above-described embodiment, the candidates of the finger pattern are simultaneously determined for plural measures. If the number of measures is too many to simultaneously determine the candidates, the central processing unit 1 may decrease the number of measures. However, the minimum number is "1".

The interface 12 may inform the player of the optimum use of fingers through vibrators.

If a set of music data codes contains pieces of music data representative of the bar-lines, the dividing subroutine may be deleted from the computer program.

In the above-described embodiment, the music performance assisting system firstly determines the optimum use of fingers, and, thereafter, a trainee is allowed to play a tune. Another system according to the present invention may determine the optimum use of fingers in a real time fashion.

In the above-described embodiment, the finger assignment is on the basis of the rules shown in FIGS. 11–38 or shown in FIGS. 39–65 and the rules shown in FIG. 69. However, if there are other rules, the rules are employable. More than two rules may be used for the finger assignment.

In the above-described embodiment, the pauses are corresponding to the bar-lines. However, the pauses may be inserted at every group consisting of a predetermined number of notes such as, for example, four notes. The predetermined number may be variable depending upon a kind of tune.

A trainee may manually correct the use of fingers determined by the computer program.

The sets of music data codes and/or the computer program may be supplied from an information storage medium through an internet to users.

What is claimed is:

1. A music performance assisting system associated with a music instrument having plural manipulators manipulated by a player for producing tones, comprising:

a memory for storing pieces of data information representative of a series of notes and rests forming a tune;

a divider for dividing said series of notes and rests into plural groups each having at least one note;

a finger assignor selectively assigning said at least one note of each group to fingers of each hand of said player in accordance with rules of fingering for determining candidates of a use of fingers in which said finger assignor temporarily assigns at least one first sub-candidate of a finger pattern to a note pattern having a predetermined number of notes counted from a start of said tune and second sub-candidates of a finger pattern to remaining notes on the basis of a relation between said note pattern and said remaining notes;

an evaluator evaluating said candidates of said use of fingers on the basis of criteria for a desirable fingering so as to select said use of fingers from said candidates; and a guide for teaching said use of fingers along said tune to said player.

2. The music performance assisting system as set forth in claim 1, wherein said finger assignor determines said at least one first sub-candidate depending upon said relation between said not pattern and said remaining notes.

3. The music performance assisting system as set forth in claim 1, in which said evaluator decreases points given to each candidate when a combination of fingers is expected to depress said maniuplators spaced by wider span.

4. The music performance assisting system as set forth in claim 1, in which said divider divides said series of notes and rests at a long note, a rest and a repetition consisting of a predetermined number of notes.

5. The music performance assisting system as set forth in claim 4, in which said long note has a duration greater than a multiple of average duration of previous notes therebefore.

6. The music performance assisting system as set forth in claim 5, in which said previous notes are either three or four notes, and a multiplier for said multiple is 2.5.

7. The music performance assisting system as set forth in claim 4, in which said rest is equal to or longer than an eighth rest.

8. The music performance assisting system as set forth in claim 4, in which said repetition consists of three notes to sixteen notes.

9. The music performance assisting system as set forth in claim 1, in which said musical instrument is a silent piano including an acoustic piano having plural keys serving as said plural manipulators, plural key action mechanisms linked with said plural keys, respectively, plural hammers driven for rotation by said plural key action mechanisms, respectively, and plural music strings respectively struck by said plural hammers for generating acoustic sounds, a silent system changed between a free position and a blocking position, said silent system in said free position allowing said plural hammers to strike the associated music strings, said silent system in said blocking position causing said plural hammers to rebound thereon without striking said associated music strings, and an electronic sound generating system responsive to motions of said plural keys so as to generate electronic sounds corresponding to said acoustic sounds.

10. The music performance assisting system as set forth in claim 1, in which said musical instrument is an automatic player piano including an acoustic piano having plural keys serving as said plural manipulators, plural key action mechanisms linked with said plural keys, respectively, plural hammers driven for rotation by said plural key action mechanisms, respectively, and plural music strings respectively struck by said plural hammers for generating acoustic sounds, and an automatic playing system having plural actuators respectively associated with said plural keys and selectively energized so as to move the associated keys without fingering.

11. A music performance assisting system associated with a music instrument having plural manipulators manipulated by a player for producing tones, comprising;

a memory for storing pieces of data information representative of a series of notes and rests forming a tune;

a divider for dividing said series of notes and rests into plural groups each having at least one note;

a finger assignor selectively assigning said at least one note of each group to fingers of each hand of said player in accordance with rules of fingering for determining candidates of a use of fingers;

an evaluator evaluating said candidates of said use of fingers on the basis of criteria for a desirable fingering so as to select said use of fingers from said candidates; and a guide for teaching said use of fingers along said tune to said player, in which said finger assignor determines a note pattern of a predetermined number of notes from a start of said tune and assigns a first finger pattern to said note pattern before determining said candidates.

12. The music performance assisting system as set forth in claim 11, in which said predetermined number ranges from 4 to 6.

13. The music performance assisting system as set forth in claim 11, in which said finger assignor further assigns remaining notes of said each group to said fingers in accordance with the rules representative of the spans allowable for combinations of two fingers selected from said fingers, representative of uses of fingers to avoid and other rules for determining a second finger pattern.

14. The music performance assisting system as set forth in claim 13, in which said first finger pattern and said second finger pattern have first candidates and second candidates, and an evaluator evaluates combinations of said first candidates and said second candidates on the basis of criteria of a desirable fingering so as to select one combination serving as said use of fingers.

15. The music performance assisting system as set forth in claim 14, in which said evaluator decreases points given to each candidate when a combination of fingers is expected to depress said manipulators spaced by wider span.

16. The music performance assisting system as set forth in claim 13, in which said spans are expandable under the condition that the remaining notes are not assigned to the fingers.

17. The music performance assisting system as set forth in claim 16, in which said first finger pattern and said second finger pattern have first candidates and second candidates, and an evaluator evaluates combinations of said first candidates and said second candidates on the basis of criteria of a desirable fingering so as to select one combination serving as said use of fingers.

18. The music performance assisting system as set forth in claim 17, in which said evaluator decreases points given to each candidate when a combination of fingers is expected to depress said manipulators spaced by wider span.

19. A method for teaching a use of fingers along a tune to a player, comprising the steps of:

a) storing pieces of data information representative of a series of notes and rests forming a tune and rules of fingering;

b) dividing a series of notes and rests representative of a tune into groups each having at least one note;

c) selectively assigning said at least one note of each group to fingers of each hand of said player in accordance with said rules so as to obtain candidates of a use of fingers;

d) repeating said steps b) and c) until the end of said tune, if necessary;

e) evaluating the candidates of said use of fingers on the basis of criteria for a desirable fingering so as to select said use of fingers from said candidates; and f) teaching said use of fingers to said player, wherein at least one first sub-candidate of a finger pattern and second sub-candidates of a finger pattern are respectively assigned to a note pattern having a predetermined number of notes counted from a start of said tune and remaining notes on the basis of a relation between said note pattern and said remaining notes so as to prepare said candidates in said step c).

20. The method as set forth in claim 19, wherein said at least one first sub-candidate is determined depending upon said relation between said note pattern and said remaining notes.

21. An information storage medium for storing a computer program representative of a method for teaching a use of fingers along a tune to a player, said method comprising the steps of:

a) storing pieces of data information representative of a series of notes and rests forming a tune and rules of a fingering;

b) dividing a series of notes and rests representative of a tune into groups each having at least one note;

c) selectively assigning said at least one note of each group to fingers of each hand of said player in accordance with said rules so as to obtain candidates of a use of fingers;

d) repeating said steps b) and c) until the end of said tune, if necessary;

e) evaluating the candidates of said use of fingers on the basis of criteria for a desirable fingering so as to select said use of fingers from said candidates; and f) teaching said use of fingers to said player, wherein at least one first sub-candidate of a finger pattern and second subcandidates of a finger pattern are respectively assigned to a note pattern having a predetermined number of notes counted from a start of said tune and remaining notes on the basis of a relation between said note pattern and said remaining notes so as to prepare said candidates in said step c.

22. The information storage medium as set forth in claim 21, wherein said at least one first sub-candidate is determined depending upon said relation between said note pattern and said remaining notes.

* * * * *